(12) United States Patent
Nimura et al.

(10) Patent No.: US 7,671,947 B2
(45) Date of Patent: Mar. 2, 2010

(54) OPTICAL FILM, OPTICAL COMPENSATION FILM, POLARIZING PLATE, LIQUID CRYSTAL DISPLAY UNIT AND SELF LUMINOUS DISPLAY UNIT

(75) Inventors: Shigeaki Nimura, Minami-Ashigara (JP); Hajime Nakayama, Minami-Ashigara (JP); Yosuke Nishiura, Odawara (JP); Takako Nishiura, legal representative, Odawara (JP); Tadashi Ito, Minami-Ashigara (JP); Yasuo Mukunoki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 307 days.

(21) Appl. No.: 11/596,878

(22) PCT Filed: May 18, 2005

(86) PCT No.: PCT/JP2005/009500

§ 371 (c)(1),
(2), (4) Date: Jan. 23, 2008

(87) PCT Pub. No.: WO2005/111676

PCT Pub. Date: Nov. 24, 2005

(65) Prior Publication Data

US 2008/0309860 A1 Dec. 18, 2008

(30) Foreign Application Priority Data

| May 18, 2004 | (JP) | ............ 2004-148329 |
| Jan. 14, 2005 | (JP) | ............ 2005-008202 |
| Mar. 18, 2005 | (JP) | ............ 2005-079296 |

(51) Int. Cl.
*G02F 1/1335* (2006.01)
*G02F 1/1337* (2006.01)
*G02B 5/30* (2006.01)

(52) U.S. Cl. ......... 349/117; 349/130; 359/494; 359/500

(58) Field of Classification Search ......... 349/117, 349/130; 359/494, 500
See application file for complete search history.

(56) References Cited

U.S. PATENT DOCUMENTS

| 2003/0210370 A1 | 11/2003 | Yano et al. |
| 2005/0030456 A1 | 2/2005 | Murakami et al. |
| 2006/0062934 A1* | 3/2006 | Hayashi et al. ............ 428/1.31 |
| 2008/0062355 A1* | 3/2008 | Sata et al. ................ 349/96 |

FOREIGN PATENT DOCUMENTS

| JP | 11-246704 A | 9/1999 |
| JP | 2000-63560 A | 2/2000 |
| JP | 2001-247717 A | 9/2001 |
| JP | 2004-004641 A | 1/2004 |
| JP | 2006022311 A * | 1/2006 |
| WO | 03/062875 A1 | 7/2003 |

OTHER PUBLICATIONS

Kogaku-You Toumei, "Optical Transparent Resin", Gijutu Johou Kyokyai, 2001, pp. 81-85.
International Search Report dated Sep. 6, 2005.
Written Opinion of the International Searching Authority dated Sep. 6, 2005.

* cited by examiner

*Primary Examiner*—Mike Qi
(74) *Attorney, Agent, or Firm*—Buchanan Ingersoll & Rooney PC

(57) ABSTRACT

An optical film which has Re(λ) and Rth(λ) fulfilling the following two formulae:

$$0 \leq Re_{(590)} \leq 10$$

$$|Rth_{(590)}| \leq 25$$

wherein Re(λ) is a retardation value in plane (nm) at a wavelength of λ nm; and Rth(λ) is a retardation value in film thickness direction (nm) at a wavelength of λ nm.

34 Claims, No Drawings

OPTICAL FILM, OPTICAL COMPENSATION FILM, POLARIZING PLATE, LIQUID CRYSTAL DISPLAY UNIT AND SELF LUMINOUS DISPLAY UNIT

TECHNICAL FIELD

This invention relates to an optical film useful in liquid crystal display units. The invention further relates to optical materials such as an optical compensation film and a polarizing plate using the same and display units.

BACKGROUND ART

Because of being excellent in toughness and flame retardancy, cellulose acylate films have been employed in photographic supports and various optical materials. In recent years, in particular, cellulose acylate films are frequently employed as optical transparent films for liquid crystal display units. Owing to the high optical transparency and high optical isotropy, cellulose acylate films are favorable as optical materials for units with the use of polarization such as liquid crystal display units. Therefore, cellulose acylate films have been employed as optical compensation film supports whereby display in looking from an angle can compensated (viewing angle compensation).

A polarizing sheet, which is one of members constituting a liquid crystal display unit, is constructed by bonding a polarizer-protecting film to at least one side of a polarizer. In general, a polarizer is obtained by dyeing a stretched polyvinyl alcohol (PVA)-base film with iodine or a dichromatic dye. As the polarizer-protecting film, cellulose acylate films, in particular, triacetyl cellulose films which can be bonded directly to PVA are employed in may cases. Such a polarizer-protecting film should be excellent in optical isotropy and the characteristics of a polarizing plate largely depend on the optical characteristics of the polarizer-protecting film.

In liquid crystal display unit in these days, it is more strongly required to improve viewing angle characteristics. Thus, optical transparent films to be used as a polarizer-protecting film, an optical compensation film support, etc. should be optically isotropic. To be optically isotropic, it is important to have a small retardation value represented by the product of the birefringence and thickness of an optical film. To improve the display in looking from an angle, it is particularly needed to lower not only the retardation value (Re) but also the retardation value in the film thickness direction (Rth). More specifically speaking, it is needed that, in the case of evaluating the optical properties of an optical transparent film, Re measured in plane is a small value and Re shows no change even though the measurement angle is varied.

For solving this problem, it has been urgently required to further improve a cellulose acylate film, which has favorable properties in boding to PVA, by lowering its optical anisotropy. More specifically speaking, a preferable optical transparent film being optically isotropic is a cellulose acylate film that has a retardation value Re of almost zero and shows little change in retardation angle (i.e., Rth being almost zero too).

In producing a cellulose acylate film, it has been a practice to add a compound called a plasticizer to thereby improve the film-forming performance. Examples of the plasticizer include phosphoric acid triesters such as triphenyl phosphate and biphenyldiphenyl phosphate and phthalic acid esters (see, for example, *Purasuchikku Zairyo Koza*, vol. 17, Nikkan Kogyo Shinbun, Ltd., *Senisokei Jushi*, p. 121 (1970)). It is known that some of these plasticizers have an effect of lowering the optical anisotropy of a cellulose acylate film. For example, specific fatty acid esters are disclosed (see, for example, JP-A-2001-247717). However, these known compounds can only insufficiently lower the optical anisotropy of a cellulose acylate film.

As a method of producing a biaxial optical compensation film to be used in liquid crystal display units in recent years, there has been proposed a method which comprises spreading a liquefied solid polymer dissolved in a solvent (vehicle) on a supporting material, drying the same, subjecting a transparent film (nx=ny or nx≈ny) made of the thus solidified matter to either a stretching treatment or a shrinkage treatment or both thereof, and thereby orientating molecules in the plane to impart the characteristics nx>ny>nz. In this method, it is insufficient to merely lower the optical anisotropy as discussed above. That is to say, there has been required a film showing no optical anisotropy even after the stretching treatment or the shrinkage treatment (see JP-A-2003-315541, JP-A-2003-344856, JP-A-2004-46097 and JP-A-2004-78203).

DISCLOSURE OF THE INVENTION

The first object of the invention is to provide an optical film having a low optical anisotropy (Re, Rth) and being substantially optically isotropic. It is also intended to provide an optical film having a small wavelength dispersion in the optical anisotropy (Re, Rth) and yet showing a low optical anisotropy (Re, Rth) even after stretching or shrinking.

The second object of the invention is to provide optical materials such as an optical compensation film and a polarizing plate constructed by using an optical film that has a low optical anisotropy and a small wavelength dispersion, and a liquid crystal display unit and a self luminous display unit using the same.

(1) An optical film wherein $Re(\lambda)$ and $Rth(\lambda)$ fulfill the following formula:

$$0 \leq Re_{(590)} \leq 10 \text{ and } |Rth_{(590)}| \leq 25$$

wherein $Re(\lambda)$ is a retardation value in plane (expressed in nm) at the wavelength of $\lambda$ nm; and $Rth(\lambda)$ is a retardation value in the film thickness direction (expressed in nm) at the wavelength of $\lambda$ nm.

(2) An optical film as described in the above (1), wherein the optical film fulfills the following formula (IX):

$$|Re_{MAX} - Re_{MIN}| \leq 3 \text{ and } |Rth_{MAX} - Rth_{MIN}| \leq 5 \quad \text{(IX)}$$

wherein $Re_{MAX}$ and $Rth_{MAX}$ are the maximum retardation values (expressed in nm) of an arbitrary cut out film piece of 1 m square; and $Re_{MIN}$ and $Rth_{MIN}$ are the minimum retardation values (expressed in nm) thereof.

(3) An optical film as described in the above (1) or (2), wherein at least one of Re and Rth shows a change of from 0 to 20 nm upon stretching or shrinkage by 15% or more.

(4) An optical film as described in any of the above (1) to (3), wherein at least one of Re and Rth shows a change of from 0 to 10 nm upon stretching or shrinkage by 0% or more but less than 15%.

(5) An optical film as described in any of the above (1) to (4) which fulfils the following formula (IV):

$$|Re_{(400)} - Re_{(700)}| \leq 10 \text{ and } |Rth_{(400)} - Rth_{(700)}| \leq 35. \quad \text{(IV)}$$

(6) An optical film as described in any of the above (1) to (5), wherein the optical film is made of a cellulose acylate, the acyl substituents of the cellulose acylate are all acetyl groups, the total degree of substitution thereof is from 2.50 to 3.00, and the average degree of polymerization thereof is from 180 to 700.

(7) An optical film as described in any of the above (1) to (5), wherein the optical film comprises a cellulose acylate fulfilling all of the requirements specified by the following formulae (SE-1) to (SE-3):

$$2.50 \leq SA+SB \leq 3.00 \quad \text{(SE-1)}$$

$$0 \leq SA \leq 2.5 \quad \text{(SE-2)}$$

$$0.5 \leq SB \leq 3.00 \quad \text{(SE-3)}$$

wherein SA is a degree of substitution by acetyl group; and SB is a degree of substitution by substituted acyl group having from 3 to 22 carbon atoms.

(8) An optical film as described in any of the above (1) to (5), wherein the optical film comprises a norbornene polymer.

(9) An optical film as described in any of the above (1) to (8), wherein the coefficient of photoelasticity thereof is $25 \times 10^{-13}$ $cm^2$/dyne or less.

(10) An optical film as described in any of the above (1) to (9), wherein the contact angle of the alkali-saponified surface of the optical film is 55° or less.

(11) An optical compensation film, wherein an optical anisotropic layer having $Re_{(590)}$ of from 0 to 200 nm and $|Rth_{(590)}|$ of from 0 to 400 nm is laminated on an optical film as described in any of the above (1) to (10).

(12) An optical compensation film as described in the above (11), wherein the optical anisotropic layer contains a polymer film.

(13) An optical compensation film as described in the above (12) which is constructed by spreading and fixing a liquefied solid polymer on an optical film as described in any of the above (1) to (10) and subjecting the thus obtained laminate, which comprises a transparent film (nx≅ny) of the solidified matter and the optical film, to a stretching treatment and/or a shrinkage treatment.

(14) An optical compensation film as described in the above (13), wherein the stretching treatment and/or the shrinkage treatment are carried out at a temperature higher than the glass transition temperatures of the solid polymer and the optical film.

(15) An optical compensation film as described in the above (13) or (14) which is constructed by, before the spreading and fixation of a liquefied solid polymer on an optical film, subjecting the optical film to a stretching treatment and/or a shrinkage treatment, then spreading and fixing the liquefied solid polymer on the optical film and further subjecting the thus obtained laminate, which comprises a transparent film (nx≅ny) of the solidified matter and the optical film, to a stretching treatment and/or a shrinkage treatment.

(16) An optical compensation film as described in any of the above (13) to (15), wherein the stretching treatment and/or the shrinkage treatment of the laminate comprising the transparent film and the optical film is carried out in a state with a residual solvent content in the optical film of 1.5% by mass (% by weight) or less.

(17) An optical compensation film as described in any of the above (13) to (15), wherein the stretching treatment and/or the shrinkage treatment of the optical film before the spreading and fixation of a liquefied solid polymer on the optical film is carried out in a state with a residual solvent content in the optical film of 1.5% by mass or more but not more than 70% by mass.

(18) An optical compensation film as described in any of the above (13) to (17), wherein the residual solvent contents in the transparent film and the optical film in the laminate, which comprises the transparent film and the optical film, after the stretching treatment and/or the shrinkage treatment are each 1.5% by mass or less.

(19) An optical compensation film as described in any of the above (12) to (18), wherein the polymer film or a solid polymer is at least one member selected from among polyamide, polyimide, polyester, polyether ketone, polyaryl ether ketone, polyamide imide and polyester imide.

(20) An optical compensation film as described in any of the above (11) to (19), wherein the optical anisotropic layer is formed by using a polymer showing negative birefringence.

(21) A polarizing plate, wherein at least one film selected from among optical films as described in the above (1) to (10) and optical compensation films as described in the above (11) to (20) is employed as at least one of protective films of a polarizer.

(22) A liquid crystal display unit, wherein use is made of an optical film as described in any of the above (1) to (10), an optical compensation film as described in any of the above (11) to (20) or a polarizing plate as described in the above (21).

(23) A liquid crystal display unit as described in the above (22), wherein the vA mode is employed.

(24) A self luminous display unit, wherein use is made of an optical film as described in any of the above (1) to (10), an optical compensation film as described in any of the above (11) to (20) or a polarizing plate as described in the above (21).

According to the invention, it is possible to provide an optical film having a low optical anisotropy and a small wavelength dispersion. By using the optical film according to the invention as a support of an optical compensation film, further, the optical performance of the optical compensation film per se can be exhibited. By using the optical film according to the invention as a protective film of a polarizing plate, furthermore, the optical characteristics of the polarizing plate can be improved. By using these polarizing plate and optical compensation film in display units such as a liquid crystal display unit, viewing angle characteristics can be improved and facial irregularities can be relieved.

BEST MODE FOR CARRYING OUT THE INVENTION

Next, the optical film according to the invention will be illustrated in detail.

The optical film according to the invention is characterized in that Re(λ) and Rth(λ) fulfill the following formulae:

$$0 \leq Re_{(590)} \leq 10 \text{ and } |Rth_{(590)}| \leq 25$$

wherein Re(λ) is a retardation value in plane (expressed in nm) at the wavelength of λ nm; and Rth(λ) is a retardation value in the film thickness direction (expressed in nm) at the wavelength of λ nm.

Concerning the retardation values of the optical film according to the invention, it is preferable that $0 \leq Re_{(590)} \leq 5$ and $|Rth_{(590)}| \leq 10$, still preferably $0 \leq Re_{(590)} \leq 2$ and $|Rth_{(590)}| \leq 3$.

By controlling the retardation values of the optical film within the ranges as specified above, it is possible to achieve an effect that the color change depending on a change in viewing angle can be lessened.

The optical film according to the invention is constructed by using a polymer material. Examples of the polymer material include acetate polymers, polyether sulfone, polysulfone, polycarbonate, polynorbornene, polyolefin, acrylic polymers, cellulose resins, polyarylate, polystyrene, polyvinyl alcohol, polyvinyl chloride, polyvinylidene chloride, liquid crystal polymers, and thermosetting and UV-setting resins of acrylic type, urethane type, acrylurethane type, epoxy type, silicone type, etc. Cellulose acylate is particularly preferred.

[Starting Cotton Material for Synthesizing Cellulose Acylate]

Examples of the starting cellulose to be used for synthesizing the cellulose acylate in the invention include cotton linter and wood pulp (hardwood pulp and softwood pulp). Use can be made of cellulose acylate obtained from any cellulose material and a mixture is also usable in some cases. These starting cotton materials are described in detail in, for example, *Purasuchikku Zairyo Koza* (17), *Senisokei Jushi* (Marusawa and Uda, The Nikkan Kogyo Shinbun, Ltd., 1970) and Japan Institute of Invention and Innovation Journal of Technical Disclosure No. 2001-1745, p. 7 to 8. Namely, use may be made of cellulose materials reported therein and the material of the cellulose acylate film of the invention is not particularly restricted.

[Degree of Substitution in Cellulose Acylate]

Now, the cellulose acylate preferably usable in the optical film according to the invention which is produced starting with the cellulose material as described above will be illustrated. In the cellulose acylate preferable in the invention, hydroxyl groups in cellulose have been acylated. As the substituents, use may be made of acetyl groups having from 2 to 22 carbon atoms. In the cellulose acylate to be used in the invention, the degree of substitution of hydroxyl groups in the cellulose is not particularly restricted. The substitution degree can be determined by measuring the degree of binding of acetic acid or fatty acids having from 3 to 22 carbon atoms substituting hydroxyl groups in cellulose and calculating. The measurement can be carried out in accordance with ASTM D-817-91.

As described above, the degree of substitution of hydroxyl groups in the cellulose is not particularly restricted in the cellulose acylate to be used in the invention. It is preferable that the degree of substitution of hydroxyl group by acyl group is from 2.50 to 3.00, still preferably from 2.75 to 3.00 and still preferably from 2.85 to 3.00.

Among the acetic acid or fatty acids having from 3 to 22 carbon atoms substituting hydroxyl groups in cellulose, the acyl group having from 2 to 22 carbon atoms may be an aliphatic group or an allyl group without restriction. Either a single group or a mixture of two or more groups may be used. Use may be made of, for example, alkylcarbonyl esters, alkenylcarbonyl esters, aromatic carbonyl esters and aromatic alkylcarbonyl esters of cellulose each optionally having additional substituents. Preferable examples of the acyl group include acetyl, propionyl, butyryl, heptanoyl, hexanoyl, octanoyl, decanoyl, dodecanoyl, tridecanoyl, tetradecanoyl, hexadecanoyl, octadecanoyl, iso-butyryl, t-butyryl, cyclohexanecarbonyl, oleoyl, benzoyl, naphthylcarbonyl and cinnamoyl groups. Among them, acetyl, propionyl, butyryl, dodecanoyl, octadecanoyl, t-butyryl, oleoyl, benzoyl, naphthylcarbonyl cinnamoyl groups are preferable, and acetyl, propionyl and butanoyl groups are still preferable.

In the case where the acyl substituent is not restricted to acetyl group alone, it is also preferable in the invention to use cellulose acylate fulfilling all of the requirements as specified by the following formulae (SE-1) to (SE-3).

$2.50 \leq SA+SB \leq 3.00$    Formula (SE-1)

$0 \leq SA \leq 2.5$    Formula (SE-2)

$0.5 \leq SB \leq 3.00$    Formula (SE-3)

In the above formulae (SE-1) to (SE-3), SA is a degree of substitution by acetyl group; and SB is a degree of substitution by substituted acyl group having from 3 to 22 carbon atoms.

The term "degree of substitution by acyl group" as used herein means the sum of esterification ratios at the 2-, 3- and 6-positions of cellulose (i.e., degree of substitution of 1 indicating 100% esterification). In the invention, it is preferable that $2.75 \leq SA+SB \leq 3.00$, still preferably $2.85 \leq SA+SB \leq 2.97$. Concerning SA, it is also preferable that $0 \leq SA \leq 2.20$, still preferably $0 \leq SA \leq 2.0$. Concerning SB, it is also preferable that $0.80 \leq SB \leq 2.97$, still preferably $1.25 \leq SB \leq 2.97$. Although the degrees of substitution of hydroxyl groups at the 2-, 3- and 6-positions of cellulose are not particularly restricted in the invention, the degree of substitution of hydroxyl group at the 6-position is preferably 0.7 or more, still preferably 0.8 or more and still preferably 0.85 or more. Owing to the constitution, not only the degradation of the cellulose acylate caused by electron beam irradiation can be prevented but also the solubility and the moisture- and heat-resistances thereof can be improved.

The acyl group having from 3 to 22 carbon atoms represented by the substituent SB in the cellulose acylate according to the invention may be either an aliphatic acyl group or an aromatic acyl group. In the case where the acyl group in the cellulose acylate according to the invention is an aliphatic acyl group, it preferably has from 3 to 18 carbon atoms, still preferably from 3 to 12 carbon atoms and still preferably from 3 to 8 carbon atoms. Examples of such aliphatic acyl groups include alkylcarbonyl groups, alkenylcarbonyl groups and alkynylcarbonyl groups. In the case where the acyl group in the cellulose acylate according to the invention is an aromatic acyl group, it preferably has from 6 to 22 carbon atoms, still preferably from 6 to 18 carbon atoms and still preferably from 6 to 12 carbon atoms.

Each of these acyl groups may have a substituent. Preferable examples of the acyl group include propionyl, butanoyl, butyryl, heptanoyl, hexanoyl, octanoyl, decanoyl, dodecanoyl, tridecanoyl, tetradecanoyl, hexadecanoyl, octadecanoyl, iso-butyryl, t-butyryl, cyclohexanecarbonyl, oleoyl, benzoyl, naphthalenecarbonyl, phthaloyl and cinnamoyl groups. Among them, propionyl, butyryl, dodecanoyl, octadecanoyl, t-butyryl, oleoyl, benzoyl, naphthylcarbonyl and cinnamoyl groups are preferable, and acetyl, propionyl and butyryl groups are still preferable.

Preferable examples of the cellulose acylate according to the invention fulfilling all of the formulae (SE-1) to (SE-3) include cellulose propionate, cellulose acetate propionate, cellulose acetate butyrate, cellulose propanoate butyrate, cellulose acetate propionate butyrate, cellulose acetate hexanoate, cellulose acetate octanoate, cellulose acetate cyclohexanoate, cellulose acetate decanoate, cellulose acetate adamantane carboxylate, cellulose acetate sulfate, cellulose acetate carbamate, cellulose propionate sulfate, cellulose acetate propionate sulfate, cellulose acetate phthalate and so on. Still preferable examples thereof include cellulose propionate, cellulose acetate propionate, cellulose butyrate, cellulose acetate butyrate, cellulose propanoate butyrate, cellulose acetate hexanoate, cellulose acetate octanoate and so on. Still preferable examples thereof include cellulose propionate, cellulose butyrate, cellulose acetate propionate and cellulose acetate butyrate. In such a case, the degrees of substitution by acetyl group and an acyl group having 3 or more carbon atoms respectively fall within the ranges as defined above. Desired characteristics (in particular, optical characteristics) can be obtained depending on the substitution degrees.

AS the results of intensive studies, the inventors have found out that the optical anisotropy of a cellulose acylate film can be lowered in the case where the acyl substituents substituting hydroxyl groups in cellulose as discussed above comprise substantially at least two members selected from among acetyl, propionyl and butyryl groups and the total degree of substitution is from 2.50 to 3.00. The degree of substitution by acyl group preferably ranges from 2.75 to 3.00, still preferably from 2.85 to 3.00.

[Degree of Polymerization of Cellulose Acylate]

The degree of polymerization (expressed in viscosity-average degree of polymerization) of the cellulose acylate preferably used in the invention ranges from 180 to 700. In cellulose acetate, the degree of polymerization preferably ranges from 180 to 550, still preferably from 180 to 400 and particularly preferably from 180 to 350. In the case where the degree of polymerization is too high, a dope solution of the cellulose acylate has a high viscosity and, in its turn, a film can be hardly formed by casting. An average degree of polymerization can be measured by the limiting viscosity method (Kazuo Uda & Hideo Saito, *SEN-I GAKKAISHI*, Vol. 18, No. 1, p. 105-120, 1962). This method is reported in greater detail in JP-A-9-95538.

The molecular weight distribution of the cellulose acylate according to the invention is evaluated by gel permeation chromatography. A smaller polydispersity index Mw/Mn (Mw: mass-average molecular weight, Mn: number-average molecular weight) and a narrower molecular weight distribution are preferred. More specifically speaking, Mw/Mn preferably ranges from 1.0 to 3.0, still preferably from 1.0 to 2.0 and most desirably from 1.0 to 1.6.

When low-molecular weight components are removed, the average molecular weight (degree of polymerization) is elevated but the viscosity becomes lower than common cellulose acylates, thereby becoming useful. Cellulose acylate containing less low-molecular weight components can be obtained by removing the low-molecular weight components from cellulose acylate synthesized by a conventional method. The low-molecular weight components can be removed by washing cellulose acylate with an appropriate organic solvent. In the case of producing cellulose acylate containing less low-molecular weight components, it is preferable to control the amount of the sulfuric acid catalyst in the acetylation to 0.5 to 25 parts by mass per 100 parts by mass of cellulose acylate. By controlling the amount of the sulfuric acid catalyst within the range as described above, it is possible to synthesize cellulose acylate favorable from the viewpoint of molecular weight distribution (i.e., having a uniform of molecular weight distribution). In the production of cellulose acylate according to the invention, use is made of cellulose acylate having a water content ratio of preferably 2% by mass or less, still preferably 1% by mass or less and particularly preferably 0.7% by mass or less. In general, cellulose acylate contains water and it is known that the water content ratio thereof ranges from 2.5 to 5% by mass. To regulate to this water content ratio of cellulose acylate in the invention, it is required to dry the cellulose acylate. The drying method is not particularly restricted, so long as the desired water content ratio can be established thereby. To obtain cellulose acylate usable in the invention, use can be made of the starting cotton material and the synthesis method described in detail in Japan Institute of Invention and Innovation Journal of Technical Disclosure No. 2001-1745 (2001 Mar. 15, Japan Institute of Invention and Innovation), p. 7 to 12. As the cellulose acylate to be used in the invention, use can be also made of a mixture of two or more cellulose acylates so long as these cellulose acylates fulfill the requirements in substituent, degree of substitution, degree of polymerization, molecular weight distribution and so on as described above.

In the invention, it is preferable to use cellulose acylate that comprises acetyl groups alone as the acyl substituents and has a total degree of substitution of from 2.50 to 3.00 and an average degree of polymerization of from 180 to 700.

[Additives to Cellulose Acylate]

To a cellulose acylate solution according to the invention, it is possible to add various additives (for example, a compound lowering optical anisotropy, a wavelength dispersion regulator, a UV-blocking agent, a plasticizer, an antidegradant, fine particles, an optical characteristic-controlling agent, etc.) depending on purpose in individual steps of the production. Now, these additives will be illustrated. These additives may be added in the step of preparing the dope. Alternatively, a step of adding the additives may be provided in the final step of preparing the dope.

[Structural Characteristic of Compound Lowering Optical Anisotropy of Optical Film]

Now, the compound lowering optical anisotropy of an optical film, in particular, a cellulose acylate film will be illustrated. As the results of intensive studies, the inventors sufficiently lowered the optical anisotropy by using a compound inhibiting the orientation of cellulose acylate in a film in plane and in the film thickness direction, thereby reducing Re to zero and Rth close to zero. For this purpose, it is advantageous to employ a compound lowering optical anisotropy which is sufficiently compatible with cellulose acylate and has neither a rod-like structure nor a planar structure by itself. In the case of having a plural number of planar functional groups such as aromatic groups, more specifically speaking, a nonplaner structure having these functional groups not on a single plane is advantageous.

As examples of the compound lowering optical anisotropy of cellulose acylate film, compounds represented by the following formulae (1) to (19) may be cited.

(1)

In the above formula, $R^{11}$ to $R^{13}$ independently represent each an aliphatic group having from 1 to 20 carbon atoms. $R^{11}$ to $R^{13}$ may be bonded together to form a ring.

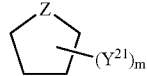
(2)

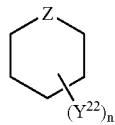
(3)

In the formulae (2) and (3), Z represents a carbon atom, an oxygen atom, a sulfur atom or —$NR^{25}$— wherein $R^{25}$ represents a hydrogen atom or an alkyl group. The 5- or 6-membered ring containing Z may have a substituent. $Y^{21}$ and $Y^{22}$ independently represent each an ester group, an alkoxycarbonyl group, an amido group or a carbanoyl group having from 1 to 20 carbon atoms. $Y^{21}$ and $Y^{22}$ may be bonded together to form a ring. m is an integer of from 1 to 5, while n is an integer of from 1 to 6.

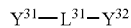
(4)

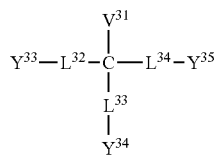
(5)

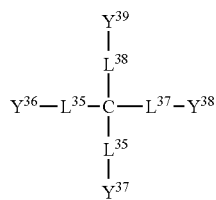
(6)

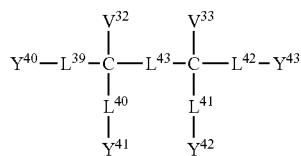
(7)

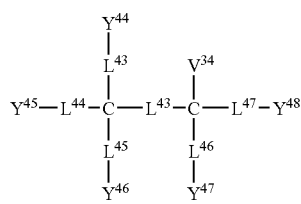
(8)

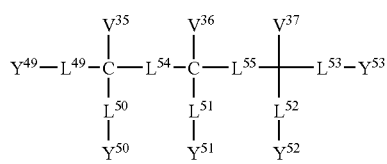
(9)

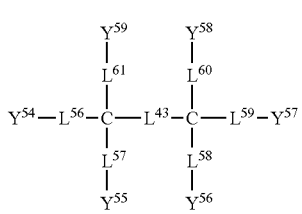
(10)

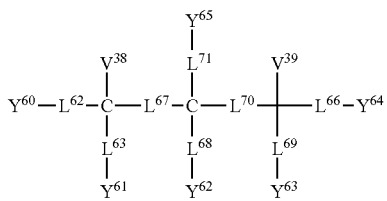
(11)

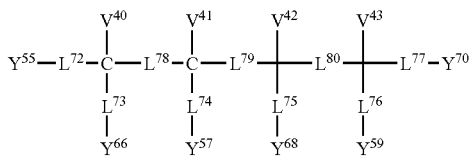
(12)

In the formulae (4) to (12), $Y^{31}$ to $Y^{70}$ independently represent each an ester group having from 1 to 20 carbon atoms, an alkoxy carbonyl group having from 1 to 20 carbon atoms, an amido group having from 1 to 20 carbon atoms, a carbamoyl group having from 1 to 20 carbon atoms or a hydroxy group. $V^{31}$ to $V^{43}$ independently represent each a hydrogen atom or an aliphatic group having from 1 to 20 carbon atoms. $L^{31}$ to $L^{80}$ independently represent each a divalent saturated linking group having from 0 to 40 atoms including from 0 to 20 carbon atoms. $L^{31}$ to $L^{80}$ having 0 atom means that groups located at both ends of the linking group directly form a single bond. $V^{31}$ to $V^{43}$ and $L^{31}$ to $L^{80}$ may further have a substituent.

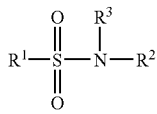
(13)

In the above formula, $R^1$ represents an alkyl group or an aryl group. $R^2$ and $R^3$ independently represent each a hydrogen atom, an alkyl group or an aryl group. $R^1$, $R^2$ and $R^3$ have 10 or more carbon atoms in total and each of these groups may have a substituent.

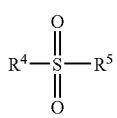
(14)

In the above formula, $R^4$ and $R^5$ independently represent each an alkyl group or an aryl group. $R^4$ and $R^5$ have 10 or more carbon atoms in total and each of these groups may have a substituent.

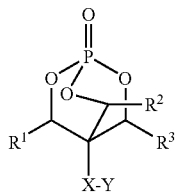
(15)

In the above formula, $R^1$, $R^2$ and $R^3$ independently represent each a hydrogen atom or an alkyl group. X represents a divalent linking group formed by one or more groups selected from the following group 1 of linking groups. Y represents an alkyl group, an aryl group or an aralkyl group. (Group 1 of linking groups) single bond, —O—, —CO—, —$NR^4$—, alkylene groups and arylene groups, wherein $R^4$ represents a hydrogen atom, an alkyl group, an aryl group or an aralkyl group.

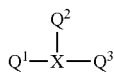
(16)

In the above formula, $Q^1$, $Q^2$ and $Q^3$ independently represent each a 5- or 6-membered ring. X represents B, C—R (wherein R represents a hydrogen atom or a substituent), N, P or P═O.

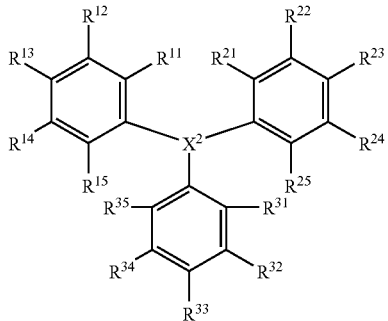
(17)

In the above formula, $X^2$ represents B, C—R (wherein R represents a hydrogen atom or a substituent) or N. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent each a hydrogen atom or a substituent.

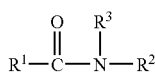
(18)

In the above formula, $R^1$ represents an alkyl group or an aryl group. $R^2$ and $R^3$ independently represent each a hydrogen atom, an alkyl group or all aryl group. The alkyl group and aryl group may have a substitutent.

Preferable examples of the compounds represented by the formula (18) are compounds represented by the formula (19).

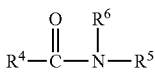
(19)

In the above formula (19), $R^4$, $R^5$ and $R^6$ independently represent each an alkyl group or an aryl group. The alkyl group may be a chain type, branched or cyclic alkyl group. The alkyl group preferably has from 1 to 20, still preferably from 1 to 15 and most desirably form 1 to 12, carbon atoms. As a cyclic alkyl group, a cyclohexyl group is particularly preferred. An aryl group preferably has from 6 to 36, still preferably from 6 to 24, carbon atoms.

The above-described alkyl group and aryl group may further have a substituent. Preferable examples of the substituent include halogen atoms (for example, chlorine, bromine, fluorine and iodine), alkyl groups, aryl groups, alkoxy groups, aryloxy groups, acyl groups, alkoxycarbonyl groups, aryloxycarbonyl groups, acyloxy groups, sulfonylamino groups, hydroxy group, cyano group, amino group and acylamino groups. Still preferable examples thereof include halogen atoms, alkyl groups, aryl groups, alkoxy groups, aryloxy groups, sulfonylamino groups and acylamino groups. Particularly preferable examples thereof include alkyl groups, aryl groups, sulfonylamino groups and acylamino groups.

[Additives to Optical Film]

The optical film according to the invention may be produced by hot-melting a thermoplastic polymer resin cited above as a polymer material and then film-forming. Alternatively, it may be produced by the solution film-forming method (solvent cast method) with the use of a solution in which a polymer is uniformly dissolved. In the case of the hot melt film-formation, it is possible to add various additives (for example, a compound lowering optical anisotropy, a wavelength dispersion regulator, a UV-blocking agent, a plasticizer, an antidegradant, fine particles, an optical characteristic-controlling agent, etc.) in the hot melt step. In the case of producing the optical film from a solution, on the other hand, it is possible to add various additives (for example, a compound lowering optical anisotropy, a wavelength dispersion regulator, a UV-blocking agent, a plasticizer, an antidegradant, fine particles, an optical characteristic-controlling agent, etc.) to the polymer solution (hereinafter called a dope) depending on purpose in individual steps of the production. Now, these additives will be illustrated. These additives may be added in the step of preparing the dope. Alternatively, a step of adding the additives may be provided in the final step of preparing the dope.

[Compound Lowering Optical Anisotropy of Optical Film]

One of the characteristics of the optical film according to the invention resides in containing at least one compound represented by the following formula (i), which lowers the retardation value in the film thickness direction Rth, within such a range as fulfilling the requirements as specified by the following formulae (ii) and (iii).

$$Rth=((nx+ny)/2-nz)\times d \qquad (i)$$

$$(Rth(A)-Rth(0))/A \leq -1.0 \qquad (ii)$$

$$0.1 \leq A \leq 30. \qquad (iii)$$

Concerning the above formulae (ii) and (iii), it is preferable that (ii) $(Rth(A)-Rth(0))/A \leq -2.0$ and (iii) $0.1 \leq A \leq 25$, still preferably (ii) $(Rth(A)-Rth(0))/A \leq -3.0$ and (iii) $0.1 \leq A \leq 20$.

In the above formulae, Rth(A) is Rth (nm) of a film containing A % of the compound lowering Rth; Rth(0) is Rth (nm) of a film containing no compound lowering Rth; and A is the mass (%) of the compound referring the mass of the polymer employed as the film material as to 100.

(Log P Value)

To produce the optical film, in particular, the cellulose acylate film according to the invention, it is preferable to employ, from among the compounds which prevent cellulose acylate in the film from orientation in-plane and in the film thickness direction to thereby lower optical anisotropy, a compound having an octanol-water partition coefficient (log P value) of from 0 to 7. A compound having a log P value exceeding 7 has a poor compatibility with cellulose acylate and thus frequently results in clouding or blooming of the film. A compound having a log P value less than 0 has highly hydrophilic nature which sometimes worsens the water resistance of the cellulose acylate film. It is still preferable that the log P value ranges from 1 to 6, particularly preferably from 1.5 to 5.

The octanol-water partition coefficient (log P value) can be measured by the flask shaking method in accordance with JIS Z7260-107 (2000). It is also possible to estimate the octanol-water partition coefficient (log P value) by using not practical measurement but a computational or empirical method. As the computational method, use may be preferably made of Crippen's fragmentation method (J. Chem. Inf. Comput. Sci., 27, 21 (1987)), Viswanadhan's fragmentation method (J. Chem. Inf. Comput. Sci., 29, 163 (1989)), Broto's fragmentation method (Eur. J. Med. Chem.-Chim. Theor., 19, 71 (1984)) and so on. It is still preferable to employ Crippen's fragmentation method (J. Chem. Inf. Comput. Sci., 27, 21 (1987)). In the case where the log P value of a compound determined by the measurement method differs from its calculated value, it is favorable to judge whether or not the compound falls within the desired range with the use of Crippen's fragmentation method.

[Physical Properties of Compound Lowering Optical Anisotropy]

The compound lowering optical anisotropy may either contain an aromatic group or not. It is preferable that the compound lowering optical anisotropy has a molecular weight of 150 or more but not more than 3000, still preferably 170 or more but not more than 2000 and still preferably 200 or more but not more than 1000. So long as the molecular weight falls within this range, the compound may have either a specific monomer structure or an oligomer or polymer structure composed of a plural number of the monomer units bonded together.

It is preferable that the compound lowering optical anisotropy is a liquid at 25° C. or a solid having a melting point of from 25 to 250° C. A compound which is a liquid at 25° C. or a solid having a melting point of from 25 to 200° C. is still preferred. It is also preferable that the compound lowering optical anisotropy would not vaporize in the course of dope casting and drying in constructing the cellulose acylate film.

The compound lowering optical anisotropy is added preferably in an amount of from 0.01 to 30% by mass, still preferably from 1 to 25% by mass and particularly preferably from 5 to 20% by mass based on the solid cellulose acylate content.

A single compound may be used as the compound lowering optical anisotropy. Alternatively, use can be made of a mixture of two or more compounds at an arbitrary ratio.

The compound lowering optical anisotropy may be added at any step in preparing a dope. It may be added at the final step of the dope preparation.

The average content of the compound lowering optical anisotropy from the surface in at least one side to the part corresponding to 10% of the total film thickness amounts to 80 to 99% of the average content of the compound at the center of the cellulose acylate film. The content of the compound may be determined by quantifying the compound on the surface and at the center by, for example, an infrared spectrometry method described in JP-A-8-57879.

Now, specific examples of the compound lowering optical anisotropy of the cellulose acylate film to be used in the invention will be illustrated, though the invention is not restricted to these compounds.

First, compounds of the formula (1) will be described.

In the formula (1), $R^{11}$ to $R^{13}$ independently represent each an aliphatic group having from 1 to 20 carbon atoms. $R^{11}$ to $R^{13}$ may be bonded together to form a ring.

Now, $R^{11}$ to $R^{13}$ will be illustrated in greater detail. $R^{11}$ to $R^{13}$ independently represent each an aliphatic group having from 1 to 20, preferably from 1 to 16 and still preferably from 1 to 12, carbon atoms. The term "aliphatic group" as used herein preferably means an aliphatic hydrocarbon group, still preferably an alkyl group (including chain type, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamancyl, bicyclo[2.2.2]octan-3-yl and so on. Examples of the alkenyl group include vinyl, allyl, prenyl, geranyl, oleyl, 2-cyclopenten-1-yl, 2-cyclohexen-1-yl and so on. Examples of the alkynyl group include ethynyl and propargyl and so on.

The aliphatic groups represented by $R^{11}$ to $R^{13}$ may be substituted. Examples of the substituent include halogen atoms (for example, chlorine, bromine, fluorine and iodine), alkyl groups (including chain type, branched and cyclic alkyl groups, bicycloalkyl groups and active methine group), alkenyl groups, alkynyl groups, aryl groups, heterocyclic groups (at any substitution site), acyl groups, alkoxycarbonyl groups, aryloxycarbonyl groups, heterocyclic oxycarbonyl groups, carbamoyl groups, N-acylcarbamoyl groups, N-sulfonylcarbamoyl groups, N-carbamoylcarbamoyl groups, N-sulfamoylcarbamoyl groups, carbazole group, carboxy group or its salt, oxalyl group, oxamoyl group, cyano group, carbonimidoyl group, formyl group, hydroxy group, alkoxy groups (including ethyleneoxy group or propyleneoxy group repeating units), aryloxy groups, heterocyclicoxy groups, acyloxy groups, (alkoxy or aryloxy) carbonyloxy groups, carbamoyloxy group, sulfonyloxy group, amino group, (alkyl, aryl or heterocyclic) amino groups, acylamino groups, sulfonamido group, ureido groups, thioureido groups, imido group, (alkoxy or aryloxy) carbonylamino groups, sulfamoylamino group, semicarbazide group, ammonio group, oxamoylamino group, N-(alkyl or aryl) sulfonylureido groups, N-acylureido groups, N-acylsulfamoyl groups, heterocyclic groups having quaterized nitrogen atom (for example, pyridinio group, imidazolio group, quinolynio group and isoquinolinio group), isocyano group, imino group, (alkyl or aryl) sulfonyl groups, (alkyl or aryl) sulfinyl groups, sulfo group or its salts, sulfamoyl groups, N-acylsulfamoyl groups, N-sulfonylsulfamoyl groups or its salts, phosphino group, phosphinyl group, phosphinyloxy group, phosphinylamino group, silyl group and so on.

Moreover, these groups may be combined together to from a composite substituent. Examples of such substituents include ethoxyethoxyethyl group, hydroxyethoxyethyl group, ethoxycarbonylethyl group and so on. $R^{11}$ TO $R^{13}$ may further have phosphate group as a substituent. The compounds of formula (1) may have a plural number of phosphate groups per molecule.

Next, the compounds of the formulae (2) and (3) will be described.

In the formulae (2) and (3), Z represents a carbon atom, an oxygen atom, a sulfur atom or —$NR^{25}$ wherein $R^{25}$ represents a hydrogen atom or an alkyl group. The 5- or 6-membered-ring having Z may have a substituent. A plural number of substituents may be bonded together to form a ring. Examples of the 5- or 6-membered ring having Z include tetrahydrofuran, tetrahydropyran, tetrahydrothiophene, thiane, pyrrolidine, piperidine, indoline, isoindoline, chroman, isochroman, tetrahydro-2-furanone, tetrahydro-2-pyrone, 4-butane lactam, 6-hexanolactam and so on.

The 5- or 6-membered ring having Z includes a lactone structure or a lactam structure, i.e., a cyclic ester or cyclic amide structure having an oxo group at the carbon atom adjacent to Z. Examples of such cyclic ester or cyclic amide structure include 2-pyrrolidone, 2-piperidone, 5-pentanolide and 6-hexanolide.

$R^{25}$ represents a hydrogen atom or an alkyl group (including chain type, branched and cyclic alkyl groups) preferably having from 1 to 20 carbon atoms, still preferably from 1 to 16 carbon atoms and particularly preferably form 1 to 12 carbon atoms. Examples of the alkyl group represented by $R^{25}$ include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamancyl, bicyclo[2.2.2]octan-3-yl and so on. The alkyl group represented by $R^{25}$ may be substituted. As examples of the substituent, those described above as examples of substituents of $R^{11}$ to $R^{13}$ may be cited.

$Y^{21}$ and $Y^{22}$ independently represent each an ester group, an alkoxycarbonyl group, an amido group or a carbamoyl group. The ester group preferably has from 1 to 20 carbon atoms, still preferably from 1 to 16 carbon atoms and particularly preferably from 1 to 12 carbon atoms. Examples thereof include acetoxy, ethylcarbonyloxy, propylcarbonyloxy, n-butylcarbonyloxy, iso-butylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantancarbonyloxy and so on. The alkoxycarbonyl group preferably has from 1 to 20 carbon atoms, still preferably from 1 to 16 carbon atoms and particularly preferably from 1 to 12 carbon atoms. Examples thereof include methoxycarbonyl, ethoxycarbonyl, n-propyloxycarbonyl, isopropyloxycarbonyl, n-butoxycarbonyl, t-butoxycarbonyl, iso-butoxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl and so on. The amido group preferably has from 1 to 20 carbon atoms, still preferably from 1 to 16 carbon atoms and particularly preferably from 1 to 12 carbon atoms. Examples thereof include acetamido, ethylcarboxamido, n-propylcarboxamido, isopropylcarboxamido, n-butylcarboxamido, t-butylcarboxamido, iso-butylcarboxamido, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamido, n-hexadecylcarboxamido and so on. The carbamoyl group preferably has from 1 to 20 carbon atoms, still preferably from 1 to 16 carbon atoms and particularly preferably from 1 to 12 carbon atoms. Examples thereof include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl and so on. $Y^{21}$ and $Y^{22}$ may be bonded together to form a ring. $Y^{21}$ and $Y^{22}$ may further have a substituent. As examples of the substituent, those described above as examples of substituents of $R^{11}$ to $R^{13}$ may be cited. m is from 1 to 5, while n is from 1 to 6.

Next, the compounds of the formulae (4) to (12) will be described.

In the formulae (4) to (12), $Y^{31}$ to $Y^{70}$ independently represent each an ester group, an alkoxycarbonyl group, an amido group, a carbamoyl group or a hydroxy group. The ester group preferably has from 1 to 20 carbon atoms, still preferably from 1 to 16 carbon atoms and particularly preferably from 1 to 12 carbon atoms. Examples thereof include acetoxy, ethylcarbonyloxy, propylcarbonyloxy, n-butylcarbonyloxy, iso-butylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantancarbonyloxy and so on. The alkoxycarbonyl group preferably has from 1 to 20 carbon atoms, still preferably from 1 to 16 carbon atoms and particularly preferably from 1 to 12 carbon atoms. Examples thereof include methoxycarbonyl, ethoxycarbonyl, n-propyloxycarbonyl, isopropyloxycarbonyl, n-butoxycarbonyl, t-butoxycarbonyl, iso-butoxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl and so on. The amido group preferably has from 1 to 20 carbon atoms, still preferably from 1 to 16 carbon atoms and particularly preferably from 1 to 12 carbon atoms. Examples thereof include acetamido, ethylcarboxamido, n-propylcarboxamido, isopropylcarboxamido, n-butylcarboxamido, t-butylcarboxamido, iso-butylcarboxamido, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamido, n-hexadecylcarboxamido and so on. The carbamoyl groups preferably has from 1 to 20 carbon atoms, still preferably from 1 to 16 carbon atoms and particularly preferably from 1 to 12 carbon atoms. Examples thereof include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl and so on. $Y^{31}$ to $Y^{70}$ may further have a substituent. As examples of the substituent, those described above as examples of substituents of $R^{11}$ to $R^{13}$ may be cited.

$V^{31}$ to $V^{43}$ independently represent each an aliphatic group having from 1 to 20, preferably from 1 to 16 and still preferably from 1 to 12, carbon atoms. The term "aliphatic group" as used herein preferably means an aliphatic hydrocarbon group, still preferably an alkyl group (including chain type, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamancyl, bicyclo[2.2.2]octan-3-yl and so on. Examples of the alkenyl group include vinyl, allyl, prenyl, geranyl, oleyl, 2-cyclopenten-1-yl, 2-cyclohexen-1-yl and so on. Examples of the alkynyl group include ethynyl and propargyl and so on. $V^{31}$ to $V^{43}$ may further have a substituent. As examples of the substituent, those described above as examples of substituents of $R^{31}$ to $R^{43}$ may be cited.

$L^{31}$ to $L^{80}$ independently represent each a divalent saturated linking group having from 0 to 40 atoms including from 0 to 20 carbon atoms. $L^{31}$ to $L^{80}$ having 0 atom means that groups located at both ends of the linking group directly form a single bond. Preferable examples of $L^{31}$ to $L^{80}$ include alkylene groups (for example, methylene, ethylene, propylene, trimethylene, tetramethylene, pentamethylene, hexamethylene, methylethylene, ethylethylene and so on), cyclic divalent groups (for example, cis-1,4-cyclohexylene, trans-1,4-cyclohexylene, 1,3-cyclopentylidene and so on), ethers, thioethers, esters, amides, sulfone, sulfoxide, sulfide, sulfonamide, ureilene, thioureilene and so on. These divalent groups may be bonded together to form a divalent complex group. Examples of such complex substituents include —(CH$_2$)$_2$—O—(CH$_2$)$_2$—, —(CH$_2$)$_2$—O—(CH$_2$)$_O$(CH$_2$)—, —(CH$_2$)$_2$S(CH$_2$)$_2$—, —(CH$_2$)$_2$O$_2$C(CH$_2$)$_2$— and so on. $L^{31}$ to $L^{80}$ may further have a substituent. As examples of the substituent, those described above as examples of substituents of $R^{11}$ to $R^{13}$ may be cited.

Preferable examples of the compound formed by combining $Y^{31}$ to $Y^{70}$, $V^{31}$ to $V^{43}$ and $L^{31}$ to $L^{80}$ in the formulae (4) to (12) include citric acid esters (for example, triethyl o-acetylcitrate, tributyl o-acetylcitrate, acetyltriethyl citrate, acetyltributyl citrate, tri(ethyl oxycarbonylmethylene) o-acetylcitrate and so on), oleic acid esters (for example, ethyl oleate, butyl oleate, 2-ethylhexyl oleate, phenyl oleate, cyclohexyl oleate, octyl oleate and so on), ricinolic acid esters (for example, methylacetyl ricinolate and so on), sebacic acid esters (for example, dibutyl sebacate and so on), glycerol carboxylic acid esters (for example, triacetin, tributylin and so on), glycolic acid esters (for example, butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate, octylphthalyloctyl glycolate and so on), pentaerythritol carboxylic acid esters (for example, pentaerythritol tetraacetate, pentaerythritol tetrabutyrate and so on), dipentaerythritol carboxylic acid esters (for example, dipentaerythritol hexaacetate, dipentaerythritol hexabutyrate, dipentaerythritol tetraacetate and so on), trimethylolpropane carboxylic acid esters (for example, trimethylolpropane triacetate, trimethylolpropane diacetate monopropionate, trimethylolpropane tripropionate, trimethylolpropane tributyrate, trimethylolpropane tripivaloate, trimethylolpropane tri(t-butylacetate), trimethylolpropane di-2-ethylhexanate, trimethylolpropane tetra-2-ethylhexanate, trimethylolpropane diacetate monooctanoate, trimethylolpropane trioctanoate, trimethylolpropane tri(cyclohexanecarboxylate) and so on), glycerol esters described in JP-A-11-246704, diglycerol esters described in JP-A-2000-63560, citric acid esters described in JP-A-11-92574, pyrrolidonecarboxylic acid esters (methyl 2-pyrrolidone-5-carboxylate, ethyl 2-pyrrolidone-5-carboxylate, butyl 2-pyrrolidone-5-carboxylate, 2-ethylhexyl 2-pyrrolidone-5-carboxylate), cyclohexanedicarboxylic acid esters (dibutyl cis-1,2-cyclohexanedicarboxylate, dibutyl trans-1,2-cyclohexanedicarboxylate, dibutyl cis-1,4-cyclohexanedicarboxylate, dibutyl trans-1,4-cyclohexanedicarboxylate and so on), xylitol carboxylic acid esters (xylitol pentaacetate, xylitol tetraacetate, xylitol pentapropionate and so on) and so on.

Next, examples of the compounds represented by the formulae (1) to (12) usable in the invention will be presented, though the invention is not restricted thereto. Compounds (C-1 to C-76) are examples of the compounds of the formula (1), while compounds (C-201 to C-231 and C-401 to C-448) are examples of the compounds of the formulae (2) to (12). log P values shown in the tables or given in the parentheses are determined by Crippen's fragmentation method (J. Chem. Inf. Comput. Sci., 27, 21 (1987)).

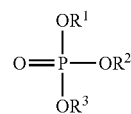

In the above formula, $R^1$ to $R^3$ have the same meanings as $R^{11}$ to $R^{13}$ in the above formula (1) and specific examples thereof will be shown concerning the following compounds C-1 to C-76.

| compound | $R^1$ | $R^2$ | $R^3$ | logP |
| --- | --- | --- | --- | --- |
| C-1 | $CH_3$ | $C_2H_5$ | $C_2H_5$ | 1.24 |
| C-2 | $C_2H_5$ | $C_2H_5$ | $C_2H_5$ | 1.58 |

-continued

| compound | R¹ | R² | R³ | logP |
|---|---|---|---|---|
| C-3 | $C_3H_7$ | $C_3H_7$ | $C_3H_7$ | 2.99 |
| C-4 | i-$C_3H_7$ | i-$C_3H_7$ | i-$C_3H_7$ | 2.82 |
| C-5 | $C_4H_9$ | $C_4H_9$ | $C_4H_9$ | 4.18 |
| C-6 | i-$C_4H_9$ | i-$C_4H_9$ | i-$C_4H_9$ | 4.2 |
| C-7 | s-$C_4H_9$ | s-$C_4H_9$ | s-$C_4H_9$ | 4.23 |
| C-8 | t-$C_4H_9$ | t-$C_4H_9$ | t-$C_4H_9$ | 3.06 |
| C-9 | $C_5H_{11}$ | $C_5H_{11}$ | $C_5H_{11}$ | 5.37 |
| C-10 | $CH_2C(CH_3)_3$ | $CH_2C(CH_3)_3$ | $CH_2C(CH_3)_3$ | 5.71 |
| C-11 | c-$C_5H_9$ | c-$C_5H_9$ | c-$C_5H_9$ | 4.12 |
| C-12 | 1-ethylpropyl | 1-ethylpropyl | 1-ethylpropyl | 5.63 |
| C-13 | $C_6H_{13}$ | $C_6H_{13}$ | $C_6H_{13}$ | 6.55 |
| C-14 | c-$C_6H_{11}$ | c-$C_6H_{11}$ | c-$C_6H_{11}$ | 5.31 |
| C-15 | $C_7H_{15}$ | $C_7H_{15}$ | $C_7H_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | $C_8H_{17}$ | $C_8H_{17}$ | $C_8H_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |
| C-21 | 1,3-dimethylbutyl | 1,3-dimethylbutyl | 1,3-dimethylbutyl | 6.41 |
| C-22 | 1-isopropyl-2-methylpropyl | 1-isopropyl-2-methylpropyl | 1-isopropyl-2-methylpropyl | 8.05 |
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclopentadienyl | 4.68 |
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |
| C-49 | 4-bromobutyl | 4-bromobutyl | 4-bromobutyl | 4.37 |
| C-50 | 4-bromohexyl | 4-bromohexyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH=CH_2$ | 4.19 |
| C-60 | $C_4H_9$ | $CH_2CH=CH_2$ | $CH_2CH=CH_2$ | 3.64 |
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP=O(OC_4H_9)_2$ | 6.66 |
| C-65 | $C_4H_9$ | $C_4H_9$ | $(CH_2)_3OP=O(OC_4H_9)_2$ | 6.21 |
| C-66 | $C_4H_9$ | $C_4H_9$ | $(CH_2)_2OP=O(OC_4H_9)_2$ | 6.16 |
| C-67 | $C_4H_9$ | $C_4H_9$ | $(CH_2)_2O(CH_2)_2OP=O(OC_4H_9)_2$ | 5.99 |
| C-68 | $C_6H_{13}$ | $C_6H_{13}$ | $(CH_2)_2O(CH_2)_2OP=O(OC_4H_9)_2$ | 7.58 |
| C-69 | $C_6H_{13}$ | $C_6H_{13}$ | $(CH_2)_4OP=O(OC_4H_9)_2$ | 8.25 |
| C-70 | c-$C_6H_{13}$ | c-$C_6H_{13}$ | $(CH_2)_2O(CH_2)_2OP=O(OC_4H_9)_2$ | 6.35 |
| C-71 | $C_6H_{12}Cl$ | $C_6H_{12}Cl$ | $(CH_2)_2O(CH_2)_2OP=O(OC_4H_9)_2$ | 7.18 |
| C-72 | $C_4H_8Cl$ | $C_4H_8Cl$ | $(CH_2)_2O(CH_2)_2OP=O(OC_4H_9)_2$ | 5.6 |
| C-73 | $C_4H_8Cl$ | $C_4H_8Cl$ | $(CH_2)_2O(CH_2)_2OP=O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

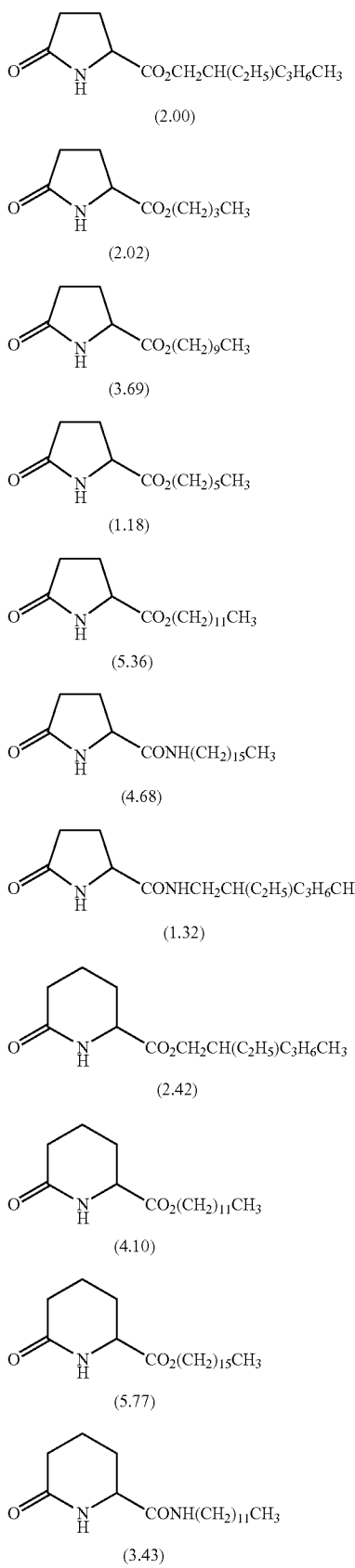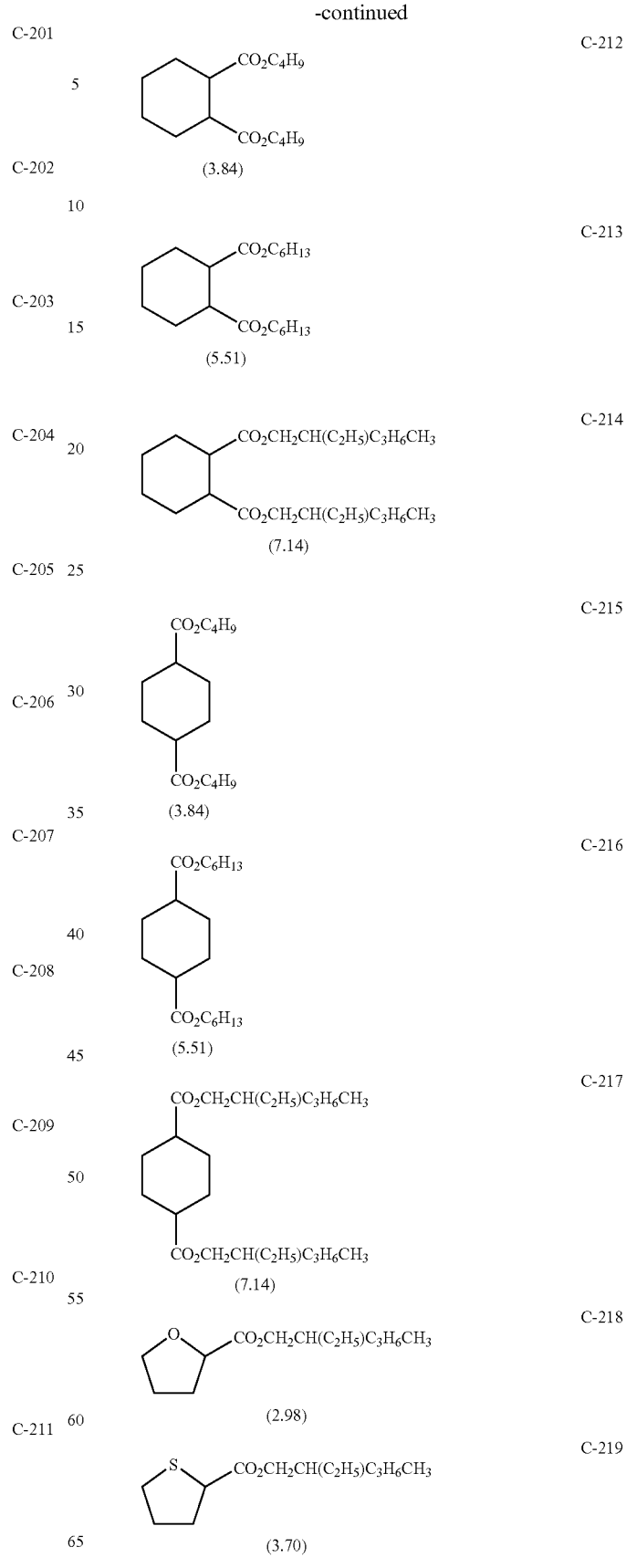

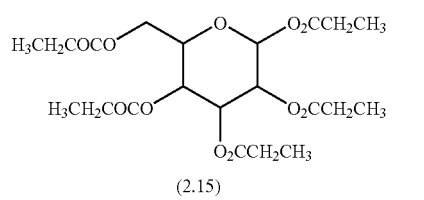
(2.15) C-220
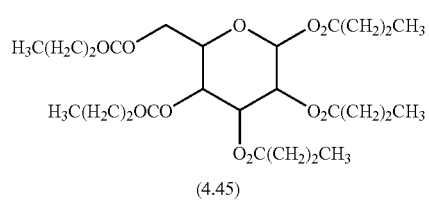
(4.45) C-221
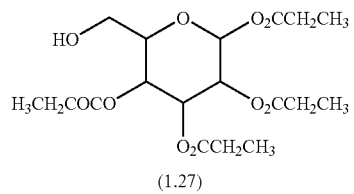
(1.27) C-222
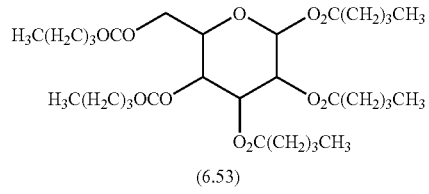
(6.53) C-223
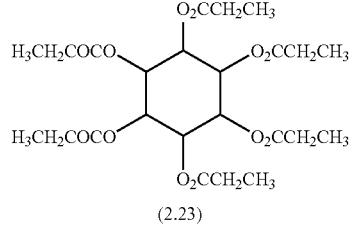
(2.23) C-224
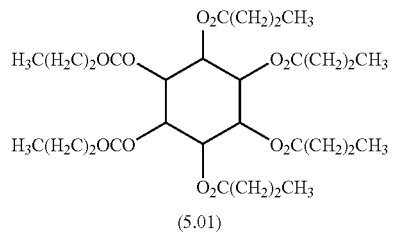
(5.01) C-225
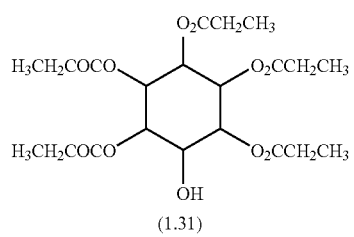
(1.31) C-226
C-227
O₂C(CH₂)₂CH₃
H₃C(H₂C)₂OC — O₂C(CH₂)₂CH₃
H₃C(H₂C)₂OC — O₂C(CH₂)₂CH₃
OH
(5.69)
C-228
H₃CH₂CO₂C — CO₂CH₂CH₃
H₃CH₂CO₂C — CO₂CH₂CH₃
(1.56)
C-229
H₃C(H₂C)₂O₂C — CO₂(CH₂)₂CH₃
H₃C(H₂C)₂O₂C — CO₂(CH₂)₂CH₃
(3.51)
C-230
H₃C(H₂C)₃O₂C — CO₂(CH₂)₃CH₃
H₃C(H₂C)₃O₂C — CO₂(CH₂)₃CH₃
(5.18)
C-231
Cyclohexyl—NHCOCH₂C(CH₂CH₃)(CH₂)₃CH₃
(3.90)
C-401
CO₂C₄H₉
|
CO₂C₄H₉
(2.37)
C-402
CO₂C₈H₁₇
|
CO₂C₈H₁₇
(5.71)
C-403
C₁₂H₂₅ — CO₂C₄H₉
         \
          CO₂C₄H₉
(7.53)
C-404
C₁₂H₂₅ — CO₂C₂H₅
         \
          CO₂C₂H₅
(5.72)

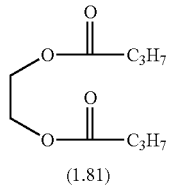
(1.81) C-405
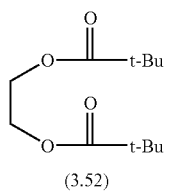
(3.52) C-406
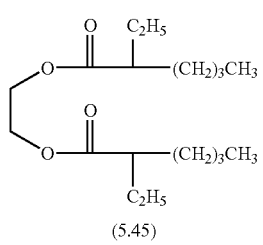
(5.45) C-407
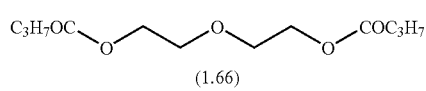
(1.66) C-408
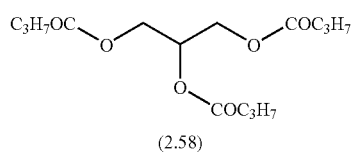
(2.58) C-409
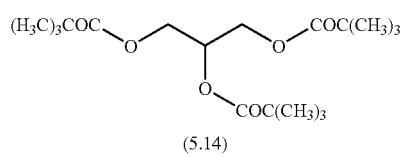
(5.14) C-410
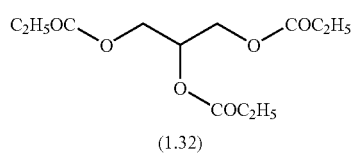
(1.32) C-411
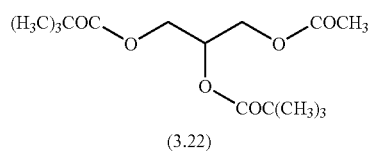
(3.22) C-412
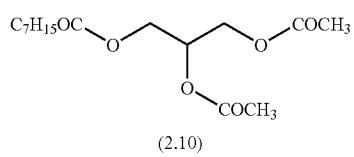
(2.10) C-413
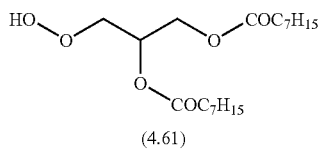
(4.61) C-414
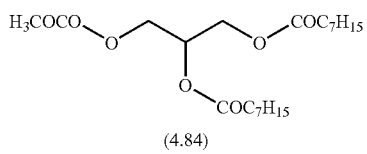
(4.84) C-415
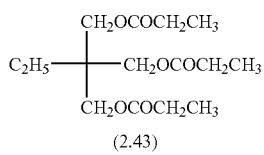
(2.43) C-416
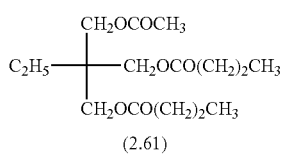
(1.78) C-417
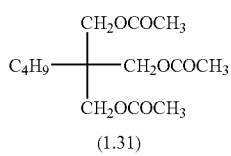
(2.61) C-418
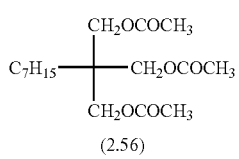
(1.31) C-419
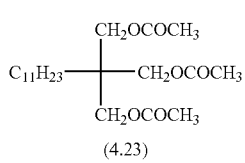
(2.56) C-420
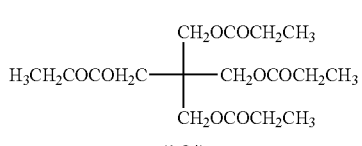
(4.23) C-421
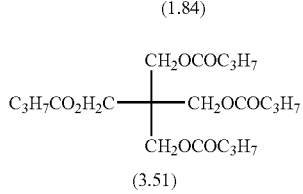
(1.84) C-422
(3.51) C-423

C-424

$$H_3COCOH_2C-C(CH_2OCOC_3H_7)_3$$
(2.44)

C-425

$$H_3CH_2COCOH_2C-C(CH_2OCOCH_2CH_3)_2-CH_2-O-CH_2-C(CH_2OCOCH_2CH_3)_2-CH_2OCOCH_2CH_3$$
(2.54)

C-426

$$CH_3OCO-C(CH_2CO_2C_4H_9)_3$$
(3.01)

C-427

$$HO-C(CH_2CO_2C_4H_9)_3$$
(2.78)

C-428

$$CH_3OCO-C(CH_2CO_2C(CH_3)_3)_3$$
(1.91)

C-429

$$C_8H_{17}OCO-C(CH_2CO_2CH_2CO_2CH_3)_3$$
(1.03)

C-430

$$HO-C(CH_2CO_2CH_2CO_2C_4H_9)_3$$
(1.36)

C-431

$$CH_3OCO-C(CH_2CO_2CH_2CO_2C_4H_9)_3$$
(1.59)

C-432

$$CH_3OCO-CH(CO_2C_4H_9)-CH(OCOCH_3)-CO_2C_4H_9$$
(1.52)

C-433

$$CH_3OCO-CH(CO_2C_6H_{13})-CH(OCOCH_3)-CO_2C_6H_{13}$$
(3.19)

C-434

$$CH_3(CH_2)_2OCO-CH(CO_2C_4H_9)-CH(OCO(CH_2)_2CH_3)-CO_2C_4H_9$$
(3.66)

C-435

$$H_3CH_2C-C(CH_2OCOCH_2CH_3)_2-CH_2-O-CH_2-C(CH_2OCOCH_2CH_3)_2-CH_2CH_3$$
(3.73)

C-436

$$H_3CH_2C-C(CH_2OCOCH_3)_2-CH_2-O-CH_2-C(CH_2OCOCH_3)_2-CH_2CH_3$$
(1.12)

C-437

$$CH_2OCOC_2H_5-CHOCOC_2H_5-CHOCOC_2H_5-CHOCOC_2H_5-CHOCOC_2H_5-CH_2OCOC_2H_5$$
(2.36)

C-438

$$CH_2OCOCH_3-CHOCOCH_3-CHOCOCH_3-CHOCOCH_3-CHOCOCH_3-CH_2OCOC_9H_{19}$$
(2.02)

C-439

$$CH_2OCOC_{11}H_{23}-CHOH-CHOCOCH_3-CHOCOCH_3-CHOCOCH_3-CH_2OCOCH_3$$
(2.62)

C-440

$$CH_2OCOCH_3-CHOCOC_2H_5-CHOCOC_2H_5-CHOCOC_2H_5-CH_2OCOC_2H_5$$
(1.36)

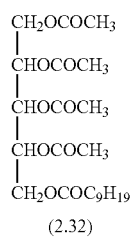
(2.32)

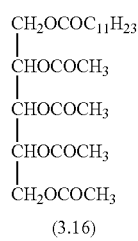
(3.16)

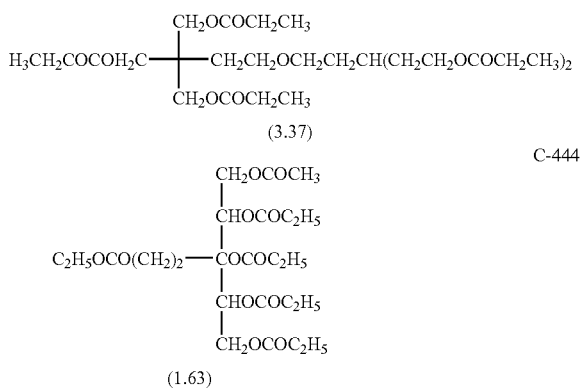

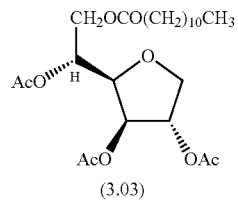
(3.03)

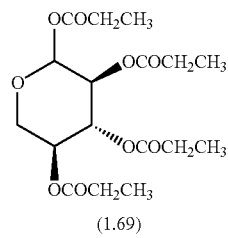
(1.69)

C-441

C-442

C-443

C-444

C-445

C-446

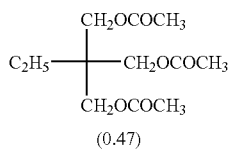
(0.47)

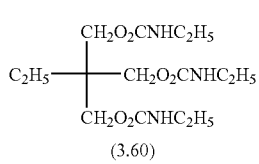
(3.60)

C-447

C-448

Now, the compounds of the formulae (13) and (14) will be described.

In the above formula (13), $R^1$ represents an alkyl group or an aryl group. $R^2$ and $R^3$ independently represent each a hydrogen atom, an alkyl group or an aryl group. It is particularly preferable that the sum of the carbon atoms in $R^1$, $R^2$ and $R^3$ is 10 or more. In the formula (14), $R^4$ and $R^5$ independently represent each an alkyl group or an aryl group. The sum of carbon atoms in $R^4$ and $R^5$ is 10 or more. The alkyl and aryl groups may have a substituent. Preferable examples of the substituent include a fluorine atom, alkyl groups, aryl groups, alkoxy groups, sulfone group and sulfonamido group. Among all, alkyl groups, aryl groups, alkoxy groups, sulfone group and sulfonamido group are particularly preferable. The alkyl group may be either chain type, branched or cyclic. It is preferable that the alkyl group has from 1 to 25 carbon atoms, still preferably from 6 to 25 and particularly preferably from 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl and didecyl). The aryl group preferably has from 6 to 30 carbon atoms, still preferably from 6 to 24 carbon atoms (for example, phenyl, biphenyl, terphenyl, naphthyl, binaphthyl and triphenylphenyl). Next, preferable examples of the compounds represented by the formula (13) or the formula (14) will be presented, though the invention is not restricted to these specific examples.

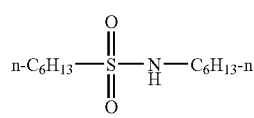

A-1

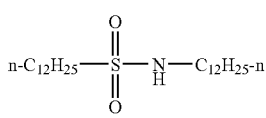

A-2

-continued
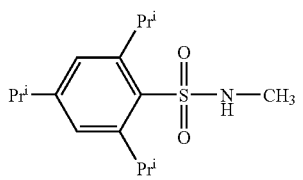
A-3
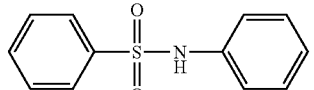
A-4
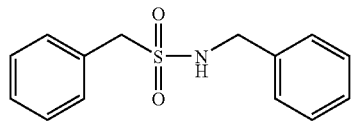
A-5
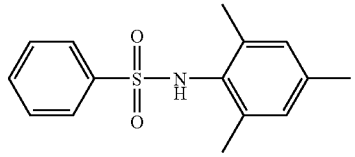
A-6
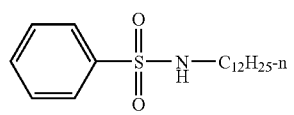
A-7
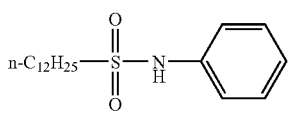
A-8
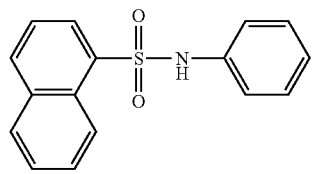
A-9
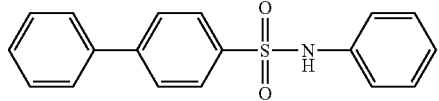
A-10
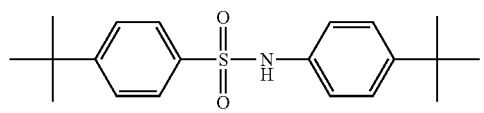
A-11
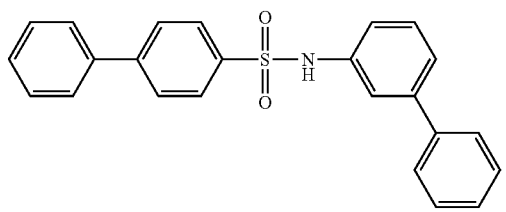
A-12
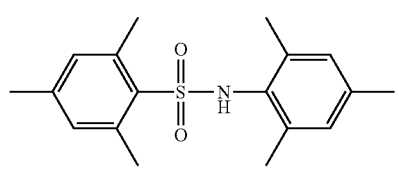
A-13
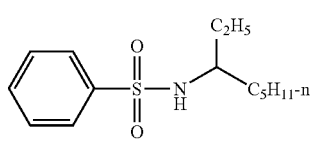
A-14
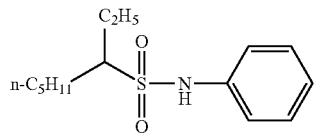
A-15
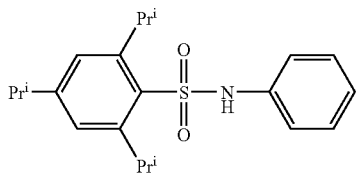
A-16
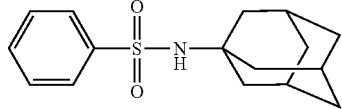
A-17
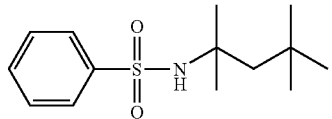
A-18
A-19
A-20

-continued

-continued
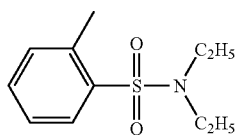 A-41
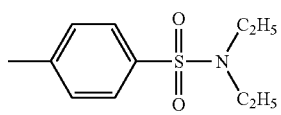 A-42
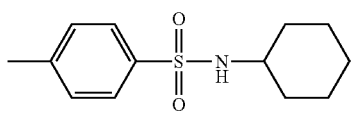 A-43
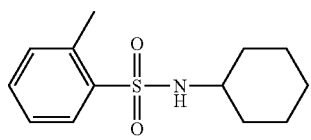 A-44
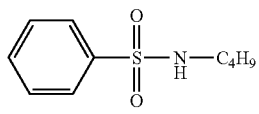 A-45
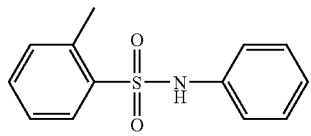 A-46
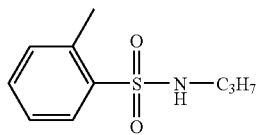 A-47
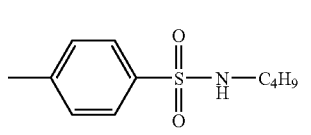 A-48
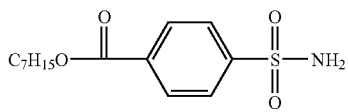 A-49
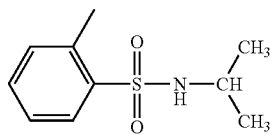 A-50
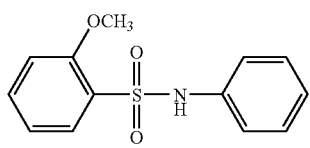 A-51
n-C$_{12}$H$_{25}$—S(O$_2$)—C$_{12}$H$_{25}$-n  B-1
n-C$_6$H$_{13}$—S(O$_2$)—C$_6$H$_{13}$-n  B-2
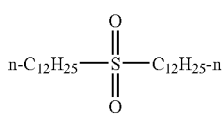 B-3
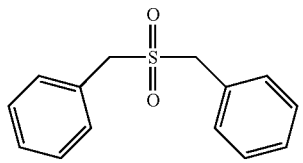 B-4
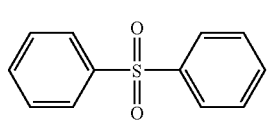 B-5
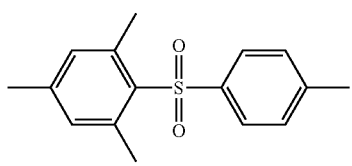 B-6
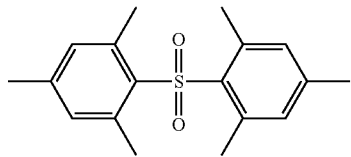 B-7
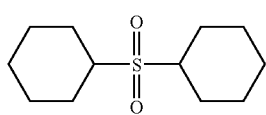 B-8
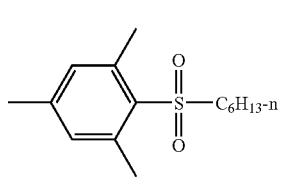 B-9

-continued
B-10
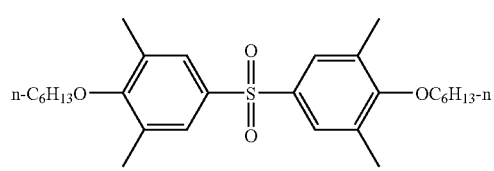
B-11
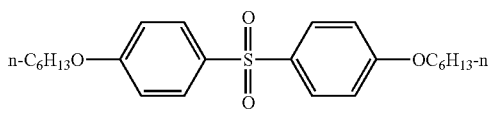
B-12
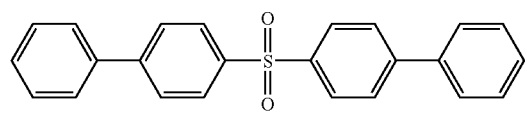
B-13
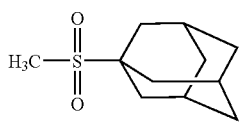
B-14
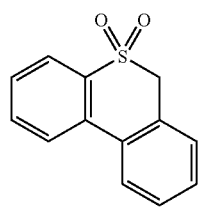
B-15
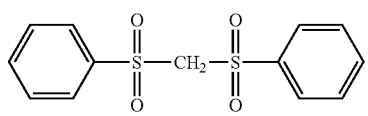
B-16
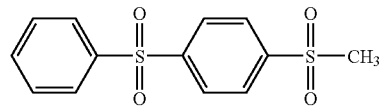
B-17
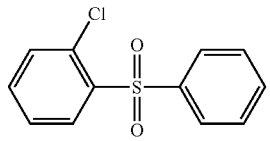
B-18
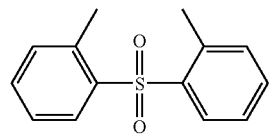
B-19
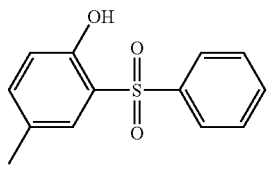
B-20
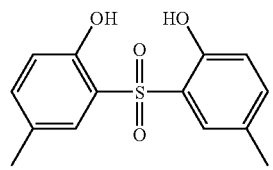
B-21
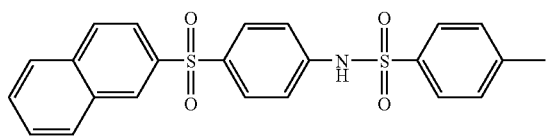
B-22
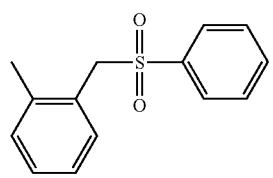
B-23
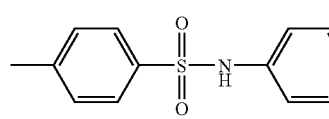
B-24
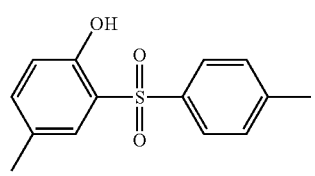
B-25
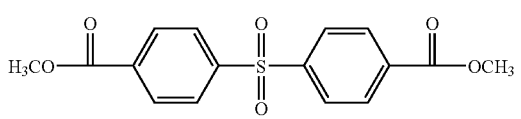

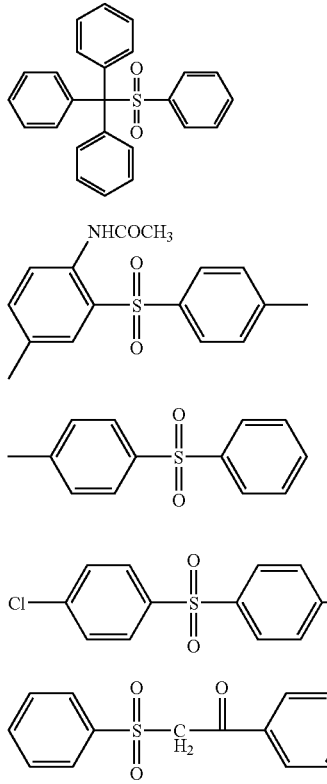

Next, the compounds represented by the formula (15) will be described.

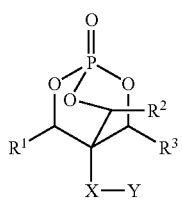

In the above formula (15), $R^1$, $R^2$ and $R^3$ independently represent each a hydrogen atom or an alkyl group. As the alkyl group, an alkyl group having from 1 to 5 carbon atoms (for example, methyl, ethyl, propyl, isopropyl, butyl, amyl or isoamyl) is preferable. It is particularly preferable that at least one of $R^1$, $R^2$ and $R^3$ is an alkyl group having from 1 to 3 carbon atoms (for example, methyl, ethyl, propyl or isopropyl). X preferably represents a divalent linking group made up of one or more groups selected from among a single, —O—, —CO—, —NR$^4$— (wherein $R^4$ represents a hydrogen atom, an alkyl group, an aryl group or an aralkyl group), an alkylene group (preferably having from 1 to 6 carbon atoms, still preferably from 1 to 3 carbon atoms such as methylene, ethylene or propylene), or an arylene group (preferably having from 6 to 24 carbon atoms, still preferably from 6 to 12 carbon atoms such as phenylene, biphenylene or naphthylene). A divalent linking group formed by one or more groups selected from —O—, alkylene groups and arylene groups is still preferred. Y preferably represents a hydrogen atom, an alkyl group (preferably having from 2 to 25 carbon atoms, still preferably from 2 to 20 carbon atoms such as ethyl, isopropyl, t-butyl, hexyl, 2-ethylhexyl, t-octyl, dodecyl, cyclohexyl, dicyclohexyl or adamantyl), an aryl group (preferably having from 6 to 24 carbon atoms, still preferably from 6 to 18 carbon atoms such as phenyl, biphenyl or naphthyl), or an aralkyl group (preferably having from 7 to 30 carbon atoms, still preferably from 7 to 20 carbon atoms such as benzyl, cresyl, t-butylphenyl, diphenylmethyl or triphenylmethyl). An alkyl group, an aryl group or an aralkyl group is still preferable. Concerning the combination —X—Y, it is preferable that the sum of the carbon atoms in —X—Y is form 0 to 40, still preferably form 1 to 30 and most desirably from 1 to 25. Next, preferable examples of the compounds represented by the formula (14) will be presented, though the invention is not restricted to these specific examples.

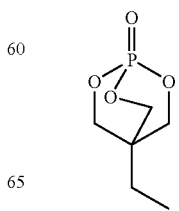

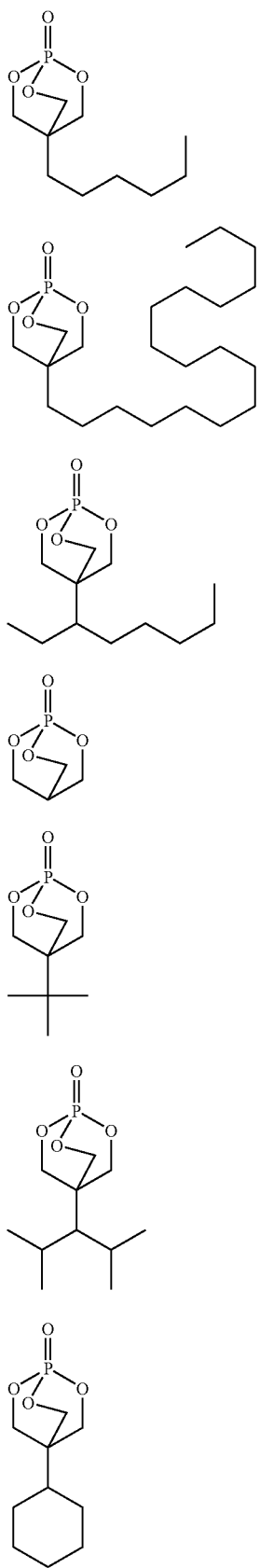
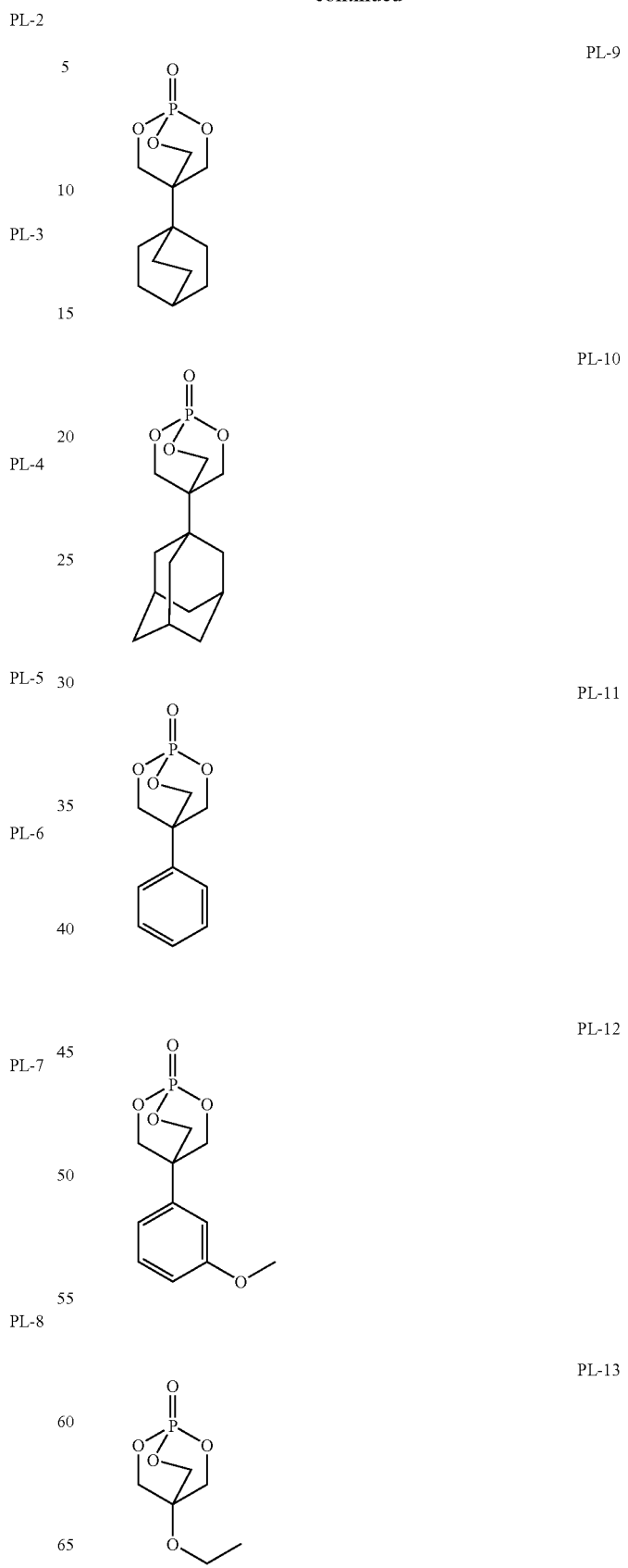

PL-14
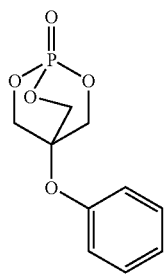
PL-20
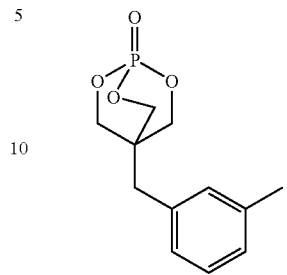
PL-15
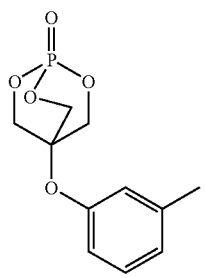
PL-21
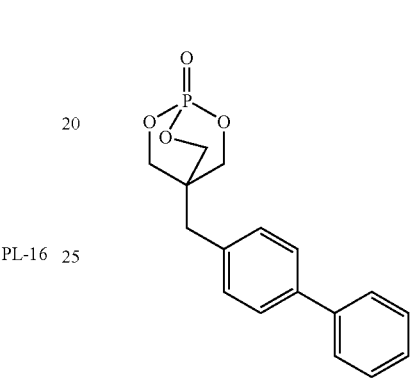
PL-16
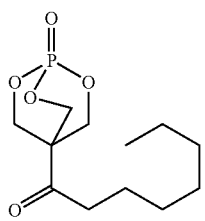
PL-22
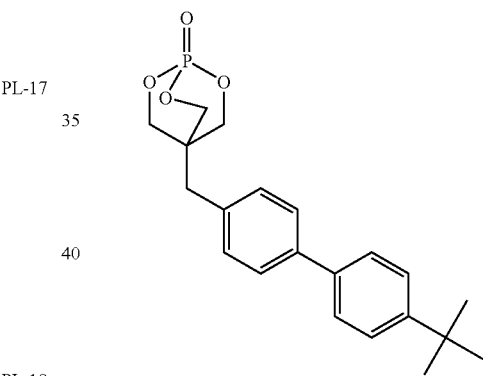
PL-17
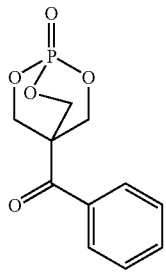
PL-18
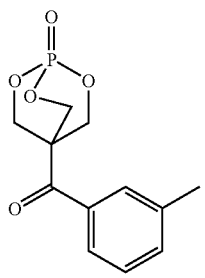
PL-23
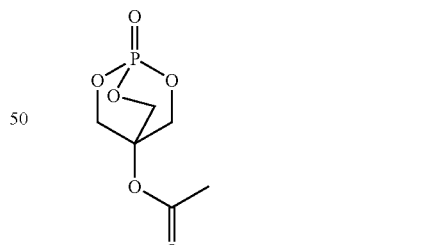
PL-19
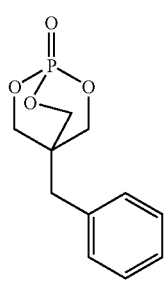
PL-24
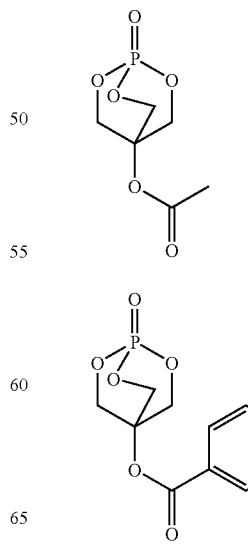

PL-25 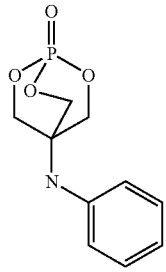
PL-26 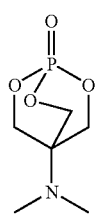
PL-27 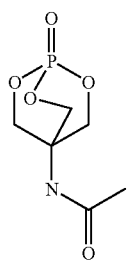
PL-28 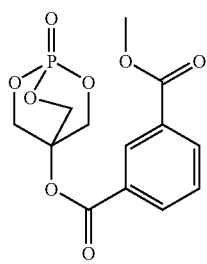
PL-29 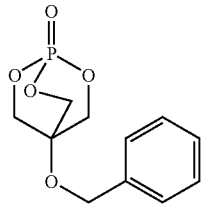
PL-30 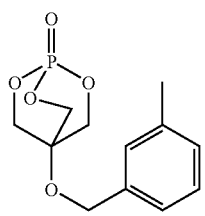
PL-31 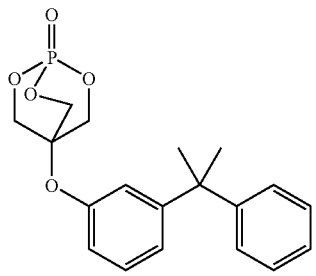
PL-32 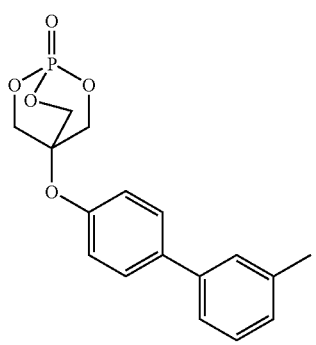
PL-33 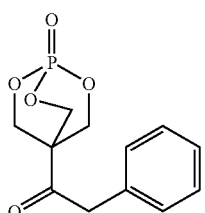
PL-34 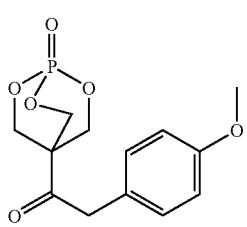
PL-35 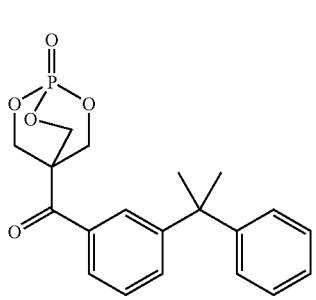

-continued

PL-36 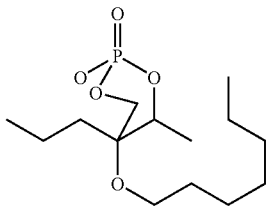

PL-37 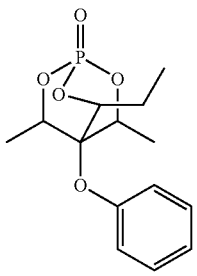

PL-38 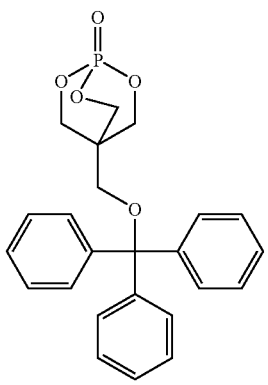

PL-39 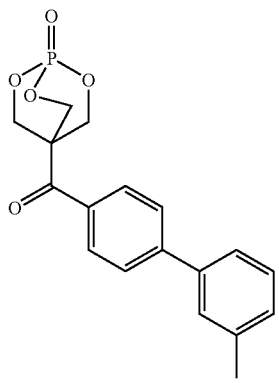

PL-40 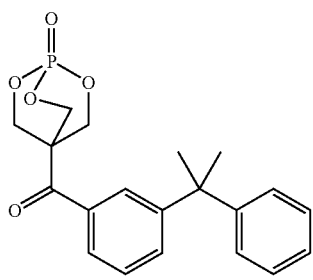

PL-41 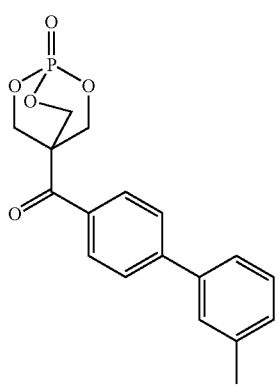

PL-42 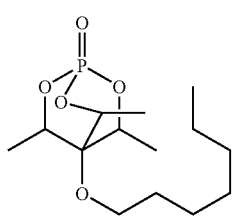

PL-43 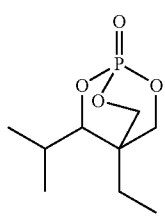

Now, the compounds of the formula (16) will be described.

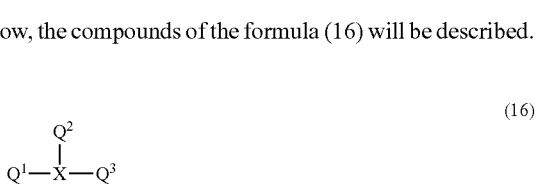
(16)

$Q^1$, $Q^2$ and $Q^3$ independently represent each a 5- or 6-membered ring which may be a hydrocarbon ring or a heterocycle. Such a ring may be a monocycle or form a fused ring together with another ring. Preferable examples of the hydrocarbon ring include substituted or unsubstituted cyclohexane rings, substituted or unsubstituted cyclopentane rings and aromatic hydrocarbon rings, still preferably aromatic hydrocarbon rings. Preferable examples of the heterocycle include 5- and 6-membered rings having at least one of oxygen, nitrogen and sulfur atoms. As the heterocycle, aromatic heterocycles having at least one of oxygen, nitrogen and sulfur atoms are still preferable.

Preferable examples of $Q^1$, $Q^2$ and $Q^3$ include aromatic hydrocarbon rings and aromatic heterocycles. Preferable examples of the aromatic hydrocarbon rings include monocyclic and bicyclic aromatic hydrocarbon rings having from 6 to 30 carbon atoms (for example, benzene ring, naphthalene ring and so on), aromatic hydrocarbon rings having from 6 to 20 carbon atoms are still preferable, aromatic hydrocarbon rings having from 6 to 12 carbon atoms are still preferable and benzene ring is still preferable.

As the aromatic heterocycles, aromatic heterocycles having an oxygen atom, a nitrogen atom or a sulfur atom is preferable. Specific examples of the heterocycles include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline. It is preferable that $Q^1$, $Q^2$ and $Q^3$ are aromatic hydrocarbon rings, still preferably benzene rings. $Q^1$, $Q^2$ and $Q^3$ may have a substituent and examples of the substituent include the substituent T which will be described hereinafter.

X represents B, C—R (wherein R represents a hydrogen atom or a substituent), N, P or P═O. Preferable examples of X include B, C—R (wherein R preferably represents an aryl group, a substituted or unsubstituted-amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom such as a fluorine atom, a chlorine atom, a bromine atom or an iodine atom, and a carboxyl group, still preferably an aryl group, an alkoxy group, an aryloxy group, a hydroxy group or a halogen atom, and still preferably an alkoxy group or a hydroxy group, and particularly preferably a hydroxy group), and N. C—R is particularly preferable:

Preferable examples of the compounds of the formula (16) are compounds represented by the following formula (17).

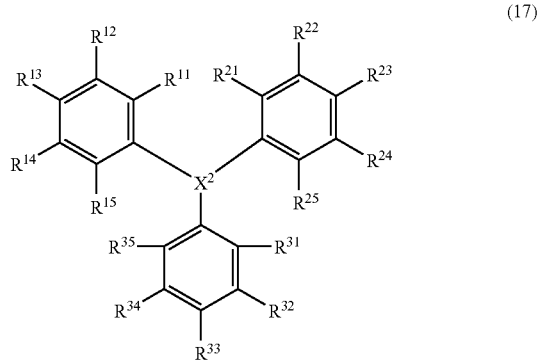

(17)

In the above formula, $X^2$ represents B, C—R (wherein R represents a hydrogen atom or a substituent) or N. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent each a hydrogen atom or a substituent.

X represents B, C—R (wherein R represents a hydrogen atom or a substituent), N, P or P═O. Preferable examples of X include B, C—R (wherein R preferably represents an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom such as a fluorine atom, a chlorine atom, a bromine atom or an iodine atom, and a carboxyl group, still preferably an aryl group, an alkoxy group, an aryloxy group, a hydroxy group or a halogen atom, and still preferably an alkoxy group or a hydroxy group, and particularly preferably a hydroxy group), N and P═O. C—R and N are still preferable and C—R is particularly preferable. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent each a hydrogen atom or a substituent. As examples of the substituent, the substituent T which will be described hereinafter may be cited. Preferable examples of $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ include alkyl groups, alklenyl groups, alkenyl groups, alkynyl groups, aryl groups, substituted or unsubstituted amino groups, alkoxy groups, aryloxy groups, acyl groups, alkoxycarbonyl groups, aryloxycarbonyl groups, acyloxy groups, acylamilo groups, alkoxycarbonylamino groups, aryloxycarbonylamaino groups, sulfonylamino groups, sulfamoyl groups, carbamoyl groups, alkylthio groups, arylthio groups, sulfonyl groups, sulfinyl groups, ureido groups, phosphoramido group, hydroxy group, mercapto group, halogen atoms such as a fluorine atom, a chlorine atom, a bromine atom and an iodine atom, cyano group, sulfo group, carboxyl group, nitro group, hydroxamate group, sulfino group, hydrazino group, imino group, heterocyclic groups (preferably having from 1 to 30 carbon atoms, still preferably form 1 to 12 carbon atoms and having, for example, a nitrogen atom, an oxygen atom or a sulfur atom as the hetero atom, such as imidazolyl, pyridyl, quinolyl, furyl, piperidyl, morpholino, benzoxazolyl, benzimidazolyl and benzthiazolyl) and silyl group. Still preferable examples thereof include alkyl groups, aryl groups, substituted or unsubstituted amino groups, alkoxy groups and aryloxy groups. Among all, alkyl groups, aryl groups and alkoxy groups are particularly preferred.

These substituents may be further substituted. In the case of having two or more substituent, the substituents may be either the same or different. If possible, these substituents may be bonded together to from a ring.

Now, the substituent T as described above will be illustrated. Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methyltio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as tirmethylsilyl and triphenylsilyl) and so on. These substituents may be further substituted. In the case of having two or more substituent, the substituents may be either the same or different. If possible, these substituents may be bonded together to from a ring.

Next, the compounds represented by the formula (16) will be illustrated in greater detail by reference to specific examples thereof. However, it is to be understood that the invention is not restricted to these specific examples.

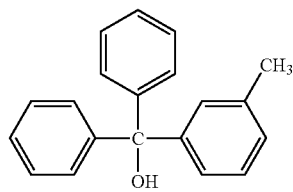

D-1

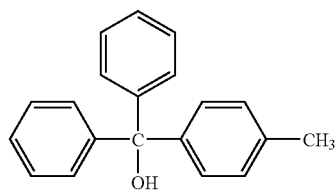

D-2

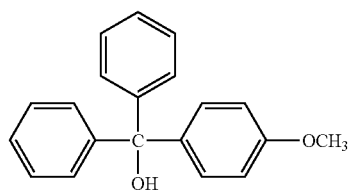

D-3

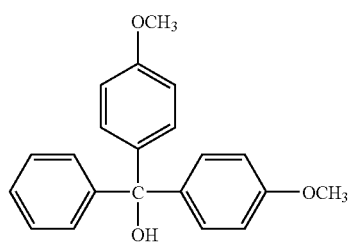

D-4

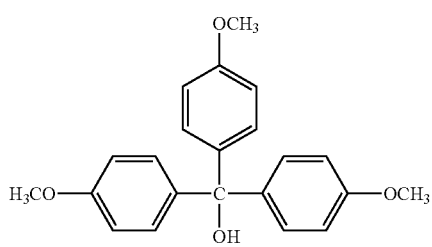

D-5

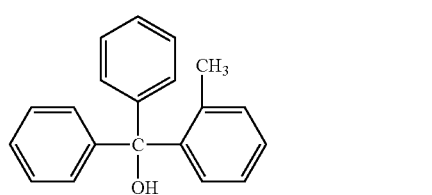

D-6

-continued
D-7
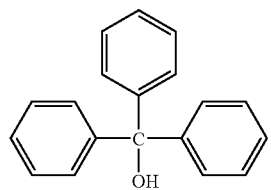
D-8
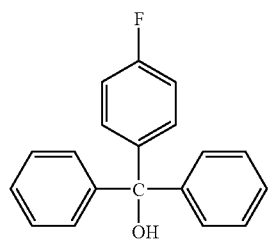
D-9
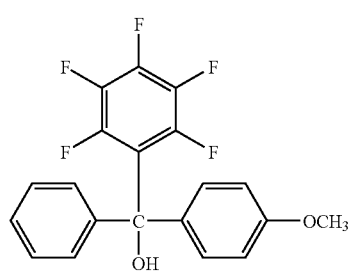
D-10
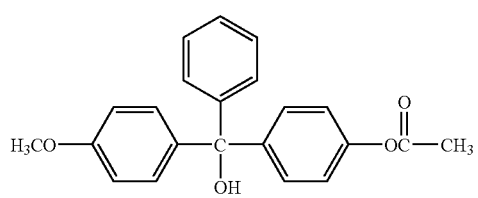
D-11
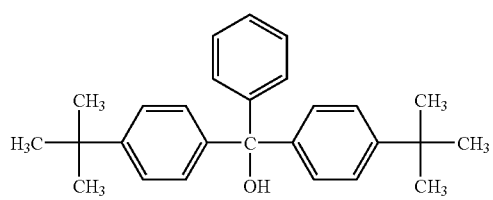
D-12
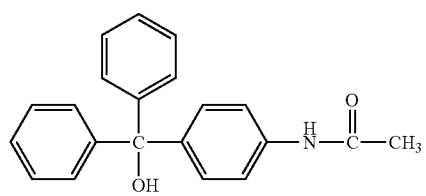
D-13
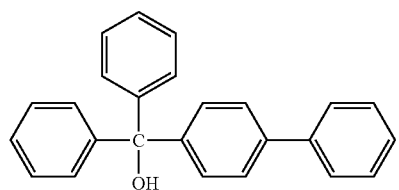
-continued
D-14
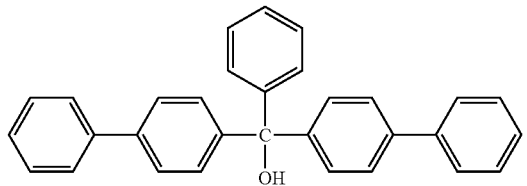
D-15
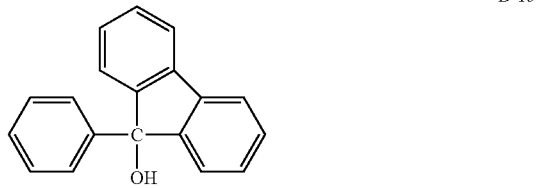
D-16
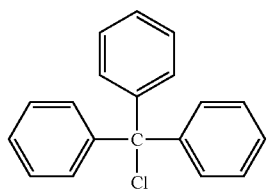
D-17
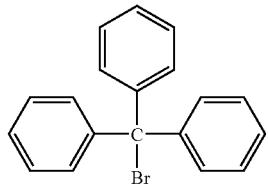
D-18
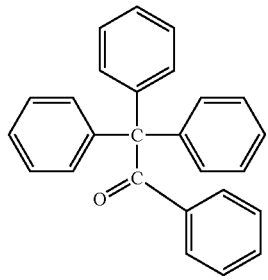
D-19
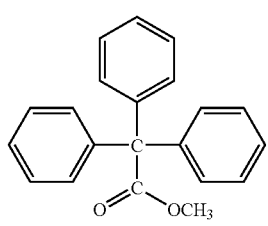
D-20
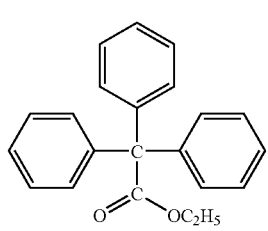

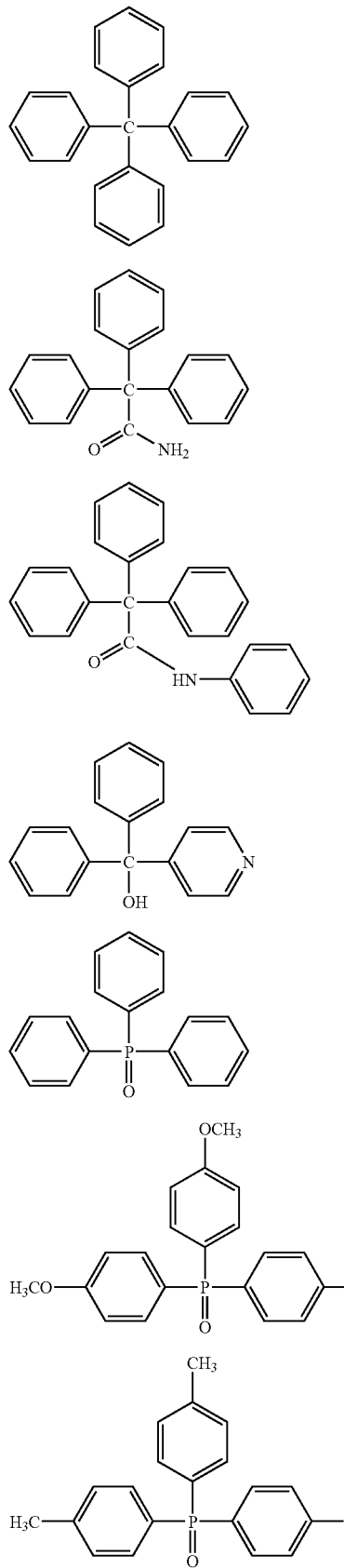
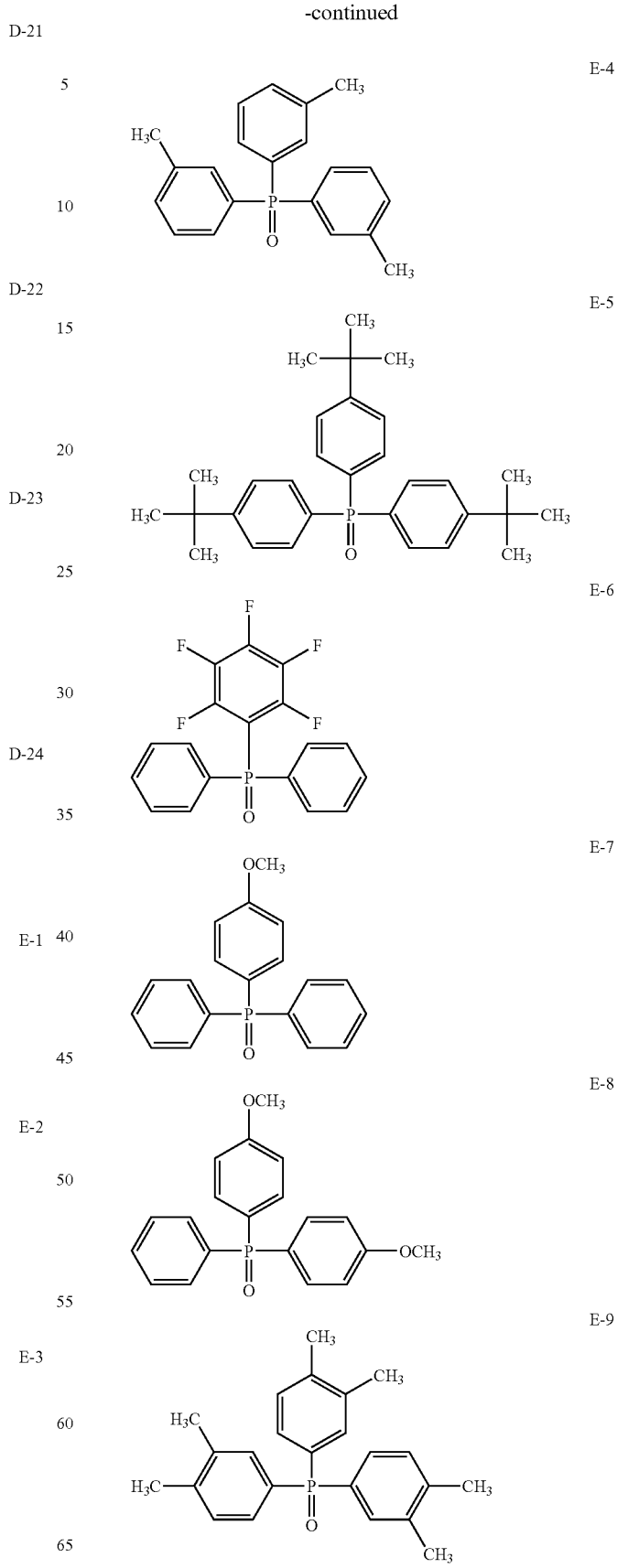

-continued
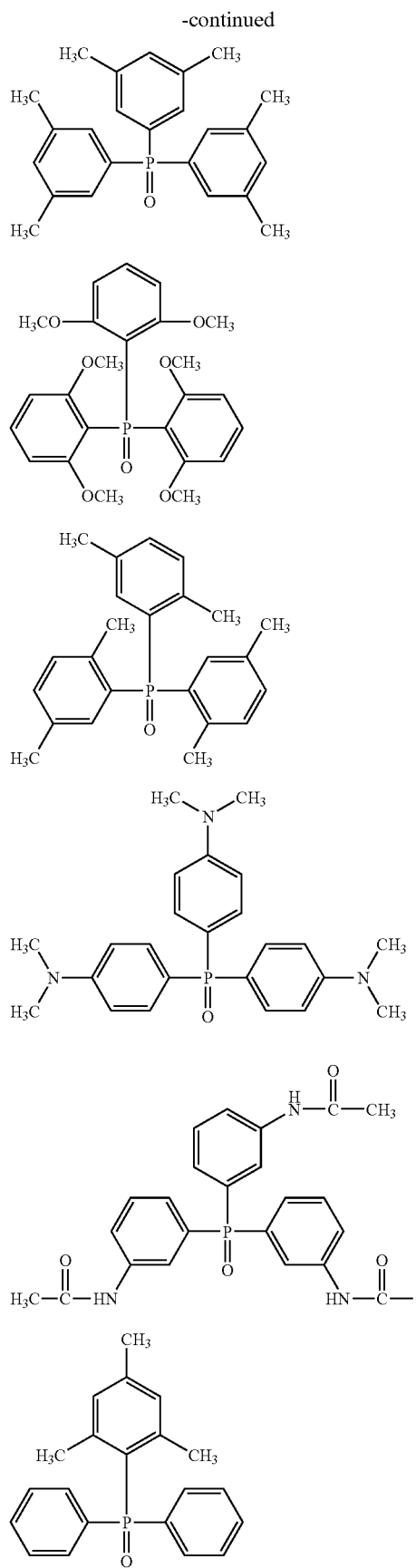
E-10
E-11
E-12
E-13
E-14
E-15
-continued
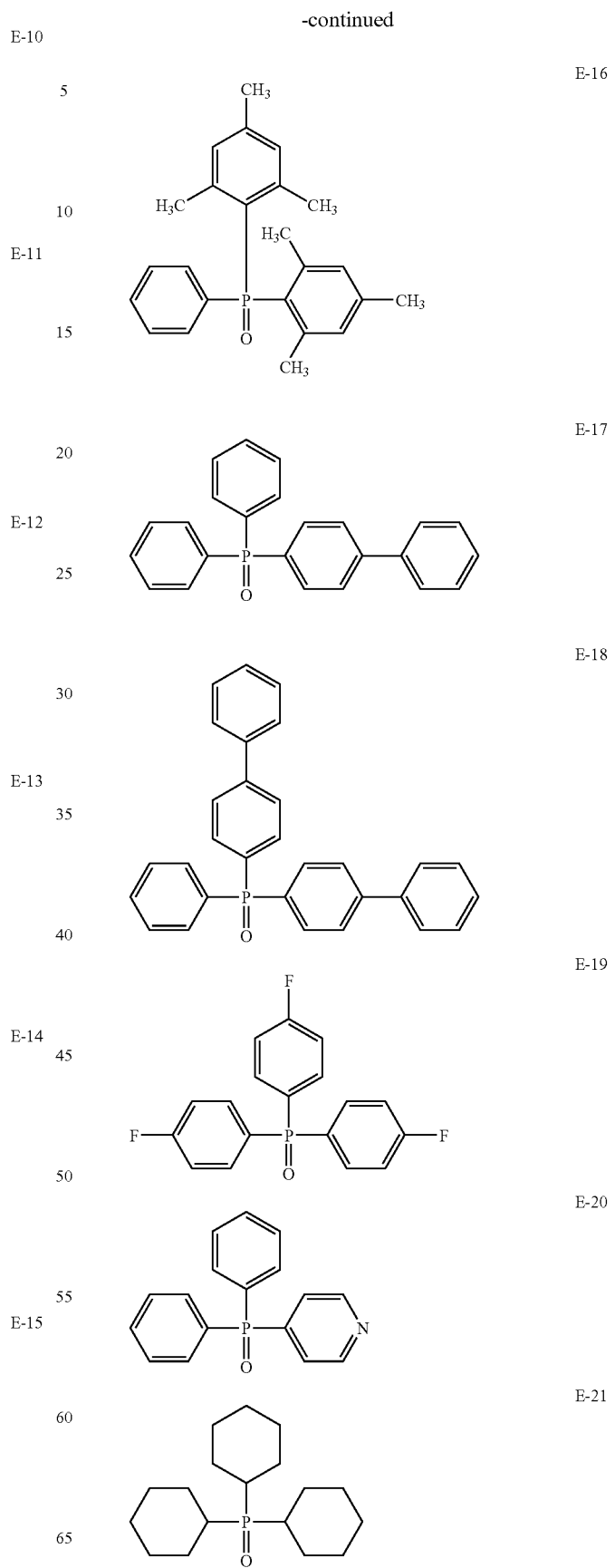
E-16
E-17
E-18
E-19
E-20
E-21

E-22 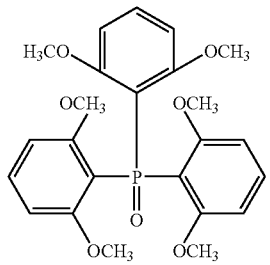
E-23 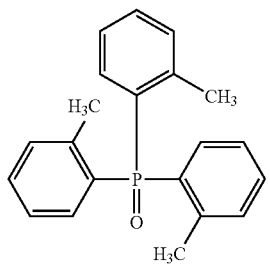
E-24 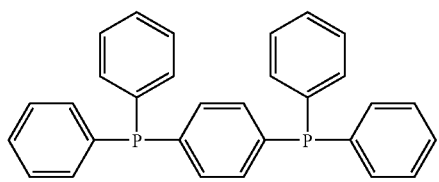
E-25 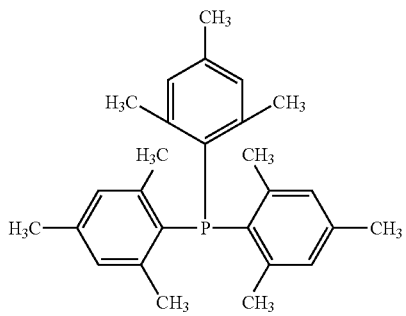
E-26 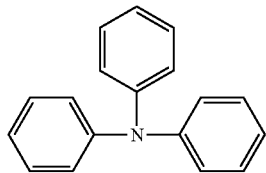
E-27 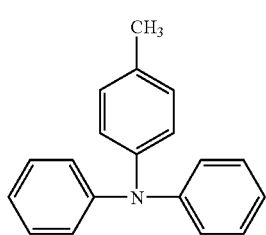
E-28 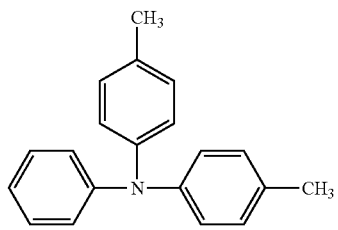
E-29 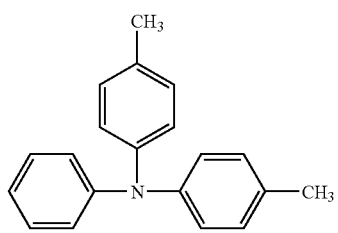
E-30 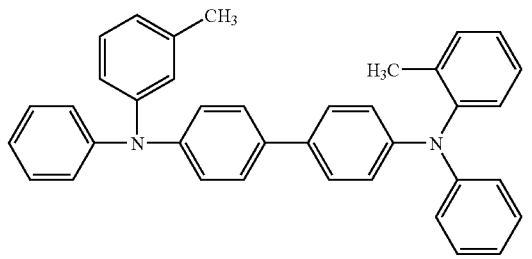
E-31 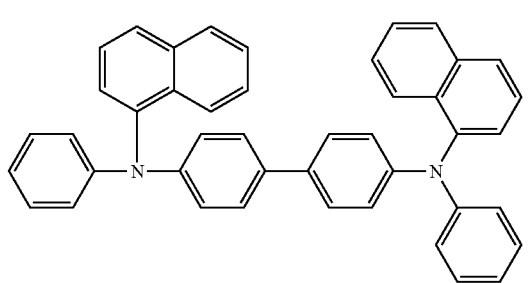
E-32 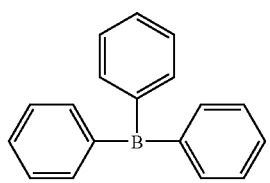
Next, preferable examples of the compounds represented by the formula (16) or the formula (19) will be illustrated. However, it is to be understood that the invention is not restricted to these specific examples.
FA-1 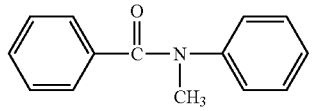

FA-2
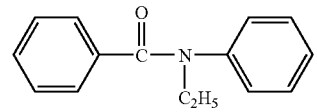
FA-3
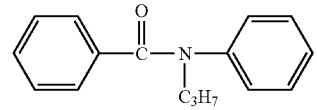
FA-4
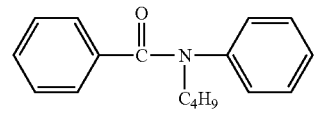
FA-5
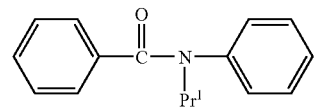
FA-6
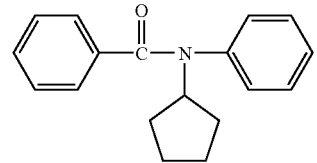
FA-7
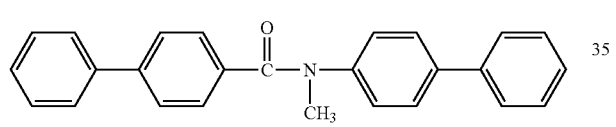
FA-8
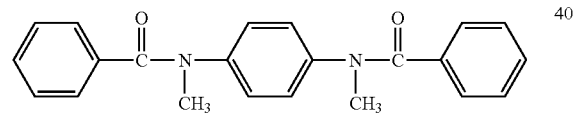
FA-9
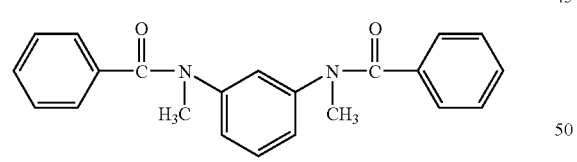
FA-10
FA-11
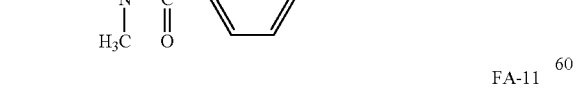
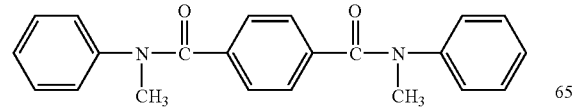
FA-12
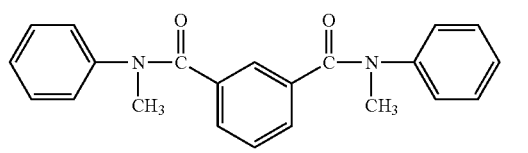
FA-13
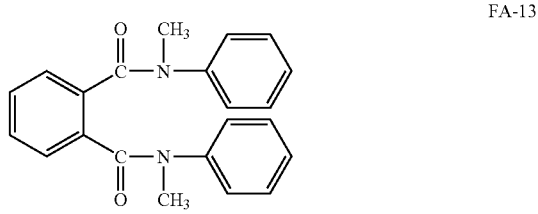
FA-14
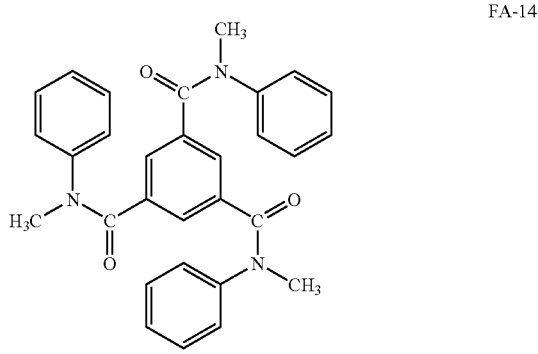
FA-15
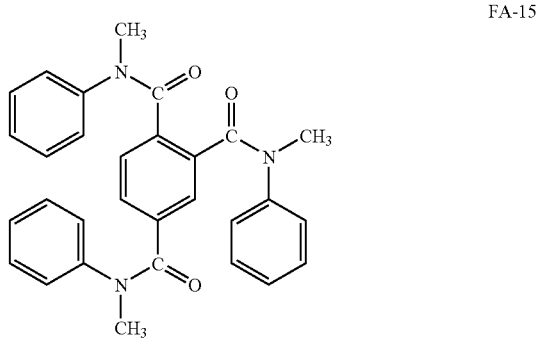
FA-16
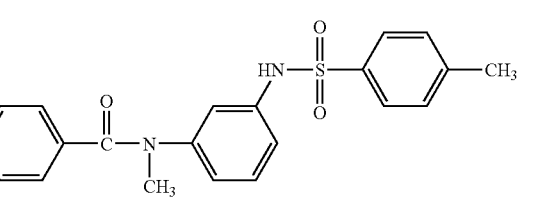
FA-17
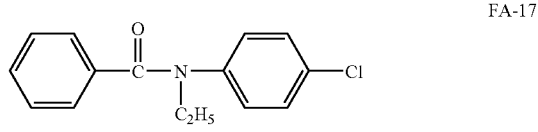
FA-18
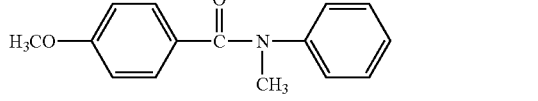

FA-19 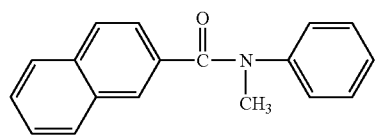
FA-20 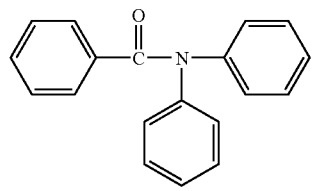
FA-21 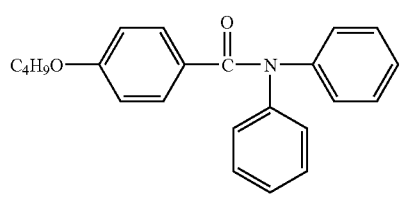
FA-22 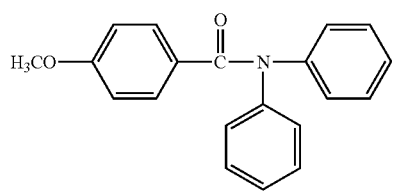
FA-23 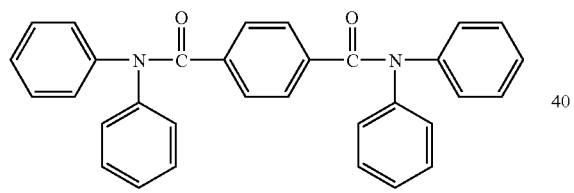
FA-24 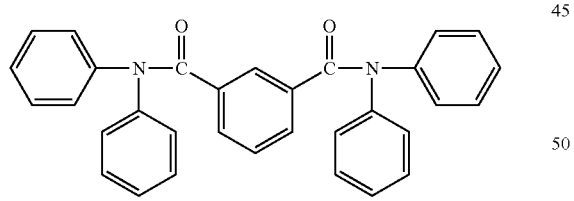
FA-25 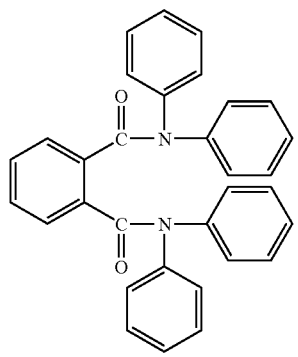
FA-26 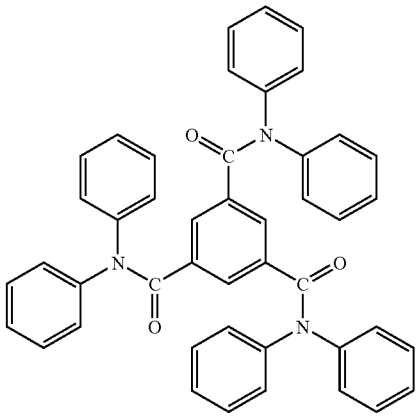
FA-27 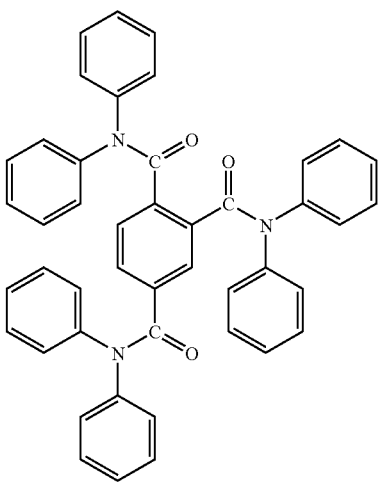
FA-28 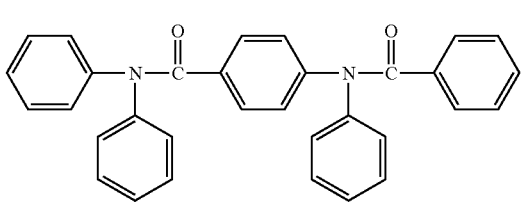
FB-1 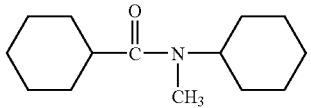
FB-2 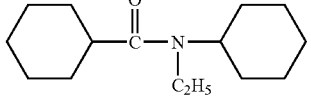
FB-3 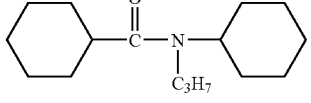
FB-4 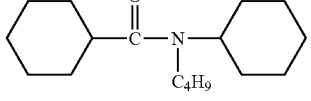

-continued
FB-5
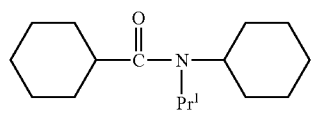
FB-6
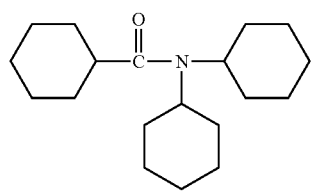
FB-7
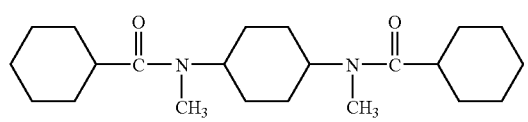
FB-8
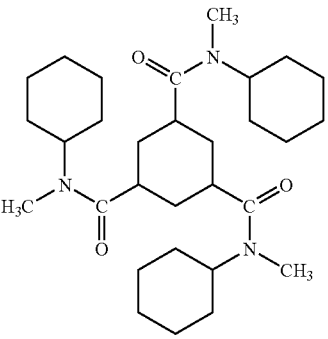
FB-9
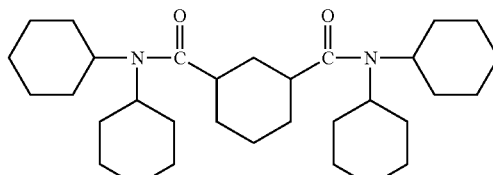
FB-10
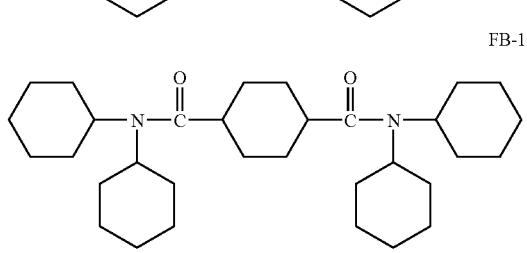
FB-11
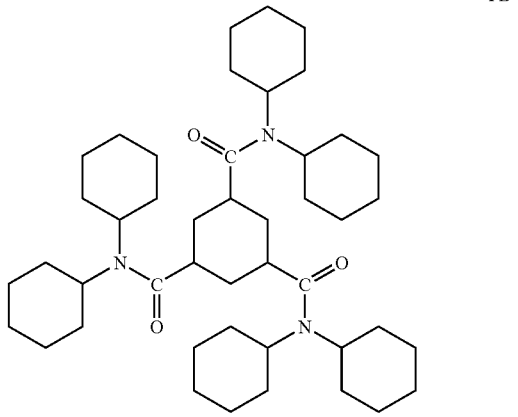
FB-12
-continued
FB-13
FB-14
FB-15
FB-16
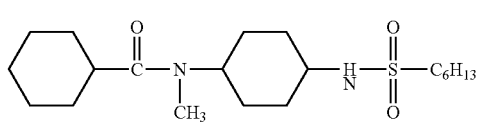
FB-17
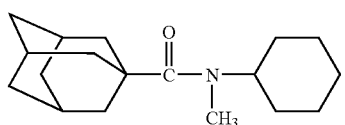
FB-18
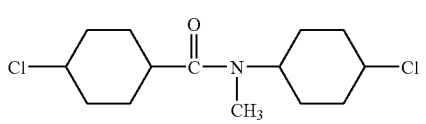
FB-19

-continued
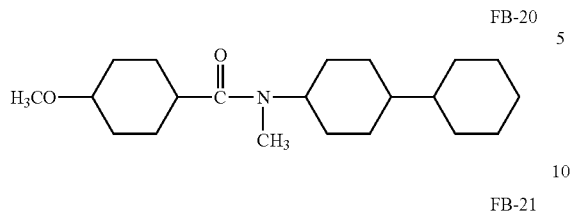
FB-20
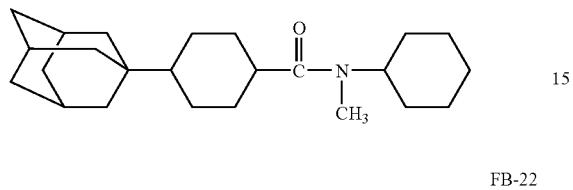
FB-21
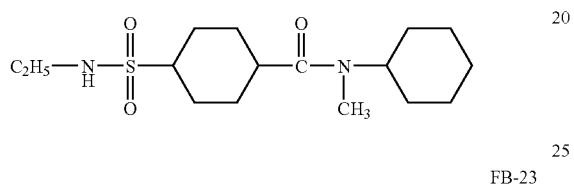
FB-22
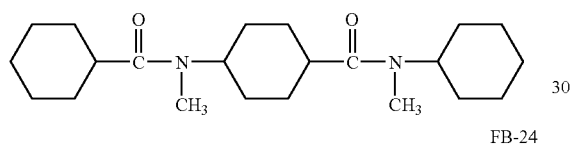
FB-23
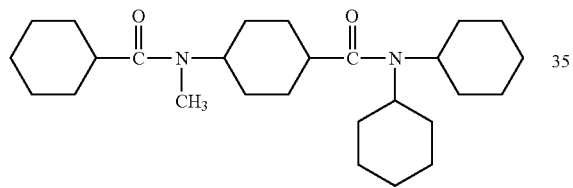
FB-24
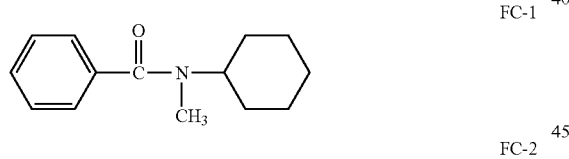
FC-1
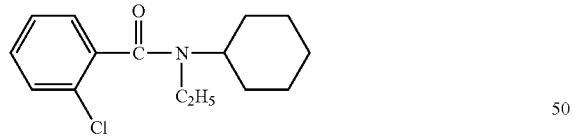
FC-2
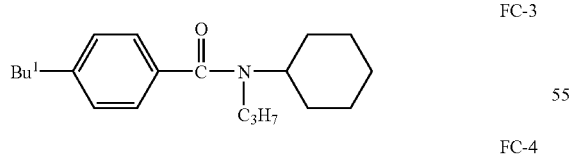
FC-3
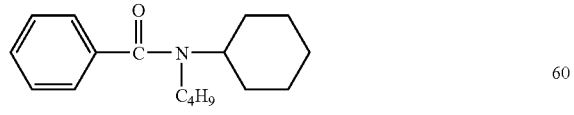
FC-4
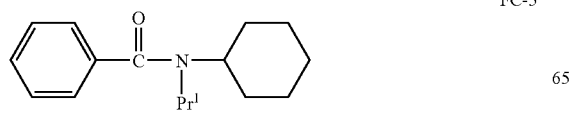
FC-5
-continued
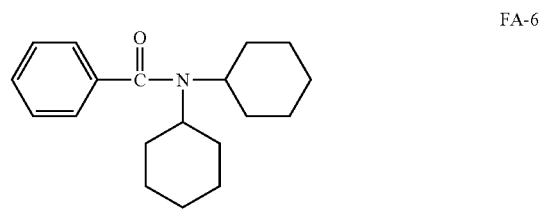
FA-6
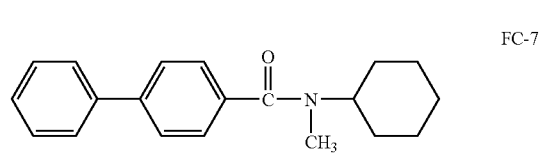
FC-7
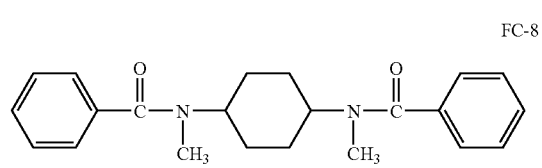
FC-8
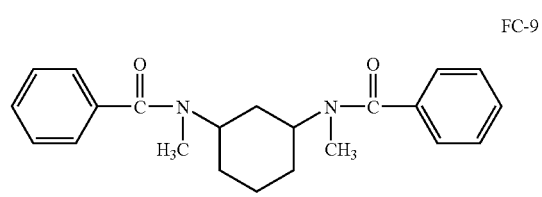
FC-9
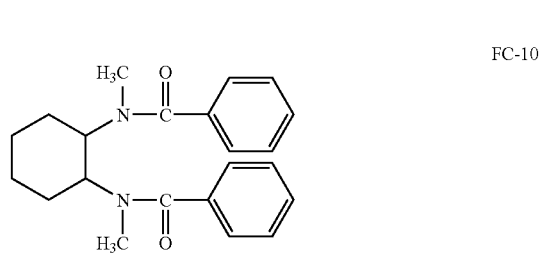
FC-10
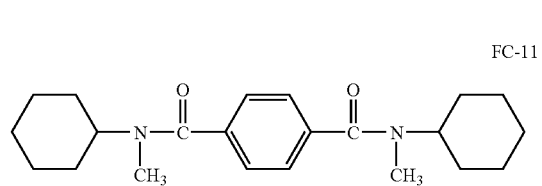
FC-11
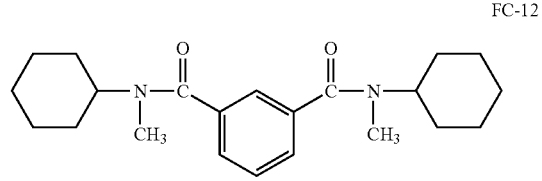
FC-12
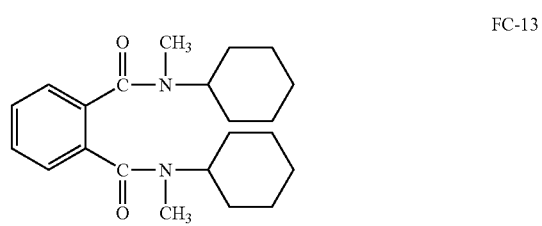
FC-13

-continued
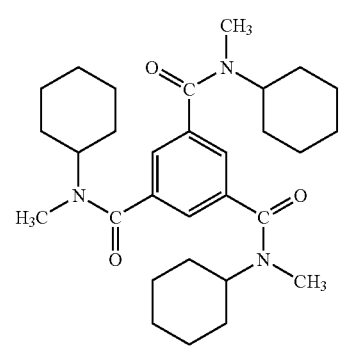 FC-14
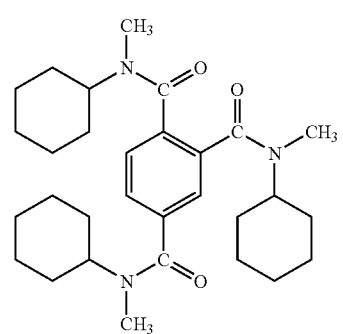 FC-15
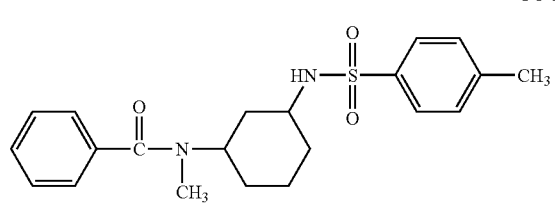 FC-16
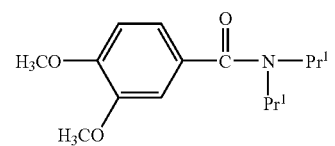 FC-17
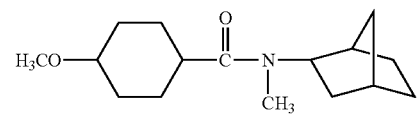 FC-18
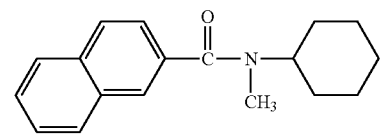 FC-19
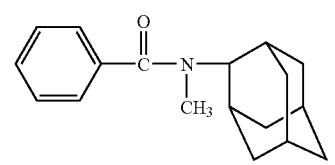 FC-20
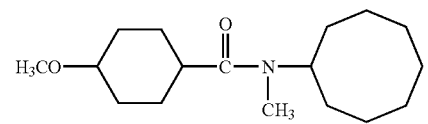 FC-21
-continued
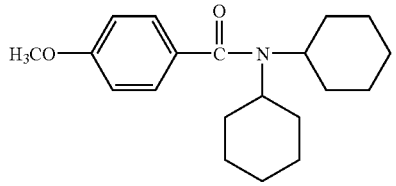 FC-22
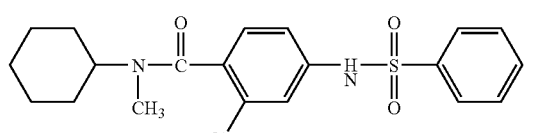 FC-23
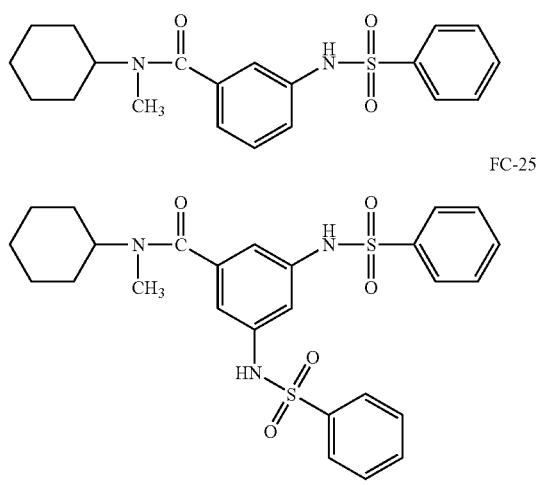 FC-24
FC-25
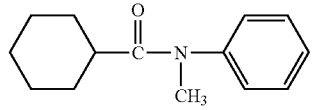 FD-1
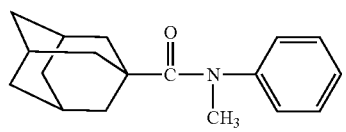 FD-2
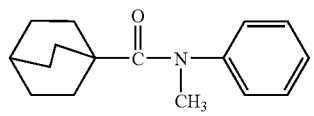 FD-3
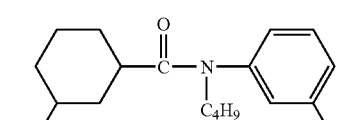 FD-4
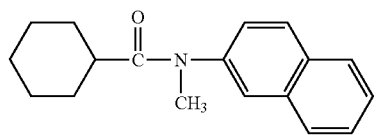 FD-5

-continued
FD-6
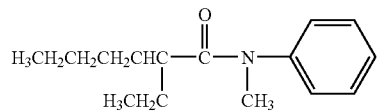
FD-7
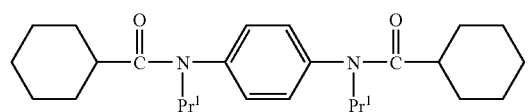
FD-8
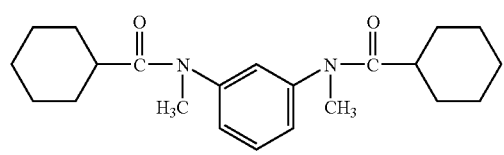
FD-9
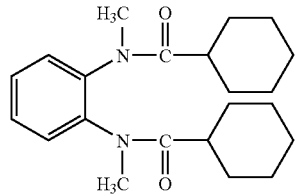
FD-10
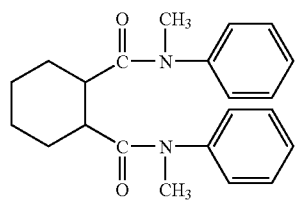
FD-11
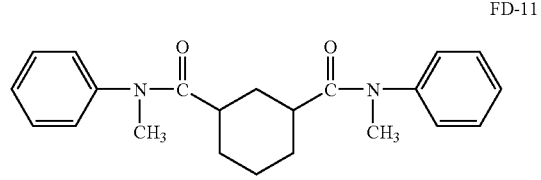
FD-12
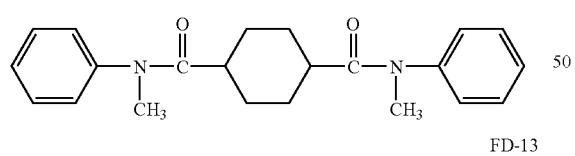
FD-13
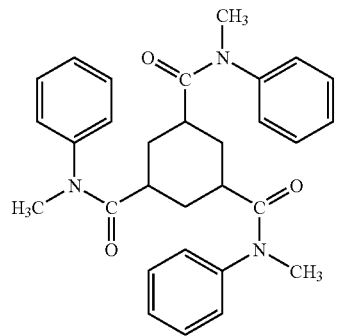
-continued
FD-14
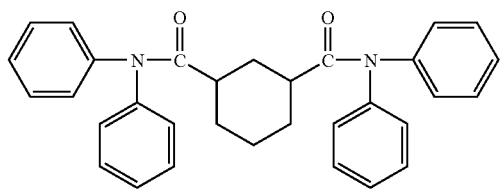
FD-15
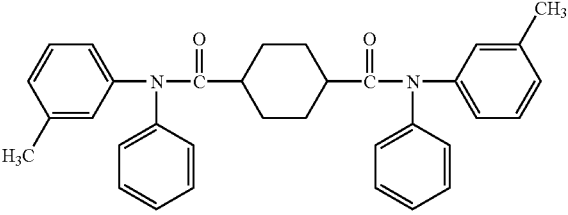
FD-16
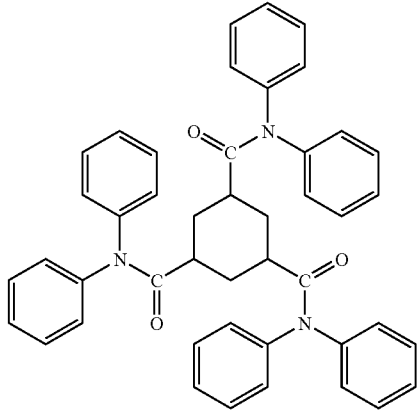
FD-17
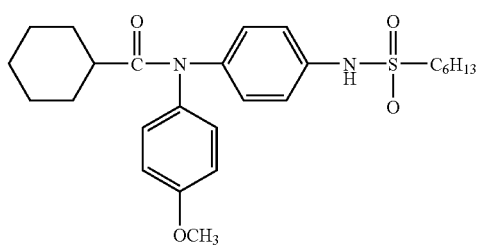
FD-18
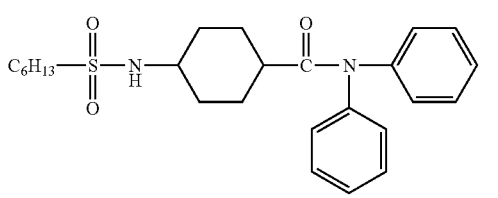
FD-19
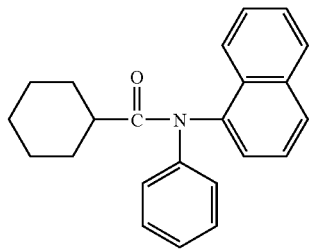

-continued

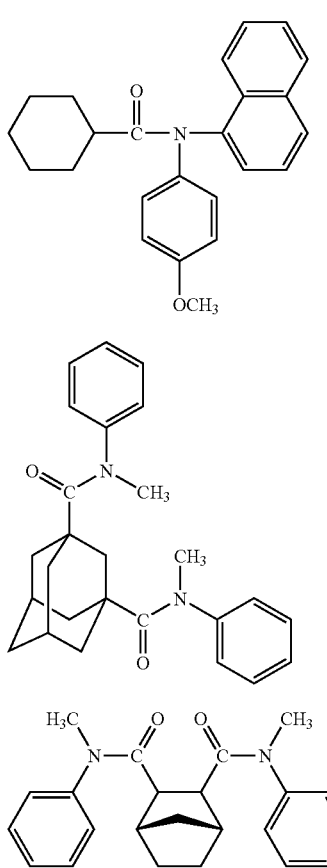

FD-20

FD-21

FD-22

As the results of intensive studies, the inventors have found out that the optical anisotropy can be lowered by adding polyhydric alcohol ester compounds, carboxylic acid ester compounds, polycyclic carboxylic acid compounds or bisphenol derivatives having an octanol-water partition coefficient (Log P value) of from 0 to 7 to cellulose acylate.

Next, examples of the polyhydric alcohol ester compounds, carboxylic acid ester compounds, polycyclic carboxylic acid compounds or bisphenol derivatives having an octanol-water partition coefficient (Log P value) of from 0 to 7 will be presented.

(Polyhydric Alcohol Ester Compound)

A polyhydric alcohol ester compound is an ester of a dihydric or higher alcohol with one or more monocarboxylic acids. Next, examples of the polyhydric alcohol ester compound will be presented, though the invention is not restricted to these specific examples.

(Polyhydric Alcohol)

Preferable examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol and so on. Particularly preferable examples thereof are triethylene glycol, tetraethylene glycol, dipropylene glycol, tripropylene glycol, sorbitol, trimethylolpropane and xylitol.

(Monocarboxylic Acid)

As the monocarboxylic acid in the polyhydric alcohol esters, use can be made of publicly known aliphatic monocarboxylic acids, alicyclic monocarboxylic acids, aromatic monocarboxylic acids and so on, without particular restriction. It is preferable to employ an alicyclic monocarboxylic acid or an aromatic monocarboxylic acid from the viewpoint of improving the vapor transmission rate, moisture content and retention of the cellulose acylate film.

Next, preferable examples of the monocarboxylic acid will be presented, though the invention is not restricted thereto.

As the aliphatic monocarboxylic acid, use may be preferably made of a chain type or branched fatty acid having from 1 to 32 carbon atoms, still preferably from 1 to 20 carbon atoms and particularly preferably from 1 to 10 carbon atoms. It is preferable to use acetic acid so as to improve the compatibility with the cellulose ester. It is also preferable to use a mixture of acetic acid with other monocarboxylic acids.

Preferable examples of the aliphatic monocarboxylic acid include saturated fatty acids such as acetic acid, propionic acid, butyric acid, valeric acid, caproic acid, enanthic acid, pelargonic acid, caprylic acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, unsaturated fatty acids such as undecylenic acid, oleic acid, sorbic acid, linoleic acid, linolenic acid and arachidonic acid and so on. These fatty acids may have a substituent.

Preferable examples of the alicyclic monocarboxylic acid include cyclopentanecarboxylic acid, cyclohexanecarboxylic acid, cyclooctanecarboxylic acid and derivatives thereof.

Preferable examples of the aromatic monocarboxylic acid include benzoic acid, benzoic acid derivatives having an alkyl group introduced into the benzene ring such as toluic acid, aromatic monocarboxylic acids having two or more benzene rings such as biphenylcarboxylic acid, naphthalenecarboxylic acid and tetralincarboxylic acid and derivatives thereof. Among all, benzoic acid is preferable.

In the polyhydric alcohol ester, either a carboxylic acid or a mixture of two or more thereof may be used. OH groups in the polyhydric alcohol may be entirely esterified. Alternatively, some of them may remain as —OH groups. It is preferable that the polyhydric alcohol ester has three or more aromatic or cycloalkyl rings per molecule.

Now, examples of the polyhydric alcohol ester compounds will be presented, though the invention is not restricted to them.

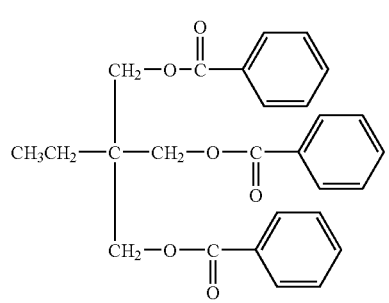

I-1

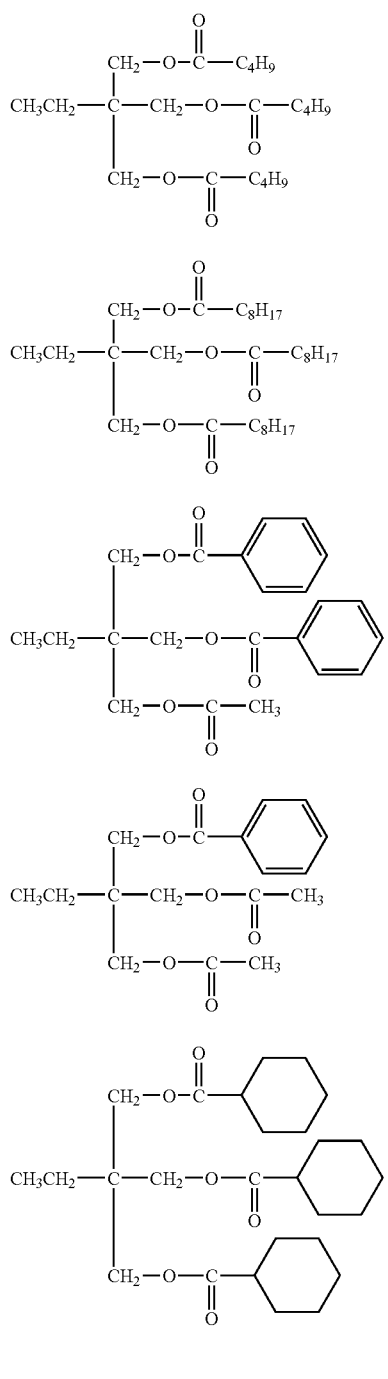
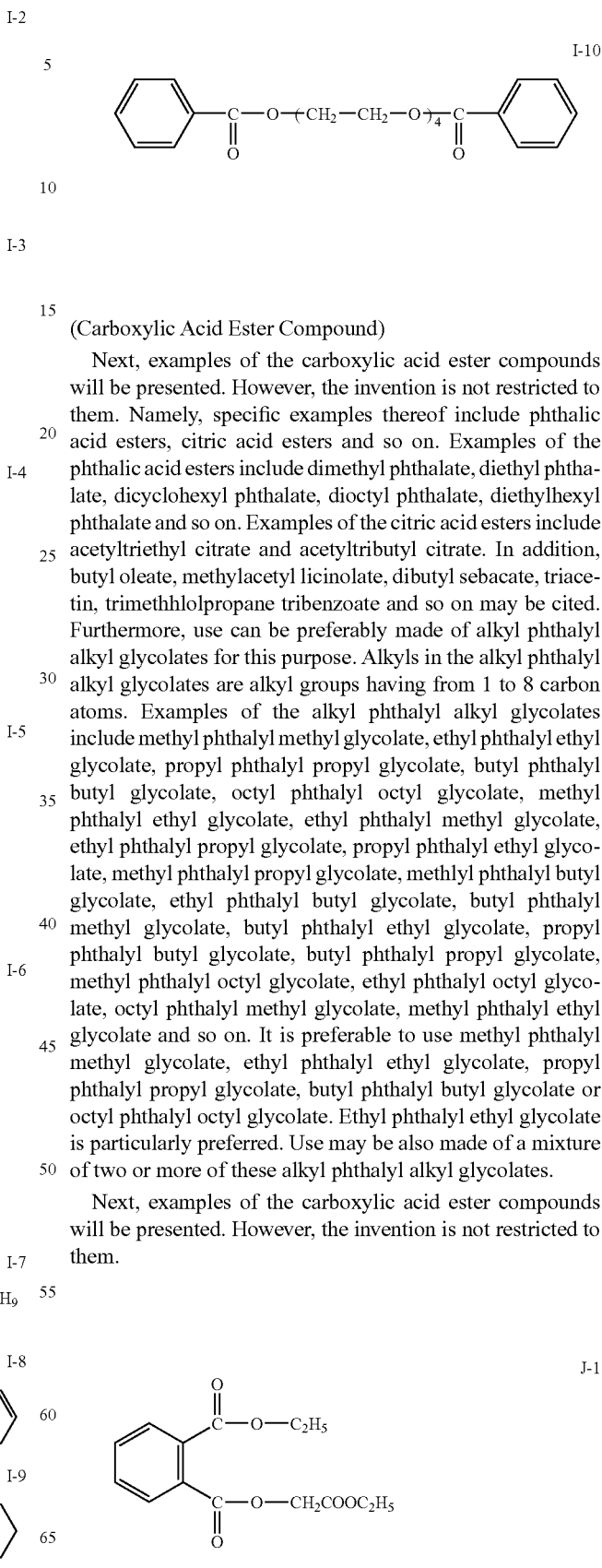

(Carboxylic Acid Ester Compound)

Next, examples of the carboxylic acid ester compounds will be presented. However, the invention is not restricted to them. Namely, specific examples thereof include phthalic acid esters, citric acid esters and so on. Examples of the phthalic acid esters include dimethyl phthalate, diethyl phthalate, dicyclohexyl phthalate, dioctyl phthalate, diethylhexyl phthalate and so on. Examples of the citric acid esters include acetyltriethyl citrate and acetyltributyl citrate. In addition, butyl oleate, methylacetyl licinolate, dibutyl sebacate, triacetin, trimethhlolpropane tribenzoate and so on may be cited. Furthermore, use can be preferably made of alkyl phthalyl alkyl glycolates for this purpose. Alkyls in the alkyl phthalyl alkyl glycolates are alkyl groups having from 1 to 8 carbon atoms. Examples of the alkyl phthalyl alkyl glycolates include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, propyl phthalyl ethyl glycolate, methyl phthalyl propyl glycolate, methlyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, methyl phthalyl ethyl glycolate and so on. It is preferable to use methyl phthalyl methyl glycolate, ethyl phthalyl ethyl glycolate, propyl phthalyl propyl glycolate, butyl phthalyl butyl glycolate or octyl phthalyl octyl glycolate. Ethyl phthalyl ethyl glycolate is particularly preferred. Use may be also made of a mixture of two or more of these alkyl phthalyl alkyl glycolates.

Next, examples of the carboxylic acid ester compounds will be presented. However, the invention is not restricted to them.

-continued

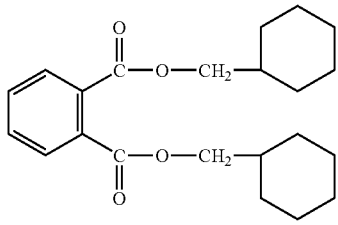
J-2

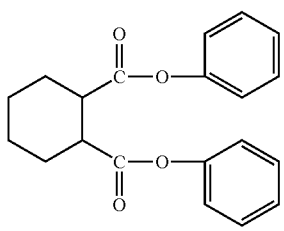
J-3

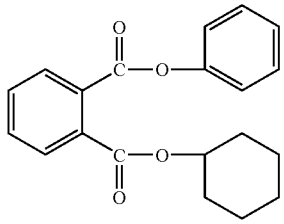
J-4

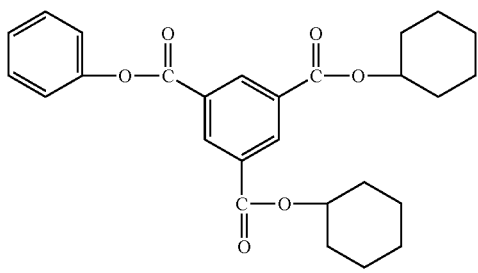
J-5

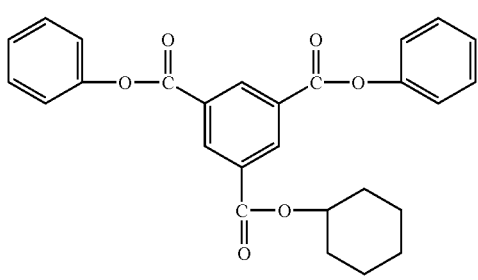
J-6

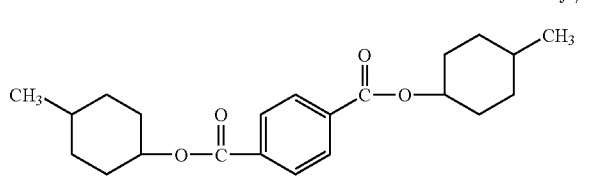
J-7

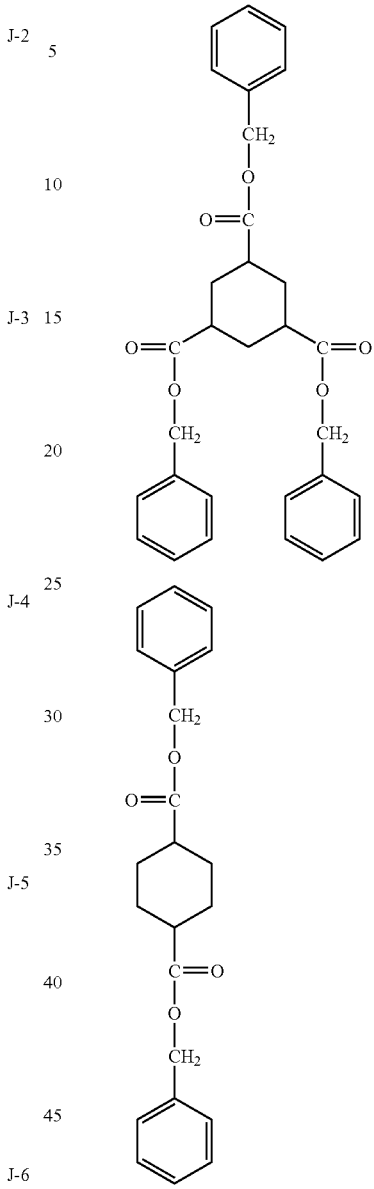

(Polycyclic Carboxylic Acid Compound)

It is preferable that the polycyclic carboxylic acid compound to be used in the invention has a molecular weight of 3000 or less, still preferably from 250 to 2000. Concerning the cyclic structure, it is preferable that a ring is composed of from 3 to 8 atoms and a 6-membered ring and/or a 5-membered ring are still preferred, though the ring size is not particularly restricted. These rings may further contain carbon, oxygen, nitrogen, silicon or other atoms. A ring may have an unsaturated bond as a part thereof. For example, the 6-membered ring may be a benzene ring or a cyclohexane ring. The compound to be used in the invention has a plural number of these cyclic structures. That is, use may be made of a compound having a benzene ring and a cyclohexane ring both in a single molecule, a compound having two cyclohexane rings, a naphthalene derivative, an anthracene derivative or the like. It is still preferable to use a compound having three or more such cyclic structures per molecule. It is also preferable that at least one of the cyclic structures has no unsaturated bond. Typical examples thereof include abietic acid and abietic acid derivatives such as dehdyroabietic acid and palustric acid. Next, chemical formulae of these compounds will be presented, though the invention is not restricted thereto.

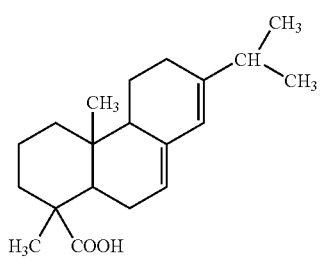

K-1

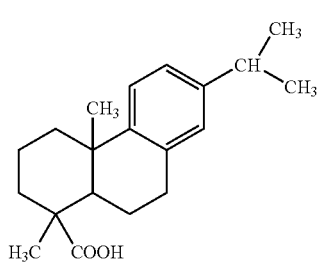

K-2

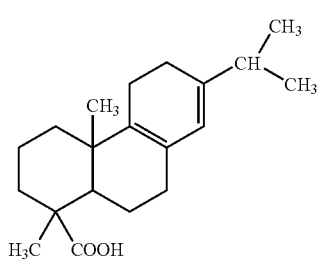

K-3

-continued

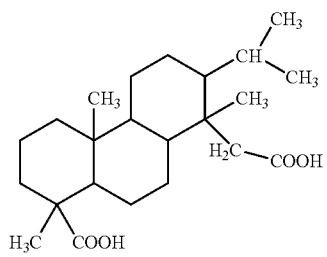

K-4

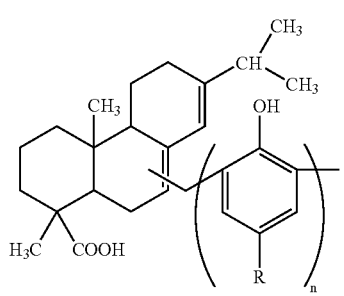

K-5

(Bisphenol Derivative)

The bisphenol derivative to be used in the invention preferably has a molecular weight of 1000 or less. Either a monomer, an oligomer or a polymer may be used within this range. Moreover, use may be made of a copolymer with another polymer or a compound modified with a reactive substituent at the terminus. Next, examples of the carboxylic acid ester compounds will be presented. However, the invention is not restricted to them.

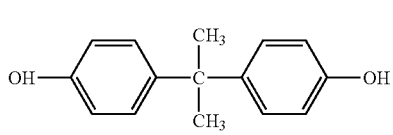

L-1

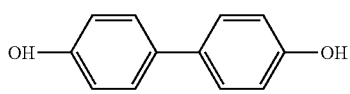

L-2

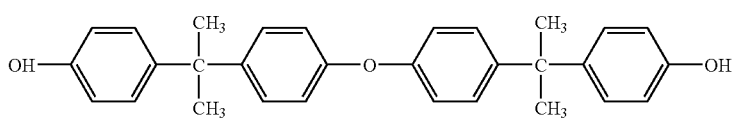

L-3

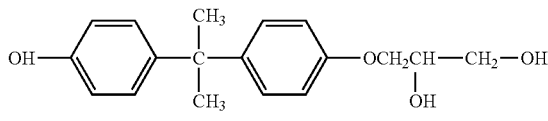

L-4

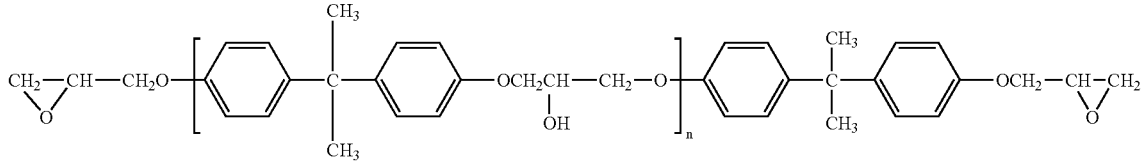

L-6

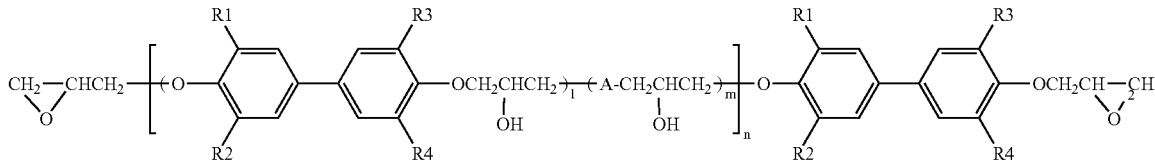

In the above specific examples of the bisphenol derivative, $R^1$ to $R^4$ represent each a hydrogen atom or an alkyl group having form 1 to 10 carbon atoms. l, m and n represent each the number of the corresponding repeating unit. It is preferable that l, m and n are each an integer of from 1 to 100, still preferably from 1 to 20, though the invention is not restricted thereto.

[Wavelength Dispersion Regulator]

Next, a compound lessening wavelength dispersion of the cellulose acylate film according to the invention will be illustrated. As the results of intensive studies, the inventors regulated the wavelength dispersion of Re and Rth of a cellulose acylate film by adding from 0.01 to 30% by mass (based on the solid cellulose acylate content) of at least one compound having an absorption in the ultraviolet region of 200 to 400 nm and capable of lowering $|Re_{(400)}-Re_{(700)}|$ and $|Rth_{(400)}-Rth_{(700)}|$ of the film. The addition level thereof ranges from 0.1 to 30% by mass to thereby regulate the Re and Rth wavelength.

The optical film, in particular, the cellulose acylate film according to the invention preferably fulfils the following formula (IV):

$$|Re_{(400)}-Re_{(700)}| \leq 10 \text{ and } |Rth_{(400)}-Rth_{(700)}| \leq 35. \quad \text{(IV)}$$

Concerning the above formula, it is preferable $|Re_{(400)}-Re_{(700)}| \leq 5$ and $|Rth_{(400)}-Rth_{(700)}| \leq 25$, still preferably $|Re_{(400)}-Re_{(700)}| \leq 3$ and $|Rth_{(400)}-Rth_{(700)}| \leq 20$.

In general, the Re and Rth values of a cellulose acylate film are larger in the long wavelength side than in the short wavelength side. It is therefore required to smoothen the wavelength dispersion by enlarging the Re and Rth values, which are relatively small, in the short wavelength side. On the other hand, a compound having an absorption in an ultraviolet region of 200 to 400 nm have wavelength dispersion characteristics wherein the absorbance in the long wavelength side is larger than that in the short wavelength side. In the case where such a compound per se is isotropically present within the cellulose acylate film, it appears that the birefringent properties and, in its turn, the wavelength dispersions of Re and Rth are larger in the short wavelength side similar to the wavelength dispersion of the absorbance.

By using a compound having an absorption in an ultraviolet region of 200 to 400 nm and seemingly showing larger wavelength dispersions of Re and Rth in the short wavelength side as discussed above, the Re and Rth wavelength dispersion of the cellulose acylate film can be regulated. For this purpose, it is required that the compound for regulating wavelength dispersion is sufficiently and uniformly compatible with cellulose acylate. The absorption zone in the ultraviolet region of such a compound preferably ranges from 200 to 400 nm, still preferably 220 to 395 nm and still preferably form 240 to 390 mm.

In recent years, optical members having excellent transmittance are needed in liquid crystal display units for TV sets, laptops, mobile phones and the like so as to elevate luminance at a small electrical power. In the case of adding a compound having an absorption in an ultraviolet region of 200 to 400 nm and being capable of lowering $|Re_{(400)}-Re_{(700)}|$ and $|Rth_{(400)}-Rth_{(700)}|$ of a cellulose acylate film, it is required from this viewpoint that the compound has an excellent spectral transmittance. In the cellulose acylate film according to the invention, it is desirable that the spectral transmittance at the wavelength of 380 nm is 45% or more but not more than 95% and the spectral transmittance at the wavelength of 350 nm is 10% or less.

From the viewpoint of vaporization properties, the molecular weight of the wavelength dispersion regulator preferably usable in the invention as described above preferably ranges from 250 to 1000, still preferably from 260 to 800, still preferably from 270 to 800 and particularly preferably from 300 to 800. So long as the molecular weight falls within this range, use may be made of either a specific monomer structure or an oligomer structure or a polymer structure having a plural number of such monomer units bonded together.

It is favorable that the wavelength dispersion regulator would not vaporize in the course of dope casting and drying in the production of the cellulose acylate film.

(Addition Level of Compound)

The wavelength dispersion regulator preferably employed in the invention is added preferably in an amount of from 0.01 to 30% by mass, still preferably from 0.1 to 20% by mass and particularly preferably from 0.2 to 10% by mass based on solid cellulose acylate content.

(Method of Adding Compound)

As the wavelength dispersion regulator, a single compound may be used. Alternatively, use can be made of a mixture of two or more compounds at an arbitrary ratio.

The wavelength dispersion regulator may be added at any step during the production of a dope. It may be added at the final sate of the dope preparation step.

Specific examples of the wavelength dispersion regulator preferably usable in the invention include benzotriazole compounds, benzophenone compounds, cyano-containing compounds, oxobenzophenone compounds, salicylic acid ester compounds, nickel complex salt compounds and so on, though the invention is not restricted to these compounds.

As the benzotriazole compounds, those represented by the formula (101) are preferably usable as the wavelength dispersion regulator in the invention.

$$Q^1\text{-}Q^2\text{-OH} \quad \text{Formula (101)}$$

In the above formulae, $Q^1$ represents a nitrogen-containing aromatic heterocycle, while $Q^2$ represents an aromatic ring.

$Q^1$ represents a nitrogen-containing aromatic heterocycle, preferably a 5- to 7-membered nitrogen-containing aromatic heterocycle and still preferably a 5- or 6-membered nitrogen-containing aromatic heterocycle such as imidazole, pyrazole, triazole, tetrazole, thiazole oxazole, selenazole, benzotriazole, benzothiazole, benzoxaxzole, benzoselenazole, thiadiazole, oxadiazole, naphthothiazole, naphtooxazole, azabenzimidazole, purine, pyridine, pyrazine, pyrimidine, pyridazine, triazine, triazaindene, tetrazaindene and so on. Still preferably, $Q^1$ represents a 5-membered nitrogen-containing aromatic heterocycle such as imidazole, pyrazole, triazole, tetrazole, thiazole, oxazole, benzotriazole, benzothiazole, benzoxazole, thiadiazole or oxadiazole, and benzotriazole is particularly preferable.

The nitrogen-containing aromatic heterocycle represented by $Q^1$ may have a substituent and examples of the substituent include the substituent T which will be described hereinafter. In the case of having a plural number of substituents, these substituents may be fused together to form an additional ring.

The aromatic ring represented by $Q^2$ may be either an aromatic hydrocarbon ring or an aromatic heterocycle. It may be a single ring or it may form a fused ring together with another ring.

Preferable examples of the aromatic hydrocarbon ring include monocyclic or bicyclic aromatic hydrocarbon rings having from 6 to 30 carbon atoms (for example, benzene ring, naphthalene ring and so on), still preferably an aromatic hydrocarbon ring having from 6 to 20 carbon atoms and still preferably an aromatic hydrocarbon ring having from 6 to 12 carbon atoms. A benzene ring is the most desirable one.

Preferable examples of the aromatic heterocycle include nitrogen atom-containing or sulfur atom-containing aromatic heterocycles. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline.

The aromatic ring represented by $Q^2$ is preferably an aromatic hydrocarbon ring, still preferably a naphthalene ring or a benzene ring and particularly preferably a benzene ring. $Q^2$ may have a substituent and examples of the substituent include the substituent T which will be described hereinafter.

Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyxoycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methyltio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as tirmethylsilyl and triphenylsilyl) and so on. These substituents may be further substituted. In the case of having two or more substituent, the substituents may be either the same or different. If possible, these substituents may be bonded together to from a ring.

As the compounds represented by the formula (101), compounds represented the following formula (101-A) are preferable.

Formula (101-A)

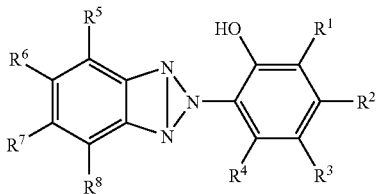

In the above formula, $R^1$, $R^2$, $R^3$, $R^4$, $R^5$, $R^6$, $R^7$ and $R^8$ independently represent each a hydrogen atom or a substituent.

$R^1$, $R^2$, $R^3$, $R^4$, $R^5$, $R^6$, $R^7$ and $R^8$ independently represent each a hydrogen atom or a substituent. As the substituent, the above-described substituents T may be used. These substituents may be further substituted by another substituent and substituents may be fused together to form a cyclic structure.

$R^1$ and $R^3$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an aryloxy group or a halogen atom, still preferably a hydrogen atom or an alkyl group having from 1 to 12 carbon atoms and particularly preferably an alkyl group having from 1 to 12 (preferably from 4 to 12) carbon atoms.

$R^2$ and $R^4$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms, particularly preferably a hydrogen atom or a methyl group and most desirably a hydrogen atom.

$R^5$ and $R^8$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms, particularly preferably a hydrogen atom or a methyl group and most desirably a hydrogen atom.

$R^6$ and $R^7$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or a halogen atom and particularly preferably a hydrogen atom or a chlorine atom.

As the compounds represented by the formula (101), compounds represented the following formula (101-B) are still preferable.

Formula (101-B)

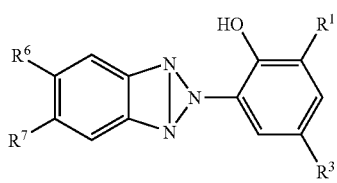

In the above formula, $R^1$, $R^3$, $R^6$ and $R^7$ have the same meanings as defined in the formula (101-A). Preferable ranges thereof are also the same.

Next, preferable examples of the compounds represented by the formula (101) will be presented, though the invention is not restricted to these specific examples.

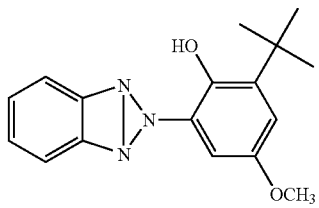

UV-1

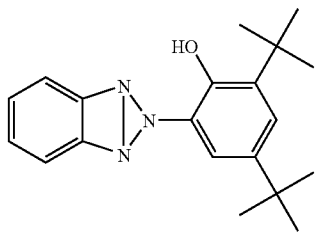

UV-2

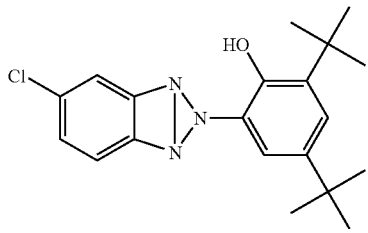

UV-3

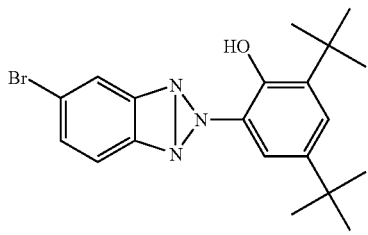

UV-4

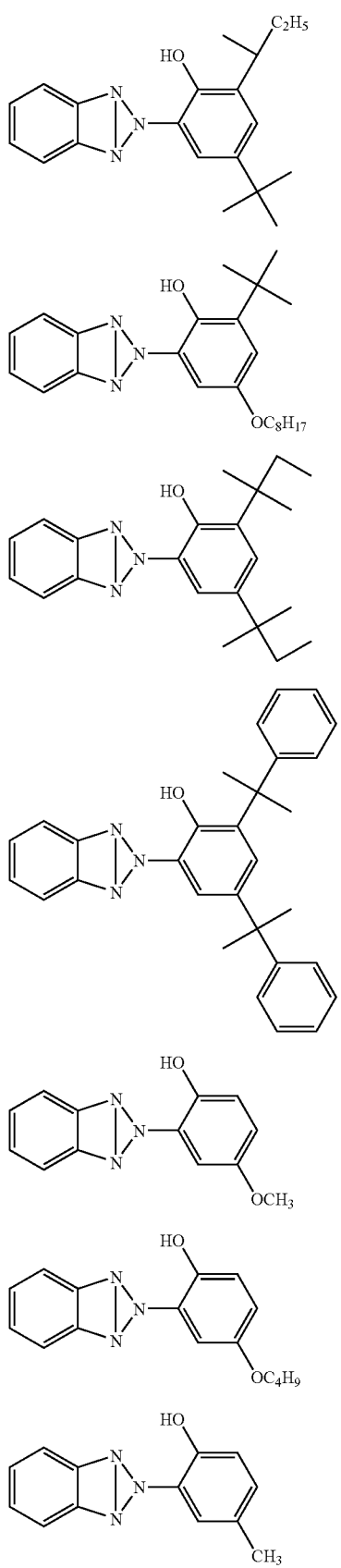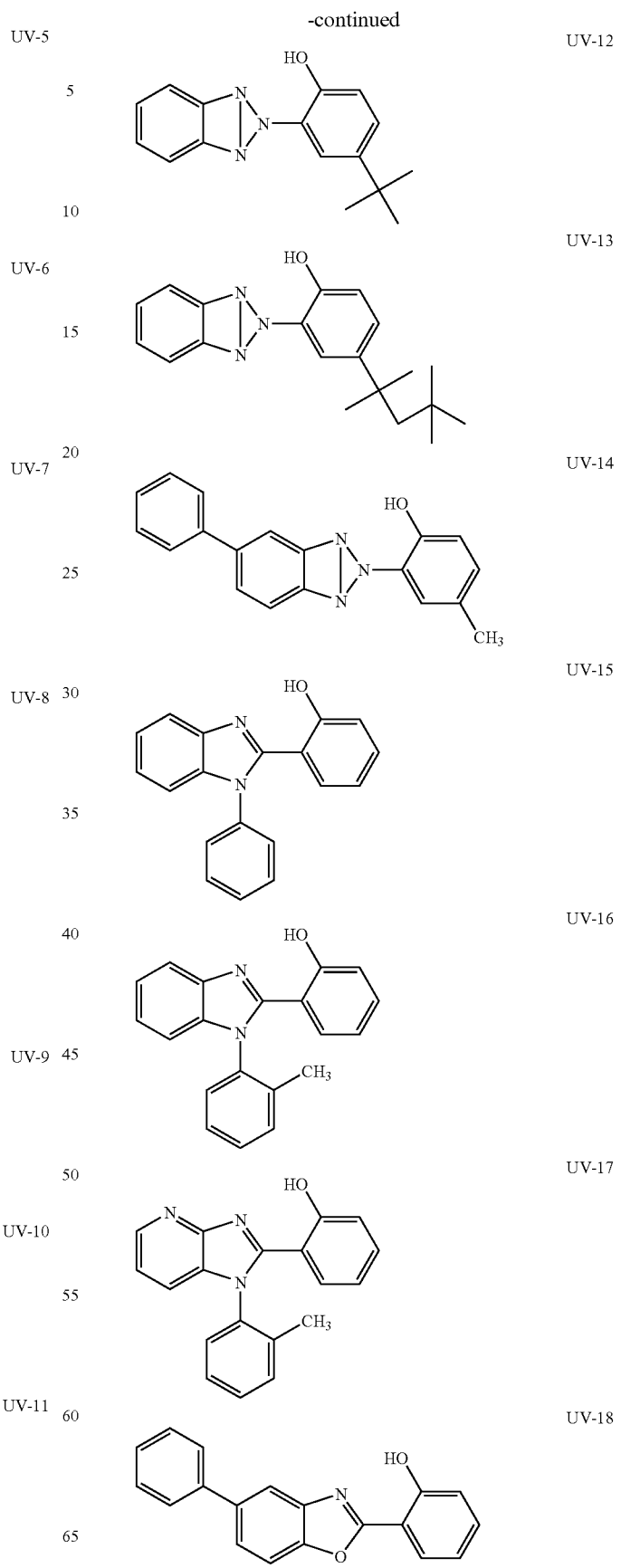

-continued

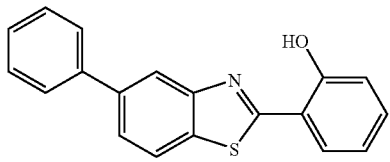
UV-19

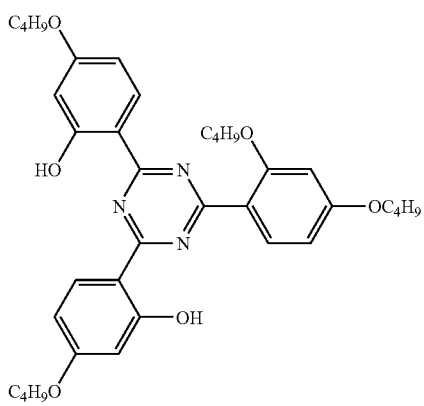
UV-20

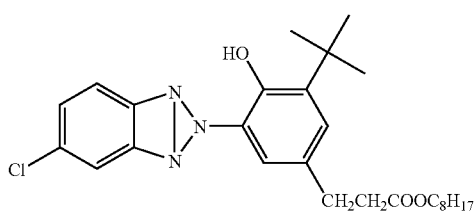
UV-21

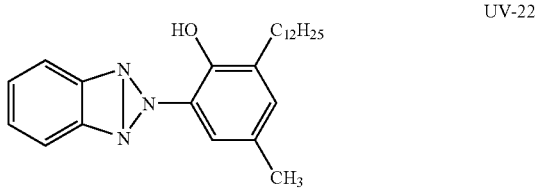
UV-22

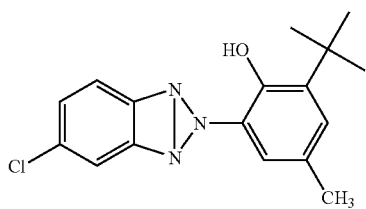
UV-23

It is confirmed that the cellulose acylate film according to the invention containing a benzotriazole compound having a molecular weight of 320 or less, from among the benzotriazole compounds presented above, is advantageous from the viewpoint of retention.

As a benzophenone compound which is one of the wavelength dispersion regulators usable in the invention, it is preferable to employ a compound represented by the following formula (102).

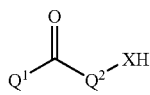

In the above formula, $Q^1$ and $Q^2$ and $Q^3$ independently represent each an aromatic ring. X represents NR (wherein R represents a hydrogen atom or a substituent).

The aromatic rings represented by $Q^1$ and $Q^2$ may be either aromatic hydrocarbon rings or aromatic heterocycles. They may be a single ring or form a fused ring together with another ring.

Preferable examples of the aromatic hydrocarbon ring represented by $Q^1$ and $Q^2$ include monocyclic or bicyclic aromatic hydrocarbon rings having from 6 to 30 carbon atoms (for example, benzene ring, naphthalene ring and so on), still preferably an aromatic hydrocarbon ring having from 6 to 20 carbon atoms and still preferably an aromatic hydrocarbon ring having from 6 to 12 carbon atoms. A benzene ring is the most desirable one.

Preferable examples of the aromatic heterocycle represented by $Q^1$ and $Q^2$ include aromatic heterocycles containing at least one of oxygen, nitrogen and sulfur atoms. Specific examples of the heterocycle include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline.

The aromatic rings represented by $Q^1$ and $Q^2$ are each preferably an aromatic hydrocarbon ring, still preferably an aromatic hydrocarbon ring having from 6 to 10 carbon atoms and still preferably a substituted or unsubstituted benzene ring.

$Q^1$ and $Q^2$ may have a substituent and examples of the substituent include the substituent T which will be described hereinafter, provided that such a substituent never contains carboxylic acid, sulfonic acid or a quaternary ammonium salt. If possible, substituents may be bonded together to form a cyclic structure.

X represents NR (wherein R represents a hydrogen atom or a substituent which include the substituent T as will be described hereinafter), an oxygen atom or a sulfur atom. It is preferable that X is NR (wherein R preferably represents an acyl group or a sulfonyl group and such a substituent may further have a substituent) or an oxygen atom. An oxygen atom is particularly preferred.

Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methyltio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as tirmethylsilyl and triphenylsilyl) and so on. These substituents may be further substituted. In the case of having two or more substituent, the substituents may be either the same or different. If possible, these substituents may be bonded together to from a ring.

As the compounds represented by the formula (102), compounds represented the following formula (102-A) are preferable.

Formula (102-A)

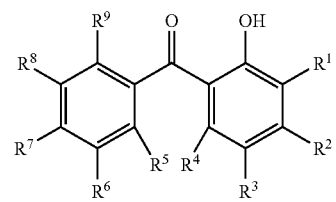

In the above formula, $R^1$, $R^2$, $R^3$, $R^4$, $R^5$, $R^6$, $R^7$, $R^8$ and $R^9$ independently represent each a hydrogen atom or a substituent.

$R^1$, $R^2$, $R^3$, $R^4$, $R^5$, $R^6$, $R^7$, $R^8$ and $R^9$ independently represent each a hydrogen atom or a substituent. As the substituent, the above-described substituents T may be used. These substituents may be further substituted by another substituent and substituents may be fused together to form a cyclic structure.

$R^1$, $R^3$, $R^4$, $R^5$, $R^6$, $R^8$ and $R^9$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms and particularly preferably a hydrogen atom or a methyl group. A hydrogen atom is the most desirable one.

$R^2$ preferably represents a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms or a hydroxy group, still preferably an alkoxy group having from 1 to 20 carbon atoms and particularly preferably an alkoxy group having from 1 to 12 carbon atoms.

$R^7$ preferably represents a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms or a hydroxy group, still preferably a hydrogen atom or an alkyl group having from 1 to 20 carbon atoms (preferably from 1 to 12 carbon atoms, still preferably from 1 to 8 carbon atoms, and still preferably a methyl group). A methyl group or a hydrogen atom is particularly preferred.

As the compounds represented by the formula (102), compounds represented the following formula (102-B) are still preferable.

Formula (102-B)

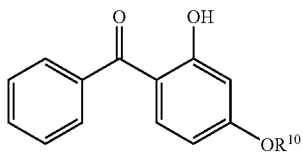

In the above formula, $R^{10}$ represents a hydrogen atom, a substituted or unsubstituted alkyl group, a substituted or unsubstituted alkenyl group, a substituted or unsubstituted alkynyl group or a substituted or unsubstituted aryl group.

$R^{10}$ represents a hydrogen atom, a substituted or unsubstituted alkyl group, a substituted or unsubstituted alkenyl group, a substituted or unsubstituted alkynyl group or a substituted or unsubstituted aryl group. As the substituent, the substituent T as described above may be used.

$R^{10}$ preferably represents a substituted or unsubstituted alkyl group, still preferably a substituted or unsubstituted alkyl group having from 5 to 20 carbon atoms, still preferably a substituted or unsubstituted alkyl group having from 5 to 12 carbon atoms (for example, n-hexyl, 2-ethylhexyl, n-octyl, n-decyl, n-dodecyl or benzyl group), and particularly preferably a substituted or unsubstituted alkyl group having from 5 to 12 carbon atoms (for example, 2-ethylhexyl, n-octyl, n-decyl, n-dodecyl or benzyl group).

The compounds represented by the formula (102) can be synthesized by a publicly known method reported in JP-A-11-12219.

Next, specific examples of the compounds represented by the formula (102) will be presented, though the invention is not restricted to these specific examples.

UV-101
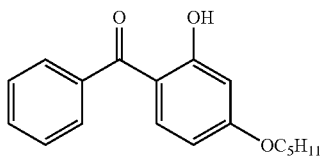

UV-102
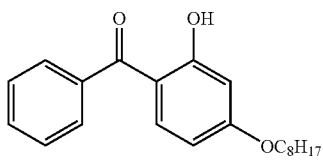

UV-103
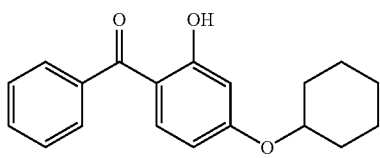

UV-104
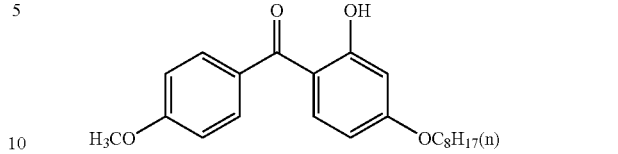

UV-105
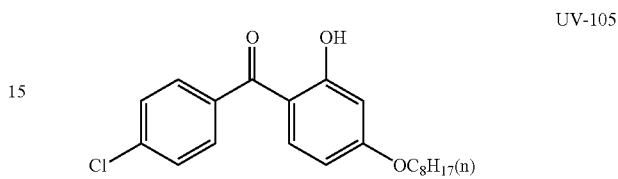

UV-106
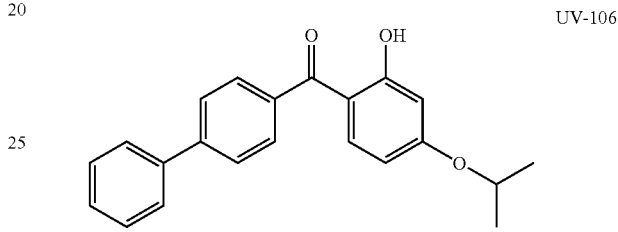

UV-107
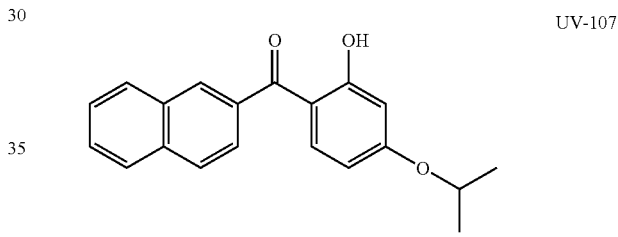

UV-108
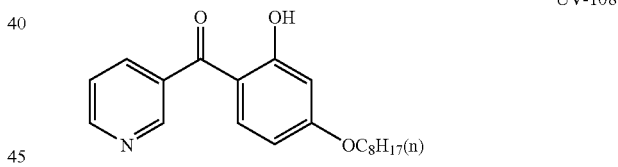

UV-109
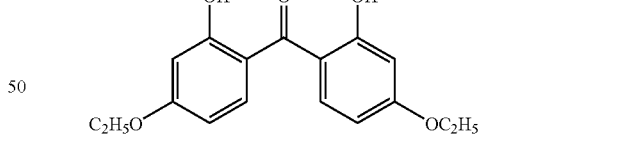

UV-110
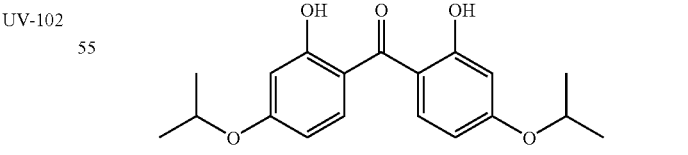

UV-111
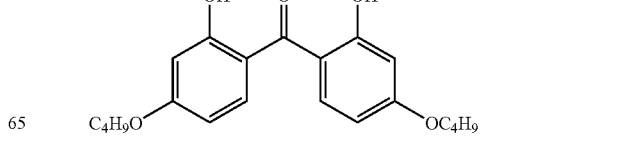

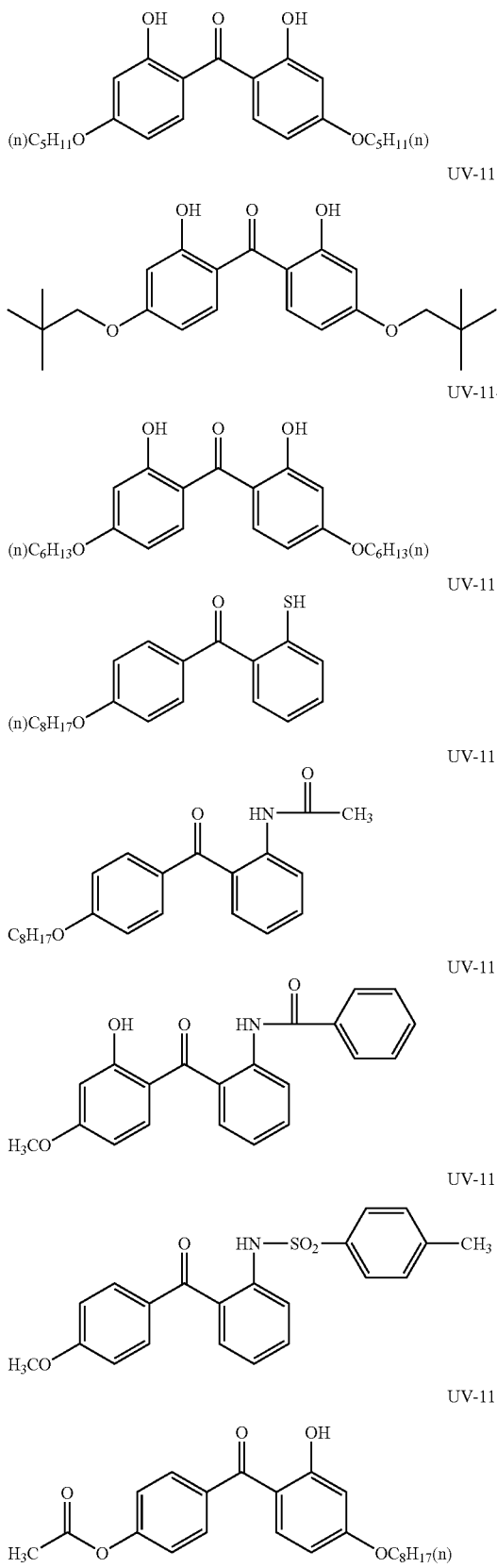

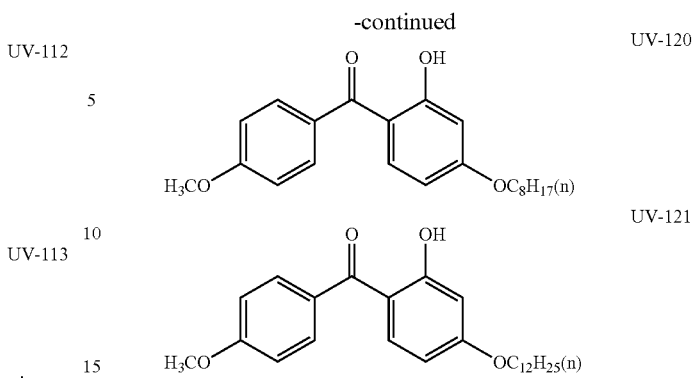

In the invention, use can be also made of a cyano group-containing compound as the wavelength dispersion regulator. As such a cyano group-containing compound, compounds represented by the formula (103) are preferred.

Formula (103)

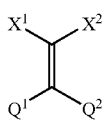

In the above formula, $Q^1$ and $Q^2$ independently represent each an aromatic ring. $X^1$ and $X^2$ represent each a hydrogen atom or a substituent, provided that at least one of them represents a cyano group, a carbonyl group, a sulfonyl group or an aromatic heterocycle.

The aromatic rings represented by $Q^1$ and $Q^2$ may be either aromatic hydrocarbon rings or aromatic heterocycles. They may be a single ring or form a fused ring together with another ring.

Preferable examples of the aromatic hydrocarbon ring include monocyclic or bicyclic aromatic hydrocarbon rings having from 6 to 30 carbon atoms (for example, benzene ring, naphthalene ring and so on), still preferably an aromatic hydrocarbon ring having from 6 to 20 carbon atoms and still preferably an aromatic hydrocarbon ring having from 6 to 12 carbon atoms. A benzene ring is the most desirable one.

Preferable examples of the aromatic heterocycle include aromatic heterocycles containing a nitrogen atom or a sulfur atom. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline.

The aromatic rings represented by $Q^1$ and $Q^2$ are each preferably an aromatic hydrocarbon ring, and still preferably a benzene ring.

$Q^1$ and $Q^2$ may have a substituent and examples of the substituent include the substituent T which will be described hereinafter. Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methyltio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as tirmethylsilyl and triphenylsilyl) and so on. These substituents may be further substituted. In the case of having two or more substituent, the substituents may be either the same or different. If possible, these substituents may be bonded together to from a ring.

$X^1$ and $X^2$ represent each a hydrogen atom or a substituent, provided that at least one of them represents a cyano group, a carbonyl group, a sulfonyl group or an aromatic heterocycle. As the substituents represented by $X^1$ and $X^2$ may be the substituents T as described above. The substituents represented by $X^1$ and $X^2$ may be substituted by another substituent. $X^1$ and $X^2$ may be fused together to form a cyclic structure.

Preferable examples of $X^1$ and $X^2$ include hydrogen atom, alkyl groups, aryl groups, cyano group, nitro group, carbonyl group, sulfonyl groups and aromatic heterocycles, still preferably cyano group, carbonyl group, sulfonyl groups and aromatic heterocycles, still preferably cyano group and carbonyl group, and particularly preferably cyano group and alkoxycarbonyl groups (—C(=O)OR wherein R represents an alkyl group having from 1 to 20 carbon atoms, an aryl group having from 6 to 12 carbon atoms or a combination thereof).

As the compounds represented by the formula (103), compounds represented the following formula (103-A) are preferable.

Formula (103-A)

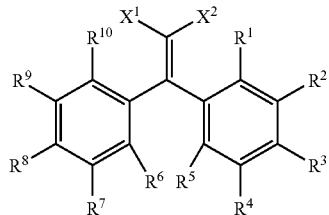

In the above formula, $R^1$, $R^2$, R, $R^4$, $R^5$, $R^6$, $R^7$, $R^8$, $R^9$ and $R^{10}$ independently represent each a hydrogen atom or a substituent. $X^1$ and $X^2$ have the same meanings as in the formula (20) and preferable ranges thereof are also the same.

$R^1$, $R^2$, $R^3$, $R^4$, $R^5$, $R^6$, $R^7$, $R^8$, $R^9$ and $R^{10}$ independently represent each a hydrogen atom or a substituent. As the substituent, the above-described substituents T may be used. These substituents may be further substituted by another substituent and substituents may be fused together to form a cyclic structure.

$R^1$, $R^2$, $R^4$, $R^5$, $R^6$, $R^7$, $R^9$ and $R^{10}$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms and particularly preferably a hydrogen atom or a methyl group. A hydrogen atom is the most desirable one.

$R^3$ and $R^8$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms or a hydroxy group, still preferably a hydrogen atom, an alkyl group having form 1 to 12 carbon atoms or an alkoxy group having from 1 to 12 carbon atoms, and particularly preferably a hydrogen atom.

As the compounds represented by the formula (103), compounds represented the following formula (103-B) are still preferable.

Formula (103-B)

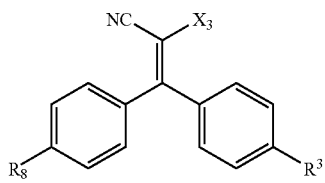

In the above formula, $R^3$ and $R^8$ have the same meanings as in the formula (103-A) and the preferable ranges thereof are also the same. $X^3$ represents a hydrogen atom or a substituent.

$X^3$ represents a hydrogen atom or a substituent and the above-described substituent T may be used as the substituent. If possible, it may be further substituted by another substituent. $X^3$ preferably represents a hydrogen atom, an alkyl group, an aryl group, a cyano group, a nitro group, a carbonyl group, a sulfonyl group or an aromatic heterocycle, still preferably a cyano group or a carbonyl group, and particularly preferably a cyano group or an alkoxycarbonyl group (—C(=O)CR wherein R represents an alkyl group having from 1 to 20 carbon atoms, an aryl group having from 6 to 12 carbon atoms or a combination thereof).

As the compounds represented by the formula (103), compounds represented the following formula (103-C) are still preferable.

Formula (103-C)

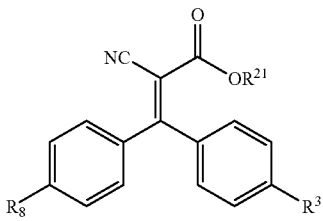

In the above formula, $R^3$ and $R^8$ have the same meanings as in the formula (103-A) and the preferable ranges thereof are also the same. $R^{21}$ represents an alkyl group having from 1 to 20 carbon atoms.

In the case where $R^3$ and $R^8$ are both hydrogen atoms, $R^{21}$ preferably represents an alkyl group having from 2 to 12 carbon atoms, still preferably an alkyl group having from 4 to 12 carbon atoms, still preferably an alkyl group having from 6 to 12 carbon atoms and particularly preferably an n-octyl group, a tert-octyl group, a 2-ethylhexyl group, an n-decyl group or an n-dodecyl group. A 2-ethylhexyl group is the most desirable.

In the case where $R^3$ and $R^8$ are both not hydrogen atoms, $R^{21}$ preferably represents an alkyl group having not more than 20 carbon atoms and making the molecular weight of the compound of the formula (103-C) 300 or more.

The compounds represented by the formula (103) can be synthesized by a method described in Journal of America Chemical Society, vol. 63, p. 3452 (1941).

Next, specific examples of the compounds represented by the formula (103) will be presented, though the invention is not restricted to these specific examples.

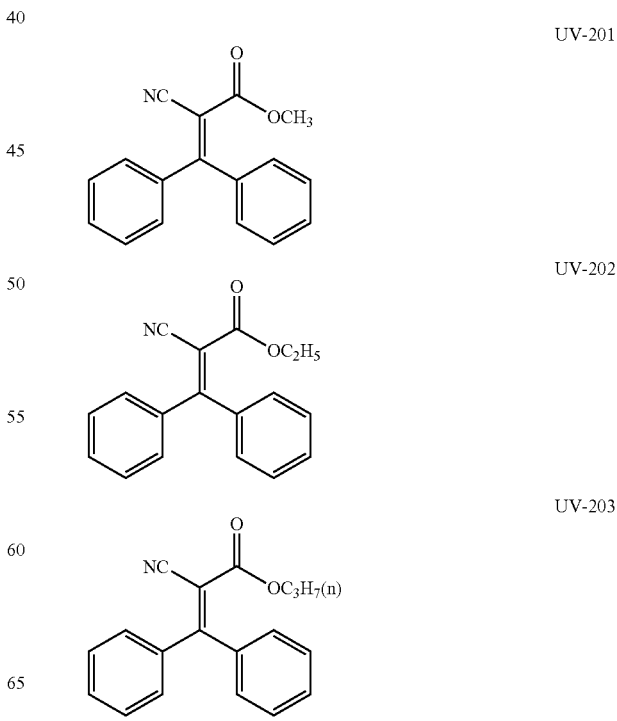

-continued
UV-204
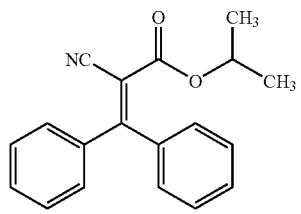
UV-205
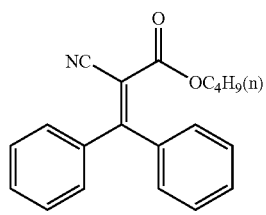
UV-206
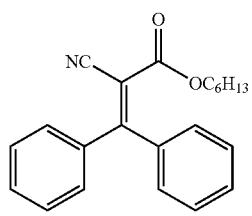
UV-207
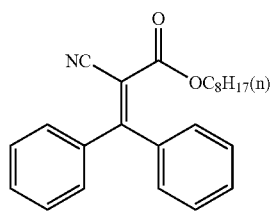
UV-208
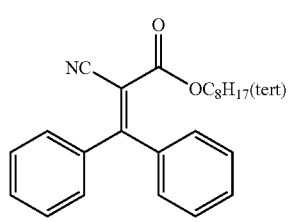
UV-209
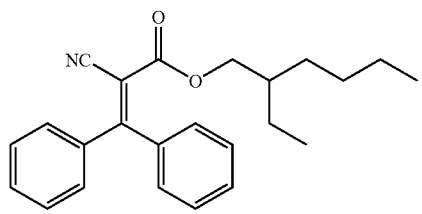
UV-210
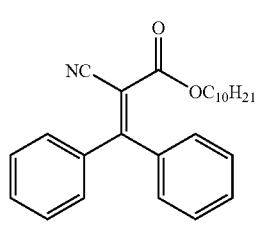
-continued
UV-211
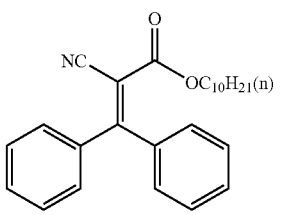
UV-212
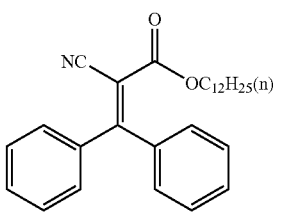
UV-213
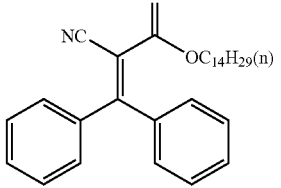
UV-214
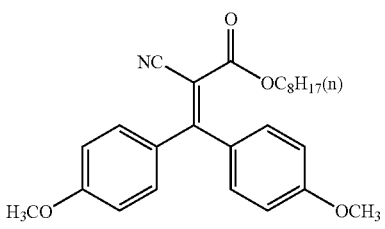
UV-215
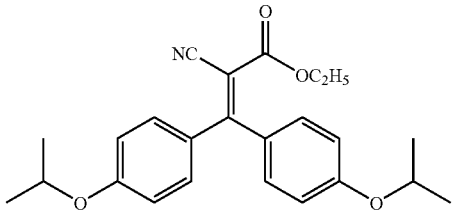
UV-216
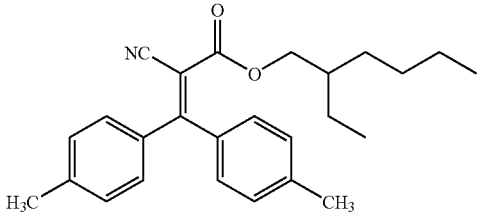
UV-217
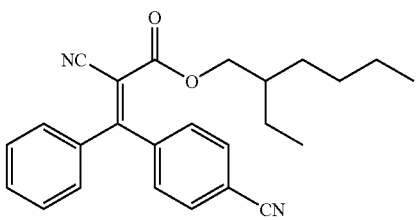

-continued
UV-218
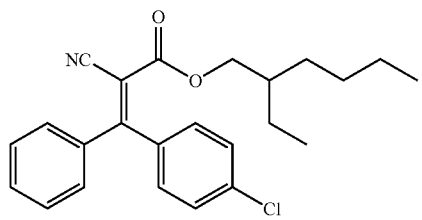
UV-219
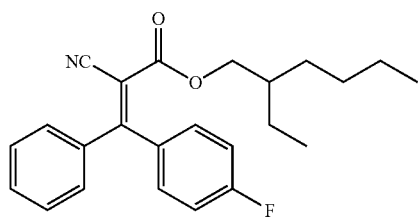
UV-220
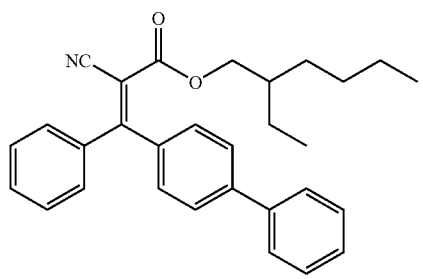
UV-221
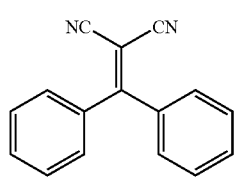
UV-222
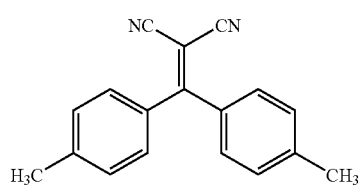
UV-223
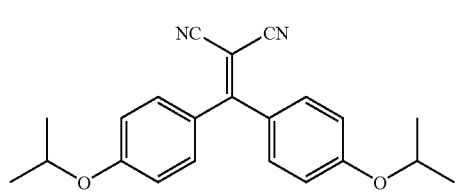
UV-224
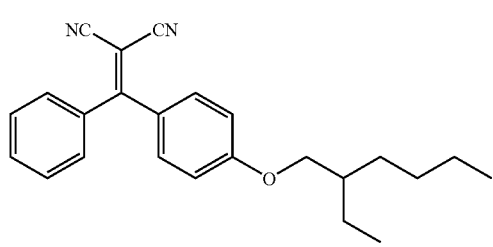
-continued
UV-225
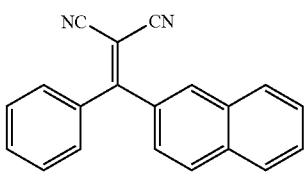
UV-226
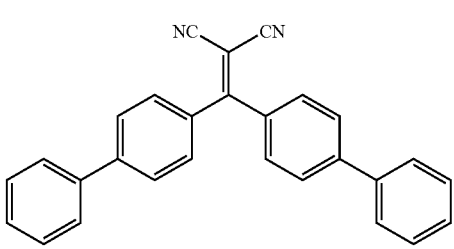
UV-227
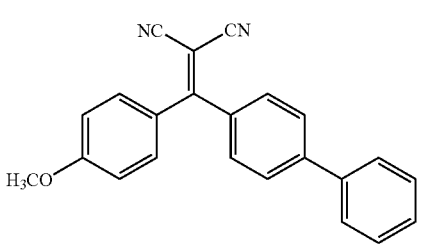
UV-228
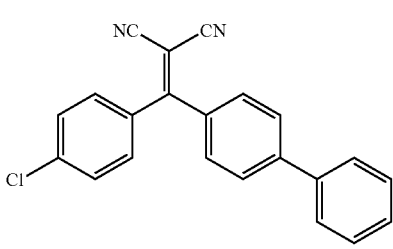
UV-229
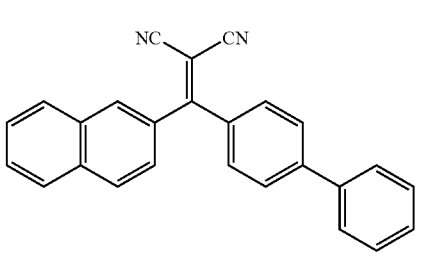
UV-230
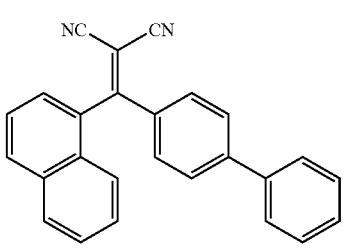

-continued

UV-231

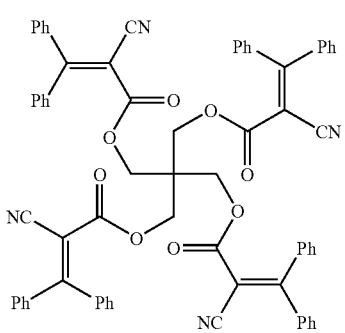

[Fine Particles of Matting Agent]

It is preferable that the optical film, in particular, the cellulose acylate film according to the invention contains fine particles as a matting agent. Examples of the fine particles usable in the cellulose acylate film include silicon dioxide, titanium dioxide, aluminum oxide, zirconium oxide, calcium carbonate, talc, clay, baked kaolin, baked calcium silicate, hydrated calcium silicate, aluminum silicate, magnesium silicate and calcium phosphate. Fine particles containing silicon are preferred because of having a low cloudiness. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are still preferable, since the haze of the resultant film can be lowered thereby. The apparent specific gravity is preferably from 90 to 200 g/l or more and still preferably from 100 to 200 g/l or more. A higher apparent specific gravity makes it possible to prepare a dispersion having the higher concentration, thereby improving haze and aggregates.

These fine particles form aggregates having an average secondary particle size of from 0.1 to 3.0 μm. In a film, these fine particles occur as aggregates of the primary particles and provides irregularities of 0.1 to 3.0 μm in height on the film surface. It is preferred that the average secondary particle size is from 0.2 nm to 1.5 μm, still preferably from 0.4 μm to 1.2 μm and most desirably from 0.6 μm to 1.1 μm. The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, R202, OX50 and TT600 (each manufactured by NIPPON AEROSIL). As the fine particles of zirconium oxide, use can be made of products marketed under the trade name of, for example, AEROSIL R976 and R811 (each manufactured by NIPPON AEROSIL).

Among these products, AEROSIL 200V and AEROSIL R972 are particularly preferable, since they are fine particles of silicon dioxide having an average primary particle size of 20 μm or less and an apparent specific gravity of 70 g/l or more and exert an effect of largely lowering the coefficient of friction while maintaining the cloudiness of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by mass, preferably from 10 to 25% by mass and most desirably from 15 to 20% by mass. A higher dispersion concentration is preferred, since the solution cloudiness is lowered and haze and aggregation are improved thereby. The final content of the cellulose acylate in the dope solution preferably ranges from 0.01 to 1.0 g/m², still preferably from 0.03 to 0.3 g/m² and most desirably from 0.08 to 0.16 g/m².

Preferable examples of lower alcohols usable as the solvent include methyl alcohol, ethyl alcohol, propyl alcohol, isopropyl alcohol and butyl alcohol. Solvents other than lower alcohols are not particularly restricted, though it is favorable to use solvents which have been employed in forming cellulose ester films.

[Plasticizer, Antidegradant and Peeling Accelerator]

In addition to the compound lowering optical anisotropy and the wavelength dispersion regulator as described above, the optical film, in particular, the cellulose acylate film according to the invention may contain various additives (for example, a plasticizer, an ultraviolet blocking agent, an antidegradant, a peeling accelerator and an infrared absorbing agent) added at various stages of the preparation depending on the purpose. These additives may be either solid substances or oily substances. Namely, they are not particularly restricted in melting point or boiling point. For example, it is possible to use a mixture of an ultraviolet absorbing agent having a melting point of 20° C. or lower with another ultraviolet absorbing agent having a melting point of 20° C. or higher. Similarly, use can be made of a mixture of plasticizers as reported by, for example, JP-A-2001-151901. Examples of the infrared absorbing dye are given in, for example, JP-A-2001-194522. Although these additives may be added at any stage during the dope preparation, a preparation step of adding the additives may be further employed as the final step of the dope preparation process. The addition level of each material is not particularly restricted, so long as the desired effect thereof can be achieved. In the case of a multilayered cellulose acylate film, moreover, individual layers may contain different types of additives in various amounts. These techniques have been conventionally known, as reported by, for example, JP-A-2001-151902. Concerning additives, moreover, use can be optionally made of the substances described in detail in Japan Institute of Invention and Innovation Journal of Technical Disclosure No. 2001-1745 (2001 Mar. 15, Japan Institute of Invention and Innovation), p. 16 to 22.

[Addition Ratio of Compounds]

In the cellulose acylate film to be used as the optical film according to the invention, the sum of the contents of compounds having a molecular weight of 3000 or less preferably amounts to 5 to 45% by mass, still preferably from 10 to 40% by mass and still preferably from 15 to 30% by mass, based on the mass of cellulose acylate. As discussed above, these compounds involve a compound lowering optical anisotropy, a wavelength dispersion regulator, an ultraviolet blocking agent, a plasticizer, an antidegradant, fine particles, a peeling accelerator, an infrared absorbing agent and so on. It is preferable that these compounds have molecular weight of 3000 or less, still preferably 2000 or less and still preferably 1000 or less. In the case where the total content of these compounds is less than 5%, the properties of cellulose acylate per se are markedly exhibited, which brings about some problems such that the optical performance and physical strength frequently vary depending on changes in temperature and humidity. In the case where the total content of these compounds exceeds 45%, the compounds are not compatible with the cellulose acylate any more. As a result, there frequently arises sedimentation of these compounds and thus the film becomes cloudy (i.e., bleeding out from the film).

[Organic Solvent of Cellulose Acylate Solution]

The cellulose acylate film according to the invention is obtained preferably by solvent cast method. Namely, the film is produced with the use of a solution of cellulose acylate dissolved in an organic solvent (a dope). As preferable examples of organic solvents to be used as the main solvent in the invention, use may be preferably made of solvents selected from among esters, ketones, ethers, alcohols and hydrocarbons having from 3 to 12 carbon atoms and halogenated hydrocarbons having form 1 to 7 carbon atoms. These esters, ketones, ethers and alcohols may have cyclic structure. It is also possible to use, as the main solvent, compounds having two or more functional groups (i.e., —O—, —CO— and —COO—) of esters, ketones and ethers and these compounds may have another functional group such as alcoholic hydroxyl group at the same time. In the case of a main solvent having two or more types of functional groups, the carbon atom number falling within the range as specified above concerning a compound having one of the functional groups.

As described above, the cellulose acylate film according to the invention may comprise, as the main solvent, either a chlorine-based halogenated hydrocarbon or a nonchlorinated organic solvent as described in Japan Institute of Invention and Innovation Journal of Technical Disclosure No. 2001-1745 (p. 12 to 16). The invention is not restricted thereto.

Other solvents for the cellulose acylate solution and film usable in the invention and dissolution methods therefore are disclosed in the following patents which are preferred embodiments: for example, JP-A-2000-95876, JP-A-12-95877, JP-A-10-324774, JP-A-8-152514, JP-A-10-330538, JP-A-9-95538, JP-A-9-95557, JP-A-10-235664, JP-A-12-63534, JP-A-11-21379, JP-A-10-182853, JP-A-10-278056, JP-A-10-279702, JP-A-10-323853, JP-A-10-237186, JP-A-11-60807, JP-A-11-152342, JP-A-11-292988, JP-A-11-60752 and so on. According to these patents, not only preferable solvents but also solution properties thereof and substances to coexist are reported, thereby presenting preferred embodiments of the invention.

[Process for Producing Cellulose Acylate Film]

[Dissolution Step]

In producing the cellulose acylate solution (dope) in the invention, the cellulose acylate is dissolved by an arbitrary method without restriction, i.e., by room-temperature dissolution, cold dissolution, hot dissolution or a combination thereof. Concerning the preparation of the cellulose acylate solution according to the invention, concentration of the solution in association with the dissolution and filtration, it is preferable to employ the process described in, for example, Japan Institute of Invention and Innovation Journal of Technical Disclosure No. 2001-1745 (2001 Mar. 15, Japan Institute of Invention and Innovation), p. 22 to 25.

(Transparency of Dope Solution)

It is preferable that the transparency of the dope of the cellulose acylate solution according to the invention is 85% or higher, still preferably 88% or higher and still preferably 90% or higher. In the invention, it is confirmed that various additives have been sufficiently dissolved in the cellulose acylate dope solution. The dope transparency in practice is determined by pouring the dope solution into a glass cell (1 cm×1 cm), measuring the absorbance at 550 nm with a spectrophotometer (UV-3150, manufactured by Shimadzu), separately measuring the solvent alone as a blank, and then calculating the transparency based on the ratio to the absorbance of the blank.

[Casting, Drying and Winding Steps]

Next, a film-forming method with the use of the cellulose acylate solution will be illustrated. Concerning a film-forming method and apparatus usable in the invention, use can be made of the solvent cast film-forming method and a solvent cast film-forming apparatus conventionally employed in forming cellulose triacetate films. A dope (a cellulose acylate solution) prepared in a dissolution machine (a pot) is once stored in a storage pot and, after defoaming, the dope is subjected to the final preparation. Then the dope is discharged from a dope exhaust and fed into a pressure die via, for example, a pressure constant-rate pump whereby the dope can be fed at a constant rate at a high accuracy depending on the rotational speed. From the pipe sleeve (slit) of the pressure die, the dope is uniformly cast onto a metallic support continuously running in the casting section. At the peeling point where the metallic support has almost rounded, the half-dried dope film (also called a web) is peeled from the metallic support. The obtained web is clipped at both ends and dried by carrying with a tenter while maintaining the width at a constant level. Subsequently, it is carried with rolls in a dryer to terminate the drying and then wound with a winder in a definite length. Combination of the tenter and the rolls in the dryer may vary depending on the purpose. In the solvent cast film-forming method to produce functional protective films for electronic displays or silver halide photosensitive materials (i.e., the main uses of the cellulose acylate film according to the invention), a coater is frequently employed, in addition to the solvent cast film-forming apparatus, so as to process the film surface by providing, for example, an undercoating layer, an antistatic layer, an anti-halation layer or a protective layer. These layers are described in detail in Japan Institute of Invention and Innovation Journal of Technical Disclosure No. 2001-1745 (2001 Mar. 15, Japan Institute of Invention and Innovation), p. 25 to 30. The techniques given in this document, which are itemized as casting (including co-casting), metallic supports, drying, peeling and so on, are preferably usable in the invention.

[Optical Film with the Use of Norbornene Polymer]

The optical film according to the invention can be obtained also via an orientation treatment of a transparent polymer resin material containing grains of an inorganic compound, which have a grain size smaller than light wavelength and sustain isotropy upon polarization or morphological isotropy, as described in JP-A-2001020891. As the polymer resin material, use can be made of a ring-opening polymer of a norbornene derivative. As the inorganic compound grains, use can be made of fine silica grains, etc.

The optical film according to the invention preferably fulfils the following formula (IX).

$$|Re_{MAX}-Re_{MIN}| \leq 3 \text{ and } |Rth_{MAX}-Rth_{MIN}| \leq 5 \qquad (IX)$$

wherein $Re_{MAX}$ and $Rth_{MAX}$ are the maximum retardation values (expressed in nm) of an arbitrary cut out film piece of 1 m square; and $Re_{MIN}$ and $Rth_{MIN}$ are the minimum retardation values (expressed in nm) thereof, each measured at the wavelength of 590 nm.

By regulating scattering in the optical anisotropy in the optical film plane, irregularities in display can be effectively prevented. Concerning the above ranges, it is still preferred $|Re_{MAX}-Re_{MIN}| \leq 1$ and $|Rth_{MAX}-Rth_{MIN}| \leq 3$.

[Exhibition of Re and Rth in Stretching or Shrinkage]

The optical film according to the invention would be subjected to stretching or shrinkage for some purposes. It is preferable that the optical film sustains a low optical anisotropy even after stretching or shrinkage. That is, it is preferred that at least one of Re and Rth of the optical film according to the invention shows a change of not more than 20 nm (measured at 590 μm), still preferably not more than 10 nm and still preferably not ore than 5%, upon stretching or shrinkage by 15% or more compared with the level before the stretching or the shrinkage. It is also preferred that at least one of Re and Rth thereof shows a change of not more than 10 nm, still preferably not more than 5 nm and still preferably not more than 2 nm, upon stretching or shrinkage by 0% or more but less than 15% with the level before the stretching or the shrinkage. It is also preferred that the slow axis direction exhibited at the stretching or the shrinkage has an angle of 0 to 90°, referring the direction parallel with the stretching direction to as 0°.

[Evaluation of Physical Characteristics of Optical Film]

[Glass Transition Temperature Tg of Film]

The glass transition temperature Tg of the optical film according to the invention preferably ranges from 80 to 165° C. From the viewpoint of heat resistance, Tg preferably ranges from 100 to 160° C., still preferably form 110 to 150° C. Glass transition temperature Tg is calculated by heating a sample (10 mg) of the film according to the invention from room temperature to 200° C. at a speed of 5° C./min and measuring calorie with a differential scanning calorimeter (DSC 2910, manufactured by T.A. Instrument).

[Haze of Film]

The haze of the optical film according to the invention preferably ranges from 0.01 to 2.0%/, still preferably from 0.05 to 1.5% and still preferably from 0.11 to 1.0%. Transparency of a film is an important factor as an optical film. Haze is measured by using a sample (40 mm×80 mm) of the film according to the invention in accordance with the method defined in JIS K-6714 at 25° C. and 60% RH with the use of a haze meter (HGM-2DP manufactured by SUGA SHIKENKI).

[Humidity-dependencies of Re and Rth of Film]

It is preferable that both of the retardation value in plane Re and the retardation value in the film thickness direction Rth of the optical film, in particular, the cellulose acylate film according to the invention show little changes depending on humidity. More specifically speaking, it is preferable that the difference $\Delta Rth_{(590)}$ between $Rth_{(590)}$ at 25° C. and 10% RH and $Rth_{(590)}$ at 25° C. and 80% RH (i.e., $\Delta Rth_{(590)}$=Rth10% RH–Rth80% RH) ranges from 0 to 50 nm, still preferably from 0 to 40 nm and still preferably from 0 to 35 nm.

[Equilibrated Moisture Content of Film]

To avoid worsening in the adhesiveness to a water-soluble polymer (for example, polyvinyl alcohol) in the case of using a protective film of a polarizing plate, the optical film, in particular, the cellulose acylate film according to the invention has an equilibrated moisture content at 25° C. and 80% RH of from 0 to 4%, still preferably from 0.1 to 3.5% and particularly preferably from 1 to 3%, regardless of the film thickness. It is undesirable that the equilibrated moisture content is 4% or more, since the film retardation excessively depends on humidity change in the case of using an optical compensation film support.

The moisture content is measured by the Karl Fischer method with the use of a sample (7 mm×5 mm) of the cellulose acylate film according to the invention, a water content meter and sample dryer (CA-03, VA-05 both manufactured by MITSUBISHI CHEMICAL CO.). The water content (g) is divided by the sample weight (g).

[Vapor Transmission Rate of Film]

It is preferable that the vapor transmission rate of the optical film according to the invention, which is measured in accordance with the method defined by JIS Z0208 at the temperature of 60° C. and the humidity of 95% RH, is from 400 to 2000 g/m²·24 h in terms of 80 μm in film thickness, still preferably from 500 to 1800 g/m²·24 h and still preferably from 600 to 1600 g/m²·24 h. In the case where the vapor transmission rate exceeds 2000 g/m²·24 h, the absolute values of the humidity-dependencies of Re and Rth of the film frequently exceed 0.5 nm/% RH. This is also undesirable in the case of laminating an optical anisotropic layer on the optical film according to the invention to give an optical compensation film, since the absolute values of the humidity-dependencies of Re and Rth of the film frequently exceed 0.5 nm/% RH too. When an optical compensation sheet or a polarizing plate having such a film in a liquid crystal display unit, there arise some problems such as a change in color hue or lowering in the viewing angle. In the case where the vapor transmission rate of the film is less than 400 g/m²·24 h, on the other hand, the film inhibits drying of an adhesive and thus causes adhesion failure when bonded to both faces of a polarizing plate etc.

The vapor transmission rate is lowered with an increase in the film thickness of a cellulose acylate film and elevated with a decrease in the film thickness. It is therefore necessary to convert the vapor transmission rate of any sample by setting a standard film thickness of 80 μm. The film thickness is calculated as follows: (vapor transmission rate converted as film thickness of 80 μm=measured vapor transmission rate×measured film thickness (μm)/80 μm).

Vapor transmission rate can be measured in accordance with the method described in *Kobunshi no Bussei II* (*Kobunshi Jikken Koza* 4, *Kyoritsu Shuppan*), p. 285-294: *Joki Toka Ryo no Sokutei* (*Shituryo Ho, Ondokei Ho, Jokiatsu Ho, Kyuchaku Ho*). Samples (diameter: 70 mm) of the optical film according to the invention are conditioned at 25° C. and 90% RH and at 60° C. and 95% RH each for 24 hours. Then the moisture content per unit area (g/m²) is measured in accordance with the method defined by JIS Z-0208 with the use of a vapor transmission test machine (KK-709007, manufactured by TOYO SEIKI SEIKSAKUSHO Ltd.) followed by the calculation (vapor transmission rate=mass after conditioning−mass before conditioning).

[Dimensional Change of Film]

Concerning the dimensional stability of the optical film, in particular, the cellulose acylate film according to the invention, it is preferable that the film shows a dimensional change rate of 5% or less, still preferably 0.3% or less and still preferably 0.15% or less, both in the cases of allowing to stand at 60° C. and 90% RH for 24 hours (high humidity) and allowing to stand at 90° C. and 5% RH for 24 hours (high temperature).

The dimensional change rate is measured in practice by preparing two cellulose acylate film samples (30 mm×120 mm), conditioning the samples at 25° C. and 60% RH for 24 hours, punching holes (6 mm in diameter) at both ends of each samples at intervals of 100 mm (L0: the original punching interval) with the use of an automatic pin gauge (manufactured by SHINTO SCIENTIFIC Co., Ltd.). Next, one of the samples was treated at 60° C. and 90% RH for 24 hours and then the punching intervals (L1) were measured. Separately, the other samples was treated at 90° C. and 6% RH for 24 hours and then the punching intervals (L2) were measured. Each measurement was made down to the minimal level of $\frac{1}{1000}$ mm. The dimensional change rate ratio is determined by calculating the dimensional change rate at 60° C. and 90% RH (high humidity)={|L0−L1|/L0}×100 and the dimensional change rate at 90° C. and 5% RH (high temperature)={|L0−L2|/L0}×100.

[Elastic Modulus of Film]

(Elastic Modulus)

The elastic modulus of the optical film according to the invention preferably ranges from 200 to 500 kgf/mm$^2$, still preferably form 240 to 470 kgf/mm$^2$ and still preferably from 270 to 440 kgf/mm$^2$. The elastic modulus is determined in practice by measuring the stress at a 0.5% elongation at a tensile speed of 10%/min in an atmosphere at 23° C. and 70% RH with the use of a multipurpose tensile test machine STM T50BP (TOYO BALDWIN).

[Coefficient of Photoelasticity of Film]

(Coefficient of Photoelasticity]

The coefficient of photoelasticity of the optical film according to the invention is preferably 25×10$^{-13}$ cm$^2$/dyne (25×10$^{-12}$ Pa) or less, still preferably 1×10$^{-13}$ cm$^2$/dyne(25× 10$^{-12}$ Pa) or less and still preferably 5×10$^{-13}$ cm$^2$/dyne(25× 10$^{-12}$ Pa) or less. The coefficient of photoelasticity is measured in practice by applying a tensile stress in the longitudinal direction to a film sample (12 mm×120 mm) and measuring the retardation with an ellipsometer (M150 manufactured by JASCO ENGINEERING). Then the coefficient of photoelasticity is calculated based on the change in retardation due to the stress. By controlling the coefficient of photoelasticity of the film within the range as specified above, display irregularities caused by changes in a display unit depending on temperature and humidity can be lessened.

[Method of Evaluating the Film According to the Invention]

The optical film according to the invention is evaluated by using the following measurement methods.

(Retardation Value in Plane Re and Retardation Value in the Film Thickness Direction Rth)

After conditioning a sample (30 mm×40 mm) qt 25° C. and 60% RH for 2 hours, Re(λ) is measured by the incidence of a ray of λ nm in wavelength in the normal direction with the use of an automatic double refractometer KOBRA 21 ADH (manufactured by OJI KEISOKU KIKI). Rth(λ) is determined by using a presumptive average refractive index 1.48 and the film thickness based on retardation values measured in three directions, i.e., Re(λ) as described above, a retardation value measured by the incidence of a ray of λ nm in wavelength in a direction inclining at 0° and 40° to the normal direction (0°) of the film using the slow axis in the plane as the incline angle. Unless otherwise noted, Re and Rth presented herein are values measured at the wavelength of 590 nm.

(Transmittance)

By using a transparency meter (AKA phototube chronometer, manufactured by KOTAKI SEISAKUSHO), the visible light (615 nm) transmittance of a sample (20 mm×70 mm) is measured at 25° C. and 60% RH.

(Spectral Characteristics)

The transmittance at a wavelength of from 300 to 450 nm of a sample (13 mm×40 mm) is measured at 25° C. and 60% RH by using a spectrophotometer (U-3210, manufactured by HITACHI, Ltd.). Tilt width is determined as (wavelength at 72%−wavelength at 5%). Limiting wavelength is represented by (tilt width/2)+wavelength at 5%. Absorption end is expressed in the wavelength at the transmittance of 0.4%. Thus, the transmittances at 380 nm and 350 nm are evaluated.

[Film Face Figure]

Concerning the face figure of the optical film according to the invention, it is preferable that the arithmetic average roughness (Ra) of peaks and valleys on the film surface in accordance with JIS B0601-1994 is not more than 0.1 μm and the maximum height (Ry) is not more than 0.5 μm. It is still preferable that the arithmetic average roughness (Ra) is not more than 0.05 μm and the maximum height (Ry) is not more than 0.2 μm. Peaks and valleys on the film surface can be evaluated by using an atomic force microscope (AFM).

[Mechanical Characteristics of Film]

[Curl]

The degree of curl of the optical film according to the invention in the width direction preferably ranges from −10/m to +10/m. In the case where the degree of curl of the optical film according to the invention in the width direction is outside the range as specified above, there arise troubles in handling the film in a continuous sheet aid film cutting sometimes occurs in the course of the surface treatment, the rubbing treatment for the formation of an optical anisotropic layer, the formation of an orientated film or the formation and bonding of the optical anisotropic layer, as will be described hereinafter. In this case, moreover, the film undergoes strong contact with carrying rolls at the film edges or center, which frequently causes dusting. Thus, a large amount of dusts and debris adhere to the film. As a result, serious defect spots and coating stripes beyond the permissible frequency level are sometimes observed in laminating an optical anisotropic layer to give an optical compensation film. It is also favorable to regulate the degree of curl within the range as specified above, since color spot failures, which are frequently observed in forming an optical anisotropic layer, can be relieved and bubbling upon bonding to a polarizer can be avoided thereby.

The degree of curl can be measured in accordance with the measurement method specified by American National Standard Institute (ANSI/ASCPH 1.29-1985).

(Tear Strength)

It is preferable that the optical film according to the invention (film thickness: from 20 to 80 μm) has a tear strength determined by the test method in accordance with JIS K7128-2:1998 (Elmendorf tear strength test) of 2 g or more, still preferably form 5 to 25 g and still preferably from 6 to 25 g. In terms of the film thickness of 60 μm, it is preferable that the tear strength is 8 g or more and still preferably from 8 to 15 g. The measurement can be made in practice by conditioning a sample piece (50 mm×64 mm) at 25° C. and 65% RH for 2 hours and then treating with a light-load tear strength test machine.

[Amount of Solvent Remaining in Film]

In producing the optical film according to the invention, drying is preferably made under such conditions as controlling the amount of the solvent remaining in the optical film to from 0.01 to 1.5% by mass, still preferably form 0.01 to 1.0% by mass. By regulating the amount of the solvent remaining in the optical film according to the invention to less than 1.5% by mass, curling can be prevented. It is preferable that the amount of the remaining solvent is 1.0% by mass or less. It appears that this is mainly caused by the fact that the free sedimentation is lessened by reducing the amount of the remaining solvent in the film-formation step of the solvent cast method as described above. However, it would not apply to the case of stretching or shrinking the film. The amount of the remaining solvent in the course of stretching or shrinkage will be separately discussed. The amount (% by mass) of the solvent remaining in the film as used herein is based on the mass of the dry film form which the solvent has been completely removed. The amount (% by mass) of the remaining solvent is measured by subjecting a sample (7 mm×35 mm) to gas chromatography (GC-18A, manufactured by Shimadzu) to thereby quantify the base remaining solvent.

[Coefficient of Humidity Expansion]

It is preferable to control the coefficient of humidity expansion of the optical film according to the invention to $30\times10^{-5}$/% RH or less, still preferably $15\times10^{-5}$/% RH and still preferably $10\times10^{-5}$/% RH. Although a smaller coefficient of humidity expansion is the better, it is usually not more than $1.0\times10^{-5}$/% RH. Coefficient of humidity expansion means a change in the length of a sample caused by a change in relative humidity at a constant temperature. By appropriately controlling the coefficient of humidity expansion, light leakage caused by a frame-like increase in transmittance (i.e., distortion) of the optical film according to the invention employed as a support of an optical compensation film can be prevented while sustaining the optical compensation performance of the optical compensation film.

[Surface Treatment]

If necessary, the optical film according to the invention may be surface-treated to thereby improve the adhesion thereof to various functional layers (for example, an undercoating layer and a back layer). As the surface treatment, use can be made of glow discharge treatment, ultraviolet irradiation treatment, corona discharge treatment, flame treatment and acid- or alkali-treatment. The glow discharge treatment as used herein may be either low-temperature plasma treatment under a low gas pressure of $10^{-3}$ to 20 Torr or plasma treatment under atmospheric pressure. Examples of a plasma excitation gas, which is a gas plasma excited under the above conditions, include argon, helium, neon, krypton, xenon, nitrogen, carbon dioxide, chlorofluorocarbons such as tetrafluoromethane and mixtures thereof. These gases which are described in detail in Japan Institute of Invention and Innovation Journal of Technical Disclosure No. 2001-1745 (2001 Mar. 15, Japan Institute of Invention and Innovation), p. 30 to 32 are preferably usable in the invention.

[Contact Angle of Film Surface by Alkali Saponification Treatment]

Alkali saponification treatment may be cited as one of effective means of surface treatment of the optical film, in particular, the cellulose acylate film according to the invention to be used as a transparent protective film of a polarizing plate. In this case, it is preferable from the viewpoint of adhesiveness that the alkali-saponified film surface has a contact angle of 55° or less, still preferably 50° or less and still preferably 45° or less. The contact angle is determined by a conventional method for evaluating hydrophilic/hydrophobic nature which comprises dropping a water drop of 3 mm in diameter on the alkali-saponified film surface and measuring the angle between the film surface and the water drop.

[Functional Layer]

The optical film according to the invention is applicable to optical purposes and photosensitive materials. Concerning the optical purposes, it is particularly preferably employed in a liquid crystal display unit, still preferably in a liquid crystal display unit comprising a liquid crystal cell having liquid crystals between a pair of electrode substrates, two polarizers provided in both sides of the cells and at least one optical compensation film located between the liquid crystal cell and a polarizer. Preferable examples of such liquid crystal display units include TN, IPS, FLC, AFLC, OCB, STN, ECB, VA and HAN.

In the case of using the optical film according to the invention for the optical purposes as described above, it has been a practice to form various functional layers, for example, an antistatic layer, a hardened resin layer (a transparent hard coat layer), an antireflective layer, an adhesion-facilitating layer, an antiglare layer, an optical compensation layer, an orientated layer, a liquid crystal layer and so on. As examples of these functional layers and materials thereof usable in the optical film according to the invention, citation may be made of a surfactant, a slip agent, a matting agent, an antistatic layer, a hard coat layer and so on which are described in detail in Japan Institute of Invention and Innovation Journal of Technical Disclosure No. 2001-1745 (2001 Mar. 15, Japan Institute of Invention and Innovation), p. 32 to 45 and preferably usable in the invention.

[Usage (Optical Compensation Film)]

The optical film according to the invention is usable for various purposes. It is particularly effective to employ the optical film according to the invention as an optical compensation film in a liquid crystal display unit. An optical compensation film means an optical material which is usually employed in liquid crystal display units to compensate for phase contrast. Namely, it has the same meaning as an phase contrast plate, an optical compensation sheet, etc. Because of having birefingent properties, an optical compensation film is employed in order to relieve coloration in a display screen of a liquid crystal display unit or improve viewing angle characteristics. The optical film according to the invention has small optical anisotropy in terms of $Re_{(590)}$ and $Rth_{(590)}$ (i.e., $0 \leq Re_{(590)} \leq 10$ and $|Rth_{(590)}| \leq 25$) and small wavelength dispersion (i.e., $|Re_{(400)} - Re_{(700)}| \leq 10$ and $|Rth_{(400)} - Rth_{(700)}| \leq 35$). When it is used together with an optical anisotropic layer having birefringence, therefore, the optical performance of the optical anisotropic layer can be exclusively achieved without showing any undesired anisotropy.

In the case of using the optical film according to the invention as an optical compensation film in a liquid crystal display unit, it is therefore favorable that the optical anisotropic layer used together has $Re_{(590)}$ of from 0 to 200 nm and $|Rth_{(590)}|$ of form 0 to 400 nm. Any optical anisotropic layer may be used so long as its $Re_{(590)}$ and $Rth_{(590)}$ fall within the respective ranges as defined above.

In the liquid crystal display unit having the optical film according to the invention, any optical anisotropic layer required in the optical compensation film can be employed without particularly restricted by the optical performance of the liquid crystal cell or the driving system. The optical anisotropic layer employed together may be made of either a composition containing a liquid crystal compound or a birefringent polymer film. It is favorable in the invention to from the optical anisotropic layer from a polymer film with negative birefringence.

As the liquid crystal compound as described above, a discotic liquid crystal compound or a rod-like liquid crystal compound is preferred.

(Discotic Liquid Crystal Compound)

Examples of the discotic liquid crystal compound usable in the invention include compounds described in various documents (C. Destrade et al., Mol. Crysr. Liq. Cryst., vol. 71, page 111 (1981); ed. by Nihon Kagaku-kai, *Kikan Kagaku Sosetsu*, No. 22, *Ekisho no Kagaku*, cahp. 5, chap. 10, par. 2 (1994); B. Kohne et al., Angew. Chem. Soc. Chem. Comm., page 1794 (1985); and J. Zhang et al., J. Am. Chem. Soc., vol. 116, page 2655 (1994)).

In the optical anisotropic layer, it is preferable that the discotic liquid crystal molecules have been fixed in the orientated state. It is most desirable that these molecules have been fixed via a polymerization reaction. Polymerization of discotic liquid crystal molecules is reported in JP-A-8-27284. To fix discotic liquid crystal molecules by polymerization, it is necessary to attach a polymerizable group as a substituent to the disc core of a discotic liquid molecule. When such a polymerizable group is attached directly to the disc core, however, the fixed state can be hardly maintained during the polymerization. Therefore, a linking group is introduced between the disc core and the polymerizable group. Such discotic liquid crystal molecules having polymerizable group are disclosed in JP-2001-4387.

(Rod-like Liquid Crystal Compound)

Examples of the rod-like liquid crystal compound usable in the invention include azomethines, azoxys, cyanobiphenyls, cyanophenyl esters, benzoic acid esters, cyclohexanecarboxlic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles. In addition to these low-molecular weight liquid crystal compounds, use can be also made of high-molecular weight liquid crystal compounds.

In the optical compensation layer, it is preferable that rod-like liquid crystal molecules are fixed in the orientated state, most desirably having been fixed via a polymerization reaction. Examples of the polymerizable rod-like liquid crystal compound usable in the invention include compounds described in *Makromol. Chem.*, vol. 190, p. 255 (1989), *Advanced Materials*, vol. 5, p. 107 (1993), U.S. Pat. No. 4,683,327, U.S. Pat. No. 5,622,648, U.S. Pat. No. 5,770,107, WO 95/22586, WO 95/24455, WO 97/00600, WO 98/23580, WO 98/52905, JP-A-1-272551, JP-A-6-16616, JP-A-7-110469, JP-A-11-80081 and JP-A-2001-328973.

(Optical Anisotropic Layer Made of Polymer Film)

As described above, the optical anisotropic layer may be made of a polymer film. In such a case, the polymer film comprises a polymer capable of exhibiting optical anisotropy. Examples of such a copolymer include polyolefins (for example, polyethylene, polypropylene and polynorbornene polymers), polycarbonate, polyallylate, polysulfone, polyvinyl alcohol, polymethacrylic acid esters, polyacrylic acid esters, cellulose esters (for example, cellulose triacetate and cellulose diacetate), polyaryl ether ketone, polyether ketone, polyamide, polyester, polyimide, polyamide imide and polyester imide. It is also possible to use a copolymer of these polymers or a polymer mixture. More specifically speaking, polyamides and polyester imides described in JP-A-2004-4474, JP-A-61-162512 and JP-A-64-38472 may be cited.

It is preferable that the optical anisotropy of the polymer film is achieved by stretching and/or shrinking the polymer film. Uniaxial or biaxial stretching is preferred. More specifically speaking, it is preferable to employ longitudinal uniaxial stretching with the use of a difference in circumferential speed between two or more rolls, tenter stretching in the width direction while clipping the polymer film at both sides, or biaxial stretching by combining the same. It is also possible that two or more polymer films are laminated so that the optical properties of the composite films fulfill the above requirements as a whole. To minimize irregularities in birefringence, it is preferable to produce the polymer film by the solvent cast method. The thickness of the polymer film preferably ranges from 20 to 500 µm, most desirably from 40 to 100 µm.

[Formation of Optical Anisotropic Layer by Applying Solid Polymer]

In the invention, the optical anisotropic layer is formed by (spreading) applying a liquefied solid polymer to the optical film according to the invention, then fixing thereon to give a transparent film, and then carrying out an orientation treatment to give an optical compensation film (a birefringent film) having properties of nx>ny>nz (wherein nx and ny represent each the refractive index in plane, while nz represents the refractive index in the thickness direction. nx is a refractive index along the slow axis in the film plane; ny is a refractive index along the direction perpendicular to the slow axis in the film plane) imparted thereto. Upon the molecular orientation treatment, the optical film according to the invention would show no optical anisotropy and, therefore, a uniform biaxial film can be formed, thereby facilitating optical design and the like.

The solid polymer for forming the birefringent film is not particularly restricted and one or more polymers having appropriate light transmission properties may be employed. It is preferable to use a polymer capable of forming a film with favorable light transmission properties, i.e., having a light transmittance of 75% or more, still preferably 85% or more.

Examples of the solid polymer include polyamide, polyimide, polyester and polyether ketone. Among all, polyaryl ether ketone, polyamide imide and polyester imide are preferred. To form the birefringent film, use can be made of one of these solid polymers or a mixture of two or more thereof. Although the molecular weight of the solid polymer is not particularly restricted, it is generally favorable from the viewpoint of, for example, handling properties in film formation that the weight-average molecular weight thereof is from 1000 to 100000, still preferably form 1500 to 750000 and still preferably from 2000 to 500000.

The transparent film serving as the optical anisotropic layer of the optical compensation film (the birefringent film) can be formed by liquefying the solid polymer, spreading the same and then fixing the thus spread layer. In forming the transparent film, various additives such as a stabilizer, a plasticizer or metals may be added, if necessary, to the liquefied solid polymer. The solid polymer can be liquefied by an appropriate method, for example, melting a thermoplastic solid polymer by heating or dissolving a solid polymer in a solvent to give a solution.

The spread layer can be fixed by cooling the spared layer (in the former case of using the molten liquid) or removing the solvent form the spread layer and drying (in the latter case of using the solution). Drying can be performed by appropriately employing one or more methods from among spontaneous drying (air-drying), thermal drying (in particular, at 40 to 200° C.), vacuum drying and so on. From the viewpoints of the production efficiency and prevention of the occurrence of optical anisotropy, it is favorable to employ the method of applying a polymer solution. In addition to the fixation by cooling or drying as described above, use may be made of the polymerization fixation depending on the type of the polymer to be used for forming the optical anisotropic layer.

As the solvent as described above, use can be made of one or more members appropriately selected from among methylene chloride, cyclohexanone, trichloroethylene, tetrachloroethane, N-methylpyrrolidone, tetrahydrofuran, etc. Taking the viscosity appropriate for the film formation into consideration, the solution is preferably prepared by dissolving form 2 to 100 parts by mass, still preferably from 5 to 50 parts by mass and still preferably from 10 to 40 parts by mass, of the solid polymer in 100 parts by mass of the solvent.

The liquefied solid polymer may be spread by using an appropriate film-forming method such as spin coating, roll coating, flow coating, printing, dip coating, cast film-forming, casting such as bar coating and gravure printing, extruding and so on. From the viewpoint of the mass production of a film having little irregularities in thickness and orientation, it is preferable to employ a solution film-forming method such as the casting method. In such a case, it is favorable to use a polyimide which is prepared from an aromatic dianhydride and an aromatic polydiamine and soluble in a solvent (International Patent Application No.511812/1996).

The characteristic nx>ny>nz as the optical compensation film (the birefringent film) of the optical compensation film according to the invention can be imparted by orientating molecules in the transparent film plane. That is to say, the transparent film obtained in the course of the transparent film-formation by spreading the liquefied matter as described above shows the characteristic of $nx \approx ny$, i.e., $Re \approx 0$ nm.

In the invention, namely, nz is controlled in the course of the transparent film-formation and, moreover, nx and ny are controlled by the treatment of orientating molecules in the transparent film plane. Owing to this system of assigning functions, the desired object can be established at a lower stretching rate compared with the existing method of simultaneously controlling Rz and Re as in, for example, the biaxial stretching method. Thus, a biaxial birefringent film having excellent Rz and Re characteristics and optical axial accuracy due to nx>ny>nz can be advantageously obtained.

The molecular orientation treatment in the transparent film plane can be carried out by stretching and/or shrinking the film. As the stretching method, use can be made of one or more methods appropriately selected from among biaxially stretching methods such as successive stretching and simultaneous stretching and uniaxially stretching methods such as free-end stretching and fixed-end stretching. From the viewpoint of preventing the bowing phenomenon, the uniaxially stretching method is preferred. The stretching temperature may be determined in accordance with the conventional methods. In general, use is made of a temperature close to the glass transition temperatures of the solid polymer constituting the transparent film and the optical compensation film employed as the support, still preferably a temperature not lower than the glass transition temperatures.

On the other hand, shrinkage can be carried out by, for example, performing the application and film-formation of the transparent film on the base material and then inducing shrinkage by taking advantage of the dimensional change in the base material due to a temperature change or the like. In such a case, use may be also made of a base material having shrinking ability such as a heat shrinkable film. It is favorable to control the shrinkage rate by using, for example, a stretcher.

It is desirable that a support to be used in the shrinkage has been preliminarily stretched. The stretching can be carried out by a method commonly employed. In the case where the optical film according to the invention serving as the support contains less than 1.5% by mass of the solvent remaining therein, it is favorable to carry out the stretching at a temperature not lower than the glass transition temperature. In the case where the amount of the remaining solvent is 1.5% by mass or more, on the other hand, it is preferable to carry out the stretching at 30° C. to 160° C., still preferably at 70° C. to 150° C. and particularly preferably at 85° C. to 150° C. In the case where the amount of the remaining solvent is 1.5% by mass or more, there is a merit that the stretching can be carried out at a lower temperature. In such a case, it is preferable that the stretching is carried out at the amount of the solvent remaining in the optical film according to the invention serving as the support of 1.5% by mass or more but not more than 70% by mass, still preferably 30% by mass or more but not more than 60% by mass.

The stretching and/or the shrinkage of the laminate comprising the transparent film and the optical film is preferably carried out in the state where the amount of the solvent remaining in the optical film is 1.5% by mass or less, still preferably 0.5% by mass or less and particularly preferably 0.2% by mass or less.

After the completion of the stretching and/or the shrinkage, the amount of the solvent remaining in each of the transparent film and the optical film constituting the optical compensation film is preferably 1.5% by mass or less, still preferably 0.5% by mass or less and still preferably 0.2% by mass or less, since the optical characteristics of the film might be changed in proportional to the amount of the solvent remaining in the optical compensation film.

(Stretching Method)

The stretching can be carried out by the methods described in, for example, JP-A-62-115035, JP-A-4-152125, JP-A-4-284211, JP-A-4-298310 and JP-A-11-48271. The film is stretched at room temperature or under heating. It is preferable that the heating temperature is not hither than the glass transition temperature of the film. The film may be stretched either uniaxially or biaxially. The stretching may be carried out in the course of the drying. It is particularly effective to carry out the stretching while there remains the solvent. The film can be stretched by, for example, controlling the carrying roller speed so that the film-winding speed exceeds the stripping speed. Alternatively, the film can be stretched by gradually broadening the film while holding the film width with a tenter. It is also possible to stretch the film by using a stretcher after the completion of the drying (preferably uniaxial stretching with the use of a long stretcher). The stretching may be carried out either in a single stage or in a plural number of stages (i.e., multistage stretching). In the multistage stretching, the product of the stretching rates in individual stages should fall within the specified range.

It is preferable to carry out the stretching under a hot air stream with the use of hot rolls and/or a radiation heat source (an IR heater, etc.). To improve uniformity in temperature, use may be made of a thermostat. In the case of uniaxial stretching with rolls, the ratio L/W (wherein L stands for the distance between rolls, while W stands for the film width) preferably ranges from 2.0 to 5.0.

Rth and Re of the birefringent film thus obtained can be controlled depending on the solid polymer type employed, the method of forming the spread layer (for example, the application method of the liquefied matter), the fixation method of the spread layer (for example, the drying conditions), the thickness of the transparent film thus formed and so on. In general, the thickness of the transparent film ranges from 0.5 to 100 μm, still preferably form 1 to 50 μm and particularly preferably from 2 to 20 μm.

The birefringent film thus formed may be either used as such or bonded to another film with the use of, for example, a pressure-sensitive adhesive.

[Usage (Polarizing Plate)]

Next, the usage of the optical film according to the invention will be described.

The optical film according to the invention is particularly useful as a protective film for a polarizing plate. In the case of the optical film according to the invention made of cellulose acylate, the optical film is particularly useful. This is because cellulose acylate films are generally employed as protective films in polarizing plates. In the case of using the optical film according to the invention as a protective film for a polarizing plate, the polarizing plate may be constructed by a usually employed method without specific restriction. A common method comprises treating the obtained cellulose acylate film with an alkali and then bonding to both faces of a polarizer, which has been constructed by dipping a polyvinyl alcohol film in an iodine solution and stretched, by using a completely saponified aqueous polyvinyl alcohol solution. As an alternative for the alkali treatment, use may be made of a treatment for facilitating adhesion as reported in JP-A-6-94915 or JP-A-6-118232.

Examples of the adhesive to be used for bonding the treated face of the protective film to the polarizer include polyvinyl alcohol-based adhesives such as polyvinyl alcohol and polyvinyl butyral, vinyl-based latexes such as butyl acrylate and so on.

The polarizing plate is composed of the polarizer and the protective films protecting both faces thereof. It may further have a separate film on the opposite face. The protect film and the separate film are employed in order to protect the polarizing plate during shipment, product inspection and other steps. In this case, the protective film, which aims at protecting the surface of the polarizing plate, is bonded to the face opposite to the face to be bonded to a liquid crystal plate. On the other hand, the separate film, which aims at covering the adhesive layer to be boned to the liquid crystal plate, is bonded to the face of the polarizing plate to be bonded to the liquid crystal face.

In a liquid crystal display unit, a substrate containing liquid crystals is usually provided between two polarizing plates. The protective film for polarizing plate comprising the optical film according to the invention enables the achievement of excellent display characteristics at any site. It is particularly preferable to use the protective film for polarizing plate as a protective film for polarizing plate as the outmost layer in the display side of a liquid crystal display unit, since a transparent hard coat layer, an antiglare layer, an antireflective layer, etc. are formed therein. By bonding the optical film side (i.e., the support) of the optical compensation film according to the invention as the protective film for polarizing plate, it can be used as an optical compensation sheet too.

(Constitution of Commonly Used Liquid Crystal Display Unit)

In the case of using the optical film as a support of the optical compensation film, the transmission axis of the polarizer and the slow axis of the optical compensation film may be located at an arbitrary angle. A liquid crystal display unit comprises a liquid crystal cell having liquid crystals between a pair of electrode substrates, two polarizers provided in both sides of the cell, and at least one optical compensation film provided between the liquid crystal cell and the polarizer.

The liquid crystal layer of the liquid crystal cell is usually constructed by enclosing liquid crystals into a space formed by inserting a spacer between two substrates. A transparent electrode layer is formed as a transparent membrane containing an electrically conductive substance. The liquid crystal cell may further have a gas barrier layer, a hard coat layer or an under coat layer (employed for bonding the transparent electrode layer). These layers are usually formed on the substrate. The thickness of the liquid crystal cell substrate is generally from 50 μm to 2 mm.

(Liquid Crystal Display Unit Types)

The optical film according to the invention is usable in liquid crystal display units in various display modes. There have been proposed various display modes, for example, TN (twisted nematic), IPS (in-plane switching), FLC (ferroelectric liquid crystal), AFLC (anti-ferroelectric liquid crystal), OCB (optically compensatory bend), STN (super twisted nematic), VA (vertically aligned), ECB (electrically controlled birefringence) and HAN (hybrid aligned nematic) modes. There have been further proposed display modes obtained by split orientation of the above display modes. The optical film according to the invention is effective in liquid crystal display units in any of these display modes. It is also effective in liquid crystal display units of transmission, reflection and semi-transmission types.

(Liquid Crystal Display Unit of TN Type)

The optical film according to the invention may be used as the support of an optical compensation sheet in a TN type liquid crystal display unit having a liquid crystal cell in the TN mode. Liquid crystal cells in the TN mode and liquid crystal display units of the TN type have been well known for a long time. Optical compensation sheets to be used in TN type liquid crystal display units are described in JP-A-3-9325, JP-A-6-148429, JP-A-8-50206 and JP-A-9-26572 and also reported by Mori, et al., Jpn. J. Appl. Phys., vol. 36 (1997), p. 143 and Jpn. J. Appl. Phys., vol. 36 (1997), p. 1068.

(Liquid Crystal Display Unit of STN Type)

The optical film according to the invention may be used as the support of an optical compensation sheet in an STN type liquid crystal display unit having a liquid crystal cell in the STN mode. In general, rod-like liquid crystal molecules in the liquid crystal cell of a STN type liquid crystal display unit are twisted by 90 to 360° and the product ($\Delta$nd) of the refractive anisotropy ($\Delta$n) of the rod-like liquid crystal molecule and the cell gap (d) ranges from 300 to 1500 nm. Optical compensation sheets usable in the STN type liquid crystal display units are described in JP-A=2000-105316.

(Liquid Crystal Display Unit of VA Type)

The optical film according to the invention may be used as the support of an optical compensation sheet in a VA type liquid crystal display unit having a liquid crystal cell in the VA mode. It is preferable to control the Re retardation value and the Rth retardation value of the optical compensation sheet to be used in a VA type liquid crystal display unit respectively to 0 to 150 nm and 70 to 400 nm. It is still preferable to control the Re retardation value to 20 to 70 nm. In the case of using two optical anisotropic polymer films in a liquid crystal display unit of the VA type, the Rth retardation values of the films preferably range from 70 to 250 mm. In the case of using a single optical anisotropic polymer film in a liquid crystal display unit of the VA type, the Rth retardation value of the film preferably ranges from 150 to 400 nm. Use may be also made of a liquid crystal display unit of the VA type in the split orientation system as described in, for example, JP-A-10-123576.

(Liquid Crystal Display Unit of IPS Type and Liquid Crystal Display Unit of ECB Type)

The optical film according to the invention may be particularly advantageously used as the support of an optical compensation sheet in an IPS type liquid crystal display unit having a liquid crystal cell in the IPS mode or an ECB type liquid crystal display unit having a liquid crystal cell of the ECB mode, or a protective film of a polarizing plate therein. In these modes, a liquid crystal material is orientated almost in parallel in black display. Namely, liquid crystal molecules are orientated in parallel with the substrate plane under loading no voltage, thereby giving black display. A polarizing plate having the optical film according to the invention contributes to the enlargement in viewing angle and the improvement in contrast in these modes. It is favorable in these modes to control the retardation value of the optical anisotropic layer provided between the protective films of the polarizing plate and the liquid crystal cell to not more than twice of $\Delta n$ d. It is also preferable to regulate the absolute Rth value |Rth| to not more than 25 nm, still preferably not more than 20 nm and still preferably not more than 15 nm. Thus, the optical film according to the invention can be advantageously employed therefor.

(Liquid Crystal Display Unit of OCB Type and Liquid Crystal Display Unit of Han Type)

The optical film according to the invention may be also advantageously used as the support of an optical compensation sheet in an OCB type liquid crystal display unit having a liquid crystal cell in the OBC mode or a HAN type liquid crystal display unit having a liquid crystal cell in the HAN mode. It is preferable that an optical compensation sheet to be used in an OCB type liquid crystal display unit or a HAN type liquid crystal display unit has a direction giving the minimum absolute retardation value neither in the optical compensation sheet plane nor in the normal line direction. The optical properties of an optical compensation sheet to be used in an OCB type liquid crystal display unit or a HAN type liquid crystal display unit are determined depending on the optical properties of the optical anisotropic layer, the optical properties of the support and the configuration of the optical anisotropic layer and the support. Optical compensation sheets to be used in an OCB type liquid crystal display unit or a HAN type liquid crystal display unit are described in JP-A-9-197397 and also reported by Mori, et al., Jpn. J. Appl. Phys., Vol. 38 (1999), p. 2837.

(Liquid Crystal Display Unit of Reflection Type)

The optical film according to the invention may be also advantageously used as the support of an optical compensation sheet in reflection type liquid crystal display units such as TN type, STN type, HAN type and GH (guest-host) type. These display modes have been well known for a long time. Liquid crystal display units of the TN reflection type are described in JP-A-10-123478, WO 9848320 and Japanese Patent No. 3022477, while an optical compensation sheet to be used in a reflection type liquid crystal display unit is described in WO 00-65384.

(Other Liquid Crystal Display Units)

The optical film according to the invention may be also advantageously used as the support of an optical compensation sheet in an ASM (axially symmetric aligned microcell) type liquid crystal display unit having a liquid crystal cell in the ASM mode. A liquid crystal cell of the ASM mode is characterized by being held by a resin spacer allowing to control the cell thickness from site to site. Other properties thereof are the same as liquid crystal cells in the TN mode. A liquid crystal cell in the ASM mode and an ASM type liquid crystal display unit are reported by Kuine et al., SID 98 Digest 1089 (1998).

(Self Luminous Display Unit)

The optical members according to the invention (for example, the birefringent film and the optical compensation sheet) can also contribute to the improvement in the display qualities in a self luminous display unit. Such a self luminous display unit is not particularly restricted and examples thereof include organic EL, PDP and FED. By using a birefringent film with Re of ¼ wavelength in a flat panel display of the self luminous type, linear polarization can be converted into circular polarization to give an antireflective filter.

In the above-described system, the members constituting a display unit such as a liquid crystal display unit may be either integrated via lamination or separated. In constructing the display unit, it is also possible to provide appropriate optical elements such as a prism array sheet, a lens array sheet, a light diffusion plate or a protective plate. In constructing a display unit, these elements are also usable in the form of an optical member laminated on the birefringent film.

(Hard Coat Film, Antiglare Film and Antireflective Film)

Furthermore, the optical film according to the invention is appropriately usable in a hard coat film, an antiglare film and an antireflective film. In order to improve the visibility of a flat panel display such as LCD, PDP, CRT or EL, any or all of a hard coat layer, an antiglare layer and an antireflective layer may be formed on one or both faces of the optical film according to the invention. Preferred embodiments of these antiglare and antireflective films are described in detail in Japan Institute of Invention and Innovation Journal of Technical Disclosure No. 2001-1745 (2001 Mar. 15, Japan Institute of Invention and Innovation), p. 54 to 57, and the optical film according to the invention is appropriately usable therein.

(Transparent Substrate)

Because of having an optical anisotropy close to zero and a high transparency, the optical film according to the invention is usable as a substrate for a liquid crystal glass substrate (i.e., a transparent substrate in which driving liquid crystals are enclosed) in a liquid crystal display unit.

Since a transparent substrate in which driving liquid crystals are enclosed should have excellent gas-barrier properties, a gas barrier layer may be formed on the surface of the optical film according to the invention, if necessary. Although the gas barrier layer is not restricted in form or material, it can be formed by depositing $SiO_2$ on at least one face of the optical film according to the invention or by treating with plasma. Alternatively, it is also possible to form a polymer coat layer having relatively high gas barrier properties, for example, a vinylidene chloride polymer of a vinyl alcohol polymer. An appropriate method may be selected from them.

In the case of using as a transparent substrate in which driving liquid crystals are enclosed, a transparent electrode for driving liquid crystals may be provided. Although the transparent electrode is not particularly restricted, it may be formed by laminating a metallic membrane, a metal oxide membrane or the like on at least one face of the optical film according to the invention. A metal oxide membrane is preferred from the viewpoints of transparency, electrical conductivity and mechanical characteristics. Among all, a thin membrane made of indium oxide containing tin oxide as the main component together with from 2 to 15% of zinc oxide is preferably employed. These techniques are disclosed in, for example, JP-A-2001-125079 and JP-A-2000-227603.

EXAMPLES

Production of Cellulose Acetate Film

The composition as will be shown below was fed into a mixing tank and stirred under heating to thereby dissolving individual components, thus giving a cellulose acetate solution A.

<Composition of Cellulose Acetate Solution A>

| | |
|---|---|
| cellulose acetate with degree of substitution of 2.85 | 100 parts by mass |
| triphenyl phosphate (plasticizer) | 7.8 parts by mass |
| biphenyl diphenyl phosphate (plasticizer) | 3.9 parts by mass |
| methylene chloride (first solvent) | 300 parts by mass |
| methanol (second solvent) | 54 parts by mass |
| 1-butanol | 11 parts by mass |

The following compositions were fed into other mixing tanks and stirred under heating to dissolve individual components, thereby giving additive solutions B-1 to B-4.

TABLE 1

Composition of additive solutions

| Additive solution | Methylene chloride (parts by mass) | Methanol (parts by mass) | Optically anisotropy-lowering agent (A-29) (parts by mass) | Wavelength dispersion controller (UV-102) (parts by mass) |
|---|---|---|---|---|
| B-1 | 80 | 20 | No | No |
| B-2 | 80 | 20 | 20 | 2 |
| B-3 | 80 | 20 | 40 | 2 |
| B-4 | 80 | 20 | 40 | 4 |

<Production of Cellulose Acetate Film Sample 1>

To 477 parts by mass of the cellulose acetate solution A, 40 parts by mass of the additive solution B-1 was added aid the resultant mixture was thoroughly stirred to give a dope. From a casting port, this dope was cast on a drum cooled to 0° C. Then the dope was stripped off at a solvent content of 70% by mass and the film was fixed in both sides with a pin tenter (shown by FIG. 3 in JP-A-4-1009) and dried at a solvent content of from 3 to 5% by mass while maintaining intervals giving a stretching rate in the transverse direction (perpendicular to the machine direction) of 3%. Next, it was further dried by passing between heating rolls to give a cellulose acetate film sample 1 of 80 μm in thickness.

<Production of Cellulose Acetate Film Samples 2 to 4 and 101 to 103>

Cellulose acetate film samples 2 to 4 and comparative samples 101 to 103 were produced as in the cellulose acetate film sample 1 but using the additive solutions and degrees of substitution as listed in Table 2.

(Preparation of Cellulose Acetate Solution Z)

| | |
|---|---|
| cellulose acetate with average degree of acetylation of 2.93 | 100.0 parts by mass |
| methylene chloride (first solvent) | 517.6 parts by mass |
| methanol (second solvent) | 77.3 parts by mass |
| silica particles with average particle size of 16 mm (AEROSIL R972, NIPPON AEROSIL Co., Ltd ) | 0.13 parts by mass |
| compound lowering optical anisotropy (A-19) | 11.7 parts by mass |
| wavelength dispersion regulator (UV-102) | 1.2 parts by mass |
| citric acid ester | 0.01 part by mass |

(Production of Cellulose Acetate Film Sample 401)

The cellulose acetate solution Z as described above was cast with the use of a band casting machine. When the amount of the remaining solvent attained about 60% by mass, the solution was stripped from the band and dried at 135° C. for 20 minutes to give a cellulose acetate film. The cellulose acetate film thus obtained contained 0.15% by mass of the remaining solvent and had a thickness of 80 μl.

(Production of Cellulose Acetate Film Sample 402)

The cellulose acetate solution Z as described above was cast with the use of a band casting machine. When the amount of the remaining solvent attained 60% by mass, the solution was stripped from the band and the film was fixed in both sides with a pin tenter and dried at 120° C. for 40 minutes while maintaining intervals giving a stretching rate in the transverse direction (perpendicular to the machine direction) of 25%. The cellulose acetate film thus obtained contained 0.15% by mass of the remaining solvent and had a thickness of 80 μm.

[Production of Norbornene Polymer Sample 201]

Fine needle crystals of calcium carbonate (manufactured by Maruo Calcium Co., Ltd.) were uniformly dispersed in THF by ultrasonic irradiation. Further Arton pellets (manufactured by JSR) were added as a polymer and dissolved by stirring for about 24 hours. Concerning the mixing ratio, tetrahydrofuran was employed in an amount 4 times as much as Arton, while calcium carbonate was employed in the amount of 1.3 wt % based on Arton. The polymer solution thus obtained was spread on a glass plate with the use of a knife coater and the solvent was evaporated. Then the filmy sample (thickness: about 80 μm) was stripped off from the glass plate and dried at 80° C. for 1 hour to give a norbornene polymer sample 201.

[Production of Cellulose Acetate Sample 501]

A cellulose acetate film sample 501 containing 10% by mass of the remaining solvent was produced as in the production of the cellulose acetate film sample 401 but drying at 130° C. for 15 minutes.

Table 2 summarizes the optical characteristics, etc. of these samples.

Stretching was carried out uniaxially with the use of a multipurpose testing machine Tensilon (manufactured by ORIENTEC, Co.) at a stretching temperature of 160° C., a stretching speed of 4 cm/min and a stretching rate of 1.15 fold. After the completion of the stretching, retardation was measured with an elipsometer.

In the case of the sample 402, the shrinkage was carried out by 15% by treating at 170° C. for 30 minutes.

Samples 601, 602 and 603 according to the invention were produced as in the production of cellulose acetate film sample 401 according to the invention but using cellulose acylate SEF-1, cellulose acylate SEF-2 and cellulose acylate SEF-3 as will be given herein below as a substitute for the cellulose acetate and adding 20.0 parts by mass of an optical anisotropy-lowering compound I-1 as a substitute for A-19. As a result, excellent characteristics comparable to the cellulose acetate film sample 401 could be obtained. Table 2 shows the results.

TABLE 2

| Sample | | Additive solution | Degree of cellulose acylate substitution | Re(590)/ nm | Rth(590)/ nm | \|Re(400) − Re(700)\|/ nm | \|Rth(400) − Rth(700)\|/ nm | Coefficient of phto-elasticity × 10$^{-3}$ cm$^2$/dyne | Re/Rth exhibited at stretching/ shrinkage | |
|---|---|---|---|---|---|---|---|---|---|---|
| | | | | | | | | | Re/nm | Rth/nm |
| Invent. | 1 | B-4 | 2.85 | 9 | 23.8 | 6 | 23.1 | 17 | 14 | 25 |
| " | 2 | B-4 | 2.87 | 4 | 19 | 9 | 33 | 10 | 6 | 10 |
| " | 3 | B-3 | 2.9 | 2 | 14 | 4.8 | 10 | 7 | 5 | 5 |
| " | 4 | B-3 | 2.92 | 0.1 | −2.8 | 3 | 19.3 | 5 | 2 | 2 |
| " | 201 | — | — | 5 | 5 | 1 | 1 | 3 | 4 | 6 |
| " | 401 | — | 2.93 | 0.2 | −3 | 0.5 | 13 | 12 | 2 | 5 |
| " | 402 | — | 2.93 | 10 | 10 | 3 | 12 | 12 | 5 | 5 |
| " | 501 | — | 2.93 | 0.9 | −6 | 2 | 10 | 18 | 7 | 7 |
| " | 601 | — | 2.7 | 2 | −2 | 0.3 | 10 | 10 | 3 | 3 |
| " | 602 | — | 2.88 | 1.5 | −5 | 1 | 12 | 11 | 2 | 3 |
| " | 603 | — | 2.85 | 1.5 | 0 | 0.7 | 11 | 13 | 4 | 4 |
| Comp. | 101 | B-1 | 2.85 | 3.4 | 27.5 | 13 | 40 | 7 | 35 | 40 |
| " | 102 | B-2 | 2.85 | 6.5 | 45.5 | 10.5 | 17.2 | 15 | 26 | 30 |
| " | 103 | B-2 | 2.83 | 11 | 39 | 12 | 20 | 25 | 23 | 25 |

*cm$^2$/dyne = 10 Pa (Cellulose Acylate SEF-1)

Starting with cellulose collected from cotton, cellulose acylate SEF-1 was synthesized. Cellulose acylate SEF-1 was a powder having a degree of acetyl substitution of 1.20, a degree of butyryl substitution of 1.50, the total degree of substitution of 2.70, a viscosity-average degree of polymerization of 280, a moisture content of 0.2% by mass, a viscosity in a 6% by mass dichloromethane solution of 235 mPa·s, an average particle size of 1.5 mm and a standard deviation of 0.6 mm. It contained not more than 0.1% by mass of acetic acid and not more than 0.1% by mass of butanoic acid remaining in the solid cellulose acetate, 85 ppm of Ca, 30 ppm of Mg and 0.3 µppm of Fe. Moreover, it contained 130 ppm of sulfur in terms of sulfate. The degree of substitution by acetyl group at the 6-position thereof was 0.40, while the degree of substitution by butyryl group at the 6-position thereof was 0.48. The ratio of weight-average molecular weight/number-average molecular weight (determined by GPC) was 2.6.

(Cellulose Acylate SEF-2)

Cellulose acylate SEF-2 was a powder having a degree of acetyl substitution of 2.58, a degree of butyryl substitution of 1.30, the total degree of substitution of 2.88, a viscosity-average degree of polymerization of 365, a moisture content of 0.2% by mass, a viscosity in a 6% by mass dichloromethane solution of 290 mPa·s, an average particle size of 1.4 mm and a standard deviation of 0.6 mm.

(Cellulose Acylate SEF-3)

Cellulose acylate SEF-3 was a powder having a degree of acetyl substitution of 1.00, a degree of propionyl substitution of 1.85, the total degree of substitution of 2.85, a viscosity-average degree of polymerization of 280, a moisture content of 0.19% by mass, a viscosity in a 6% by mass dichloromethane solution of 105 mPa's, an average particle size of 1.5 mm and a standard deviation of 0.4 mm.

(Formation of Optical Anisotropic Layer)

<Direct Stretching Method>

A 15% by mass cyclohexanone solution of polyimide synthesized from 2,2'-bis(3,4-dicarboxyphenyl)hexafluoropropane with 2,2'-bis(trifluoromethyl)-4,4'-diaminobiphenyl was applied on the cellulose acetate film sample 1 produced above. After drying at 100° C. for 10 minutes, a transparent film containing 7% by mass of the remaining solvent, having a thickness of 6 µm, Rth of 240 nm and Re of 0 was obtained. Subsequently, the obtained film was uniaxially stretched in the longitudinal direction at 160° C. by 155 together with the film sample 1 to thereby give an optical compensation film 1A having Re of 55 nm, Rth of 238 nm and nx>ny>nz.

(Construction of Polarizing Plate)

The sample 1A having the optical film sample and the optical anisotropic layer laminated thereon was bonded to a polarizer by using a polyvinyl alcohol-base adhesive so that the polarizer was provided in the cellulose film side. Further, a marketed cellulose acetate film (Fujitak TD80UF, manufactured by FUJI PHOTOFILM Co., Ltd.; Re 3 nm, Rth 50 nm) was bonded to the other side of the polarizer with a polyvinyl alcohol-base adhesive. Thus, a polarizing plate 1B was constructed.

Moreover, a polarizing plate 301B was constructed by bonding the marketed cellulose acetate film (Fujitak TD80UF, manufactured by FUJI PHOTOFILM Co., Ltd.; Re 3 nm, Rth 50 nm) to both sides thereof with a polyvinyl alcohol-base adhesive.

(Evaluation of Mounting on VA Type Liquid Crystal Display Unit)

<Construction of Perpendicularly Oriented Liquid Crystal Cell>

To a 3% by mass aqueous solution of polyvinyl alcohol, 1% by mass of octadecyldimethylammonium chloride (a coupling agent) was added. The mixture was spin-coated on a glass substrate provided with an ITO electrode and heated at 160° C. Next, it was rubbed to give a perpendicularly oriented film. The rubbing treatment was carried out in opposite directions to each other on two glass substrates. The glass plates were faced to each other to give a cell gap (d) of about 4.3 µm.

A liquid crystal compound mainly comprising an ester and ethane (Δn:0.06) was poured into the cell gap to give a perpendicularly orientated liquid crystal cell. The product Δn·d was 260 nm.

To this liquid crystal cell, the above-described polarizing plate 1B was bonded with a pressure-sensitive additive in such a manner that the birefringent film was located in the liquid crystal cell side. Further, the polarizing plate 301 B was bonded to the other side of the liquid crystal cell with a pressure-sensitive additive so that the opposite polarizing plate and the absorption axis were at right angles to one another. Thus, a VA type liquid crystal display unit was constructed.

Separately, optical compensation films and polarizing plates were constructed in the same manner but using the cellulose acetate film samples 2 to 4, 401, 601, 602, 603, the norbornene polymer sample 201 and the comparative cellulose acetate film samples 101 to 103 and mounted on VA type liquid crystal display units.

Moreover, an optical compensation film 501A containing 2% by mass of the solvent remaining respectively in the optical film and the transparent film was constructed as in the construction of the optical compensation film 1A. Further, the optical compensation film 501A was processed into a polarizing plate and amounted to a VA type liquid crystal display unit each in the same manner.

Furthermore, optical compensation films 502A and 503A respectively containing 1.5% by mass and 0.5% by mass of the remaining solvent were constructed as in the construction of the optical compensation film 501A with the use of the sample 501 but drying at 140° C. for 5 minutes or 20 minutes. After a durability test (treated for 100 hours at 60° C. and 90% RH), display irregularities in these samples were observed. As a result, the samples having the remaining solvent contents of 0.5% by mass and 1.5% by mass showed irregularities within the permissible range, while the sample of 2.0% by mass showed irregularities beyond the bounds of permissibility.

<Shrinkage Method>

Processing of Cellulose Acetate Film Sample 401:

The cellulose acetate film sample 401 was stretched at 170° C. by 25%. Next, a 15% by mass cyclohexanone solution of polyimide synthesized from 2,2'-bis(3,4-dicarboxyphenyl)hexafluoropropane with 2,2'-bis(trifluoromethyl)-4,4'-diaminobiphenyl was applied on the stretched film. After drying at 100° C. for 10 minutes, a transparent film containing 7% by mass of the remaining solvent, having a thickness of 6 μm, Rth of 240 nm and Re of 5 was obtained. Subsequently, the obtained film was treated at 170° C. and shrunk by 15% to give an optical compensation film 401B having Re=63 nm, Rth=240 nm and nx>ny>nz.

The obtained optical compensation film was processed into a polarizing plate and amounted to a VA type liquid crystal display unit each in the same manner as the cellulose acetate film sample 1.

Processing of Cellulose Acetate Film Sample 402:

On the cellulose acetate film sample 402 obtained above, a 15% by mass cyclohexanone solution of polyimide synthesized from 2,2'-bis(3,4-dicarboxyphenyl)hexafluoropropane with 2,2'-bis(trifluoromethyl)-4,4'-diaminobiphenyl was applied. After drying at 100° C. for 10 minutes, a transparent film containing 7% by mass of the remaining solvent, having a thickness of 6 μm, Rth of 230 nm and Re of 5 was obtained. Subsequently, the obtained film was treated at 170° C. and shrunk by 15% to give an optical compensation film 402A having Re=60 nm, Rth=235 nm and nx>ny>nz.

The obtained optical compensation film was processed into a polarizing plate and amounted to a VA type liquid crystal display unit each in the same manner as the cellulose acetate film sample 1.

In the case of varying the conditions for stretching the optical anisotropic layer as follows, a polarizing plate was constructed in the same manner and a VA type liquid crystal display unit was constructed too.

<Other Stretching Conditions>

5% Stretching Conditions:

In the step of forming the optical anisotropic layer, a transparent film having a thickness of 7 μm, Rth of 230 nm and Re of 0 was obtained. Then it was uniaxially stretched in the longitudinal direction at 150° C. by 5% together with the cellulose acetate film sample 1 to give an optical anisotropic layer having Re=58 nm, Rth=246 m and nx>ny>nz.

0% Stretching Conditions:

Under the 0% stretching conditions, all of the cellulose acetate film samples norbornene polymer samples showed Re=0 and thus no desired film could be obtained.

110° C. Stretching Conditions:

Although attempts were made to stretch the cellulose acetate film samples 1 to 4 at 110° C., the stretching temperature was lower than Tg of the films and thus the films were finely cracked and no desired film could be obtained.

<Formation of Optical Anisotropic Layer: Transfer Method>

On the cellulose acetate film sample 1 obtained above, a 15% by mass cyclohexanone solution of polyimide synthesized from 2,2'-bis(3,4-dicarboxyphenyl)hexafluoropropane with 2,2'-bis(trifluoromethyl)-4,4'-diaminobiphenyl was applied. After drying at 100° C. for 10 minutes, a transparent film containing 7% by mass of the remaining solvent, having a thickness of 6 μm, Rth of 240 nm and Re of 0 was obtained. Subsequently, the obtained film was uniaxially stretched in the longitudinal direction by 15% at 160° C. together with the film sample 1.

Moreover, the face coated with the polyimide of the uniaxially stretched film was bonded to an unscratched sample 1 having a pressure-sensitive material bonded to one face and then the stretched sample 1 alone was stripped off. Thus, the stretched polyimide layer was transferred onto the unscratched sample 1, thereby giving an optical compensation film having the optical anisotropic layer which showed Re=55 nm, Rth=240 nm and nx>ny>nz. By using the obtained optical compensation film, a polarizing plate was constructed and a VA type liquid crystal display unit was constructed too.

<Evaluation Test>

[Panel Evaluation]

<Evaluation of Phase Contrast Film and Measurement of Light Leakage of the Constructed Liquid Crystal Display Unit>

The viewing angle dependency of each of the liquid crystal display units thus constructed was measured. The elevation angles were measured up to 80° at intervals of 10° from the front face direction toward an oblique direction. Azimuthal angles were measured up to 360° C. at intervals of 10° by using the horizontal direction (0°) as the standard. Thus, it was clarified that light leakage in the luminance in black display increased with an increase in the elevation angle from the front face direction and attained the maximum level at around the elevation angle 70°. It was also found out that contrast was worsened with an increase in the black display transmittance. Thus, the viewing angle characteristics were evaluated based on the black display transmittance in the front face direction and the maximal light leakage at the elevation angle of 60°.

In a durability test, display irregularities were observed after treating at 60° C. and 90% RH for 100 hours. Irregularities occurred mainly in the four corners.

Table 3 summarizes the obtained results.

It can be understood that the invention samples had favorable viewing angle characteristics of liquid crystal display in the transfer method and showed little irregularities on panels. Moreover, these samples showed little retardations upon stretching and, therefore, sustained favorable viewing angle characteristics and showed little irregularities on panels even in the case of omitting the transfer step.

Evaluation of Changes in Display Characteristics:
A: Excellent with little difference in viewing angle characteristics.
B: Good with a slight difference in viewing angle characteristics.
C: A slight difference in viewing angle characteristics.
D: A large difference in viewing angle characteristics.

Evaluation of Display Irregularities:
A: Excellent with little irregularities.
B: Good with slight irregularities.
C: Slight irregularities.
D: Serious irregularities.

This application is based on Japanese Patent application JP 2004-148329, filed May 18, 2004, Japanese Patent application JP 2005-8202, filed Jan. 14, 2005, and Japanese Patent application JP 2005-79296, filed Mar. 18, 2005, the entire contents of which are hereby incorporated by reference, the same as if set forth at length.

The invention claimed is:

1. An optical film which has $Re(\lambda)$ and $Rth(\lambda)$ fulfilling the following two formulae:

$$0 \leq Re_{(590)} \leq 10$$

$$|Rth_{(590)}| \leq 25$$

wherein $Re(\lambda)$ is a retardation value in plane (nm) at a wavelength of $\lambda$ nm; and
$Rth(\lambda)$ is a retardation value in film thickness direction (nm) at a wavelength of $\lambda$ nm.

2. The optical film according to claim 1, wherein the optical film fulfills the following formula (IX):

$$|Re_{MAX} - Re_{MIN}| \leq 3 \text{ and } |Rth_{MAX} - Rth_{MIN}| \leq 5 \qquad (IX)$$

wherein $Re_{MAX}$ and $Rth_{MAX}$ are maximum retardation values (nm) of an arbitrary cut out film piece of 1 m square; and $Re_{MIN}$ and $Rth_{MIN}$ are minimum retardation values (nm) thereof.

3. The optical film according to claim 1, wherein at least one of Re and Rth shows a change of from 0 to 20 nm upon stretching or shrinkage by 15% or more.

TABLE 3

| Sample | | Method of forming optical anisotropic layer | Stretching or shrinkage rate[a] | Re/Rth[b] exhibited in stretching or shrinkage | | Amount (%) of solvent remaining in optical compensation film | Viewing angle characteristics of VA type liquid crystal display unit | Display irregularities |
|---|---|---|---|---|---|---|---|---|
| | | | | Re/nm | Rth/nm | | | |
| Invent. | 1 | Transfer | 15% | — | — | 0.2 | A | A |
| " | 2 | " | 15% | — | — | 0.2 | A | A |
| " | 3 | " | 15% | — | — | 0.2 | A | A |
| " | 4 | " | 15% | — | — | 0.2 | A | A |
| " | 201 | " | 15% | — | — | 0.2 | A | A |
| " | 1 | Direct stretch | 15% | 14 | 25 | 0.2 | C | C |
| " | 2 | " | 15% | 6 | 10 | 0.2 | C | B |
| " | 3 | " | 15% | 5 | 5 | 0.2 | B | B |
| " | 4 | " | 15% | 2.0 | 2.0 | 0.2 | A | A |
| " | 201 | " | 15% | 4.0 | 6.0 | 0.2 | B | B |
| " | 401 | " | 15% | 2.0 | 5.0 | 0.2 | A | B |
| " | 401 | Shrinkage | 15% | 2.0 | 5.0 | 0.2 | B | B |
| " | 402 | " | 15% | 5.0 | 5.0 | 0.2 | B | B |
| " | 1 | Direct stretch | 5% | 5.0 | 7.0 | 0.2 | B | B |
| " | 501 | " | 15% | 7.0 | 7.0 | 1.5 | B | C |
| " | 501 | " | 15% | 7.0 | 7.0 | 0.5 | B | B |
| " | 601 | " | 15% | 3.0 | 3.0 | 0.2 | B | B |
| " | 602 | " | 15% | 2.0 | 3.0 | 0.2 | B | B |
| " | 603 | " | 15% | 4.0 | 4.0 | 0.2 | B | B |
| " | 601 | Shrinkage | 15% | 3.0 | 3.0 | 0.2 | B | B |
| " | 602 | " | 15% | 2.0 | 3.0 | 0.2 | B | B |
| " | 603 | " | 15% | 4.0 | 4.0 | 0.2 | B | B |
| Comp. | 101 | Transfer | 15% | — | — | 0.2 | D | C |
| " | 102 | " | 15% | — | — | 0.2 | D | C |
| " | 103 | " | 15% | — | — | 0.2 | D | C |
| " | 101 | Direct stretch | 15% | 35 | 40 | 0.2 | D | C |
| " | 102 | " | 15% | 26 | 30 | 0.2 | D | C |
| " | 103 | " | 15% | 23 | 25 | 0.2 | D | D |
| " | 501 | " | 15% | 7.0 | 7.0 | 2.0 | B | D |

*[a] stands for the stretching or shrinkage rate of the optical anisotropic layer.
*[b] stands for the Re/Rth exhibited upon the stretching or shrinkage of the optical film support.

4. The optical film according to claim 1, wherein at least one of Re and Rth shows a change of from 0 to 10 nm upon stretching or shrinkage by 0% or more but less than 15%.

5. The optical film according to claim 1, which fulfils the following formula (IV):

$$|Re_{(400)} - Re_{(700)}| \leq 10 \text{ and } |Rth_{(400)} - Rth_{(700)}| \leq 35. \qquad (IV)$$

6. The optical film according to claim 1, wherein the optical film comprises a cellulose acylate, acyl substituents of the cellulose acylate are all acetyl groups, a total degree of substitution thereof is from 2.50 to 3.00, and an average degree of polymerization thereof is from 180 to 700.

7. The optical film according to claim 1, wherein the optical film comprises a cellulose acylate fulfilling all of the following formulae (SE-1) to (SE-3):

$$2.50 \leq SA + SB \leq 3.00 \qquad (SE-1)$$

$$0 \leq SA \leq 2.5 \qquad (SE-2)$$

$$0.5 \leq SB \leq 3.00 \qquad (SE-3)$$

wherein SA is a degree of substitution by acetyl group; and SB is a degree of substitution by substituted acyl group having from 3 to 22 carbon atoms.

8. The optical film according to claim 1, wherein the optical film comprises a norbornene polymer.

9. The optical film according to claim 1, which has a coefficient of photoelasticity of $25 \times 10^{-13}$ cm$^2$/dyne or less.

10. The optical film according to claim 1, wherein a contact angle of a surface of the optical film, the surface being alkali-saponified is 55° or less.

11. An optical compensation film comprising: an optical anisotropic layer having $Re_{(590)}$ of from 0 to 200 nm and $|Rth_{(590)}|$ of from 0 to 400 nm; and the optical film according to claim 1.

12. The optical compensation film according to claim 11, wherein the optical anisotropic layer comprises a polymer film.

13. The optical compensation film according to claim 12 which is made by spreading and fixing a liquefied solid polymer on the optical film to form a laminate including a transparent film having a relation nx≡ny made by solidified matter of the liquefied solid polymer and the optical film, and subjecting the laminate to at least one of a stretching treatment and a shrinkage treatment, wherein nx represents a refractive index along a slow axis in a film plane and ny represents a refractive index along a direction perpendicular to the slow axis in the film plane.

14. The optical compensation film according to claim 13, wherein at least one of the stretching treatment and the shrinkage treatment is carried out at a temperature higher than glass transition temperatures of the solid polymer and the optical film.

15. The optical compensation film according to claim 13, which is made by: before the spreading and fixation of a liquefied solid polymer on the optical film, subjecting the optical film to at least one of a stretching treatment and a shrinkage treatment; spreading and fixing the liquefied solid polymer on the optical film; and after the spreading and fixing are made, subjecting the laminate including the transparent film having a relation nx≡ny made by solidified matter of the liquefied solid polymer and the optical film, to at least one of a stretching treatment and a shrinkage treatment.

16. The optical compensation film according to claim 13, wherein at least one of the stretching treatment and the shrinkage treatment of the laminate is carried out in a state with a residual solvent content in the optical film of 1.5% by mass or less.

17. The optical compensation film according to claim 13, wherein at least one of the stretching treatment and the shrinkage treatment of the optical film before the spreading and fixation of a liquefied solid polymer on the optical film is carried out in a state with a residual solvent content in the optical film of from 1.5 to 70% by mass.

18. The optical compensation film according to claim 13, wherein residual solvent contents in the transparent film and the optical film in the laminate, after at least one of the stretching treatment and the shrinkage treatment are each 1.5% by mass or less.

19. The optical compensation film according to claim 12, wherein at least one of the polymer film and the solid polymer comprises at least one member selected from the group consisting of polyamide, polyimide, polyester, polyether ketone, polyaryl ether ketone, polyamide imide and polyester imide.

20. The optical compensation film according to claim 11, wherein the optical anisotropic layer comprises a polymer showing negative birefringence.

21. A polarizing plate comprising the optical compensation film according to claim 11, and a polarizer.

22. A liquid crystal display unit comprising the polarizing plate according to claim 21.

23. The liquid crystal display unit according to claim 22, which is a liquid crystal display unit of VA type.

24. A self luminous display unit comprising the polarizing plate according to claim 21.

25. A liquid crystal display unit comprising the optical compensation film according to claim 11.

26. The liquid crystal display unit according to claim 25, which is a liquid crystal display unit of VA type.

27. A self luminous display unit comprising the optical compensation film according to claim 11.

28. A polarizing plate comprising the optical film according to claim 1 and a polarizer.

29. A liquid crystal display unit comprising the polarizing plate according to claim 28.

30. The liquid crystal display unit according to claim 29, which is a liquid crystal display unit of VA type.

31. A self luminous display unit comprising the polarizing plate according to claim 28.

32. A liquid crystal display unit comprising the optical film according to claim 1.

33. The liquid crystal display unit according to claim 32, which is a liquid crystal display unit of VA type.

34. A self luminous display unit comprising the optical film according to claim 1.

* * * * *